US011105322B2

(12) United States Patent
Marica

(10) Patent No.: US 11,105,322 B2
(45) Date of Patent: Aug. 31, 2021

(54) DIRECT DRIVE PUMP ASSEMBLIES

(71) Applicant: National Oilwell Vareo, L.P., Houston, TX (US)

(72) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 350 days.

(21) Appl. No.: 16/069,373

(22) PCT Filed: Jan. 11, 2017

(86) PCT No.: PCT/US2017/013048
§ 371 (c)(1),
(2) Date: Jul. 11, 2018

(87) PCT Pub. No.: WO2017/123656
PCT Pub. Date: Jul. 20, 2017

(65) Prior Publication Data
US 2020/0166026 A1    May 28, 2020

Related U.S. Application Data

(60) Provisional application No. 62/277,363, filed on Jan. 11, 2016, provisional application No. 62/423,008, (Continued)

(51) Int. Cl.
*F04B 15/02* (2006.01)
*F04B 23/06* (2006.01)
(Continued)

(52) U.S. Cl.
CPC ............. *F04B 15/02* (2013.01); *F04B 23/06* (2013.01); *F04B 9/02* (2013.01); *F04B 17/03* (2013.01);
(Continued)

(58) Field of Classification Search
CPC .. F04B 15/02; F04B 23/06; F04B 9/02; F04B 17/03; F04B 19/22; F04B 53/10; F04B 53/16; F04B 2205/03
(Continued)

(56) References Cited

U.S. PATENT DOCUMENTS 5,492,457 A     2/1996   Lee
5,846,056 A * 12/1998   Dhindsa .................. F04B 23/06
                                                        417/44.2
(Continued)

FOREIGN PATENT DOCUMENTS

CN          2563326 Y     7/2003
CN     101365877 A *   2/2009  ............. F15B 1/021
(Continued)

OTHER PUBLICATIONS

Chinese Patent Application No. 201780006427.4 Second Office Action dated Apr. 2, 2020 (15 pages).
(Continued)

*Primary Examiner* — Connor J Tremarche
(74) *Attorney, Agent, or Firm* — Conley Rose, P.C.

(57) ABSTRACT

Disclosed are embodiments of a pumping system with connectable and disconnectable pumping assemblies coupled to suction and discharge manifolds. In an embodiment, the pumping system includes a pulsation dampening assembly including a variable volume chamber fluidly coupled to the discharge manifold. In addition, the pumping system includes a controller coupled to the pumping assemblies. The controller is configured to detect a pressure pulsation based on a measurement from at least one of the pressure sensors, and is configured to adjust the rotational speed of the driver of at least one of the pump assemblies. In addition, the controller is configured to adjust a volume of the variable volume chamber of the pulsation dampening
(Continued)

assembly based at least in part on the measurement from the at least one of the pressure sensors.

21 Claims, 60 Drawing Sheets

Related U.S. Application Data filed on Nov. 16, 2016, provisional application No. 62/429,446, filed on Dec. 2, 2016.

(51) Int. Cl.
| | | |
|---|---|---|
| *F04B 19/22* | (2006.01) | |
| *F04B 53/16* | (2006.01) | |
| *F04B 17/03* | (2006.01) | |
| *F04B 53/10* | (2006.01) | |
| *F04B 9/02* | (2006.01) | |

(52) U.S. Cl.
CPC ............ *F04B 19/22* (2013.01); *F04B 53/10* (2013.01); *F04B 53/16* (2013.01); *F04B 2205/03* (2013.01)

(58) Field of Classification Search
USPC ........................................................ 417/540
See application file for complete search history.

(56) References Cited

U.S. PATENT DOCUMENTS

| | | | | |
|---|---|---|---|---|
| 6,749,408 | B1* | 6/2004 | Eilertsen | F04B 9/02 |
| | | | | 417/415 |
| 2007/0084766 | A1 | 4/2007 | Ishii et al. | |
| 2008/0292483 | A1 | 11/2008 | De Koning | |
| 2012/0152360 | A1* | 6/2012 | Marica | F04B 17/048 |
| | | | | 137/1 |
| 2012/0255734 | A1 | 10/2012 | Coli et al. | |
| 2014/0348677 | A1 | 11/2014 | Moeller et al. | |
| 2015/0354329 | A1 | 12/2015 | Perry et al. | |
| 2017/0016433 | A1* | 1/2017 | Chong | F04B 49/065 |

FOREIGN PATENT DOCUMENTS

| | | | | |
|---|---|---|---|---|
| CN | 101365877 | A | 2/2009 | |
| CN | 201650697 | U | 11/2010 | |
| CN | 103069162 | A | 4/2013 | |
| DE | 721098 | C | 6/1942 | |
| DE | 3727174 | A1 | 2/1989 | |
| DE | 19726702 | A1 | 1/1999 | |
| DE | 102014212021 | A1 | 12/2015 | |
| EP | 0220527 | A1 | 5/1987 | |
| FR | 911137 | A | 6/1946 | |
| FR | 2262753 | A1 | 9/1975 | |
| FR | 2262753 | A1 * | 9/1975 | ............... F16C 3/04 |
| WO | 2011/050585 | A1 | 5/2011 | |
| WO | 2014/071130 | A1 | 5/2014 | |

OTHER PUBLICATIONS

International Patent Application No. PCT/US2017/013048 International Search Report and Written Opinion dated Aug. 21, 2017 (22 pages).

Chinese Patent Application No. 201780006427.4 First Office Action dated Aug. 2, 2019 (16 pages).

* cited by examiner

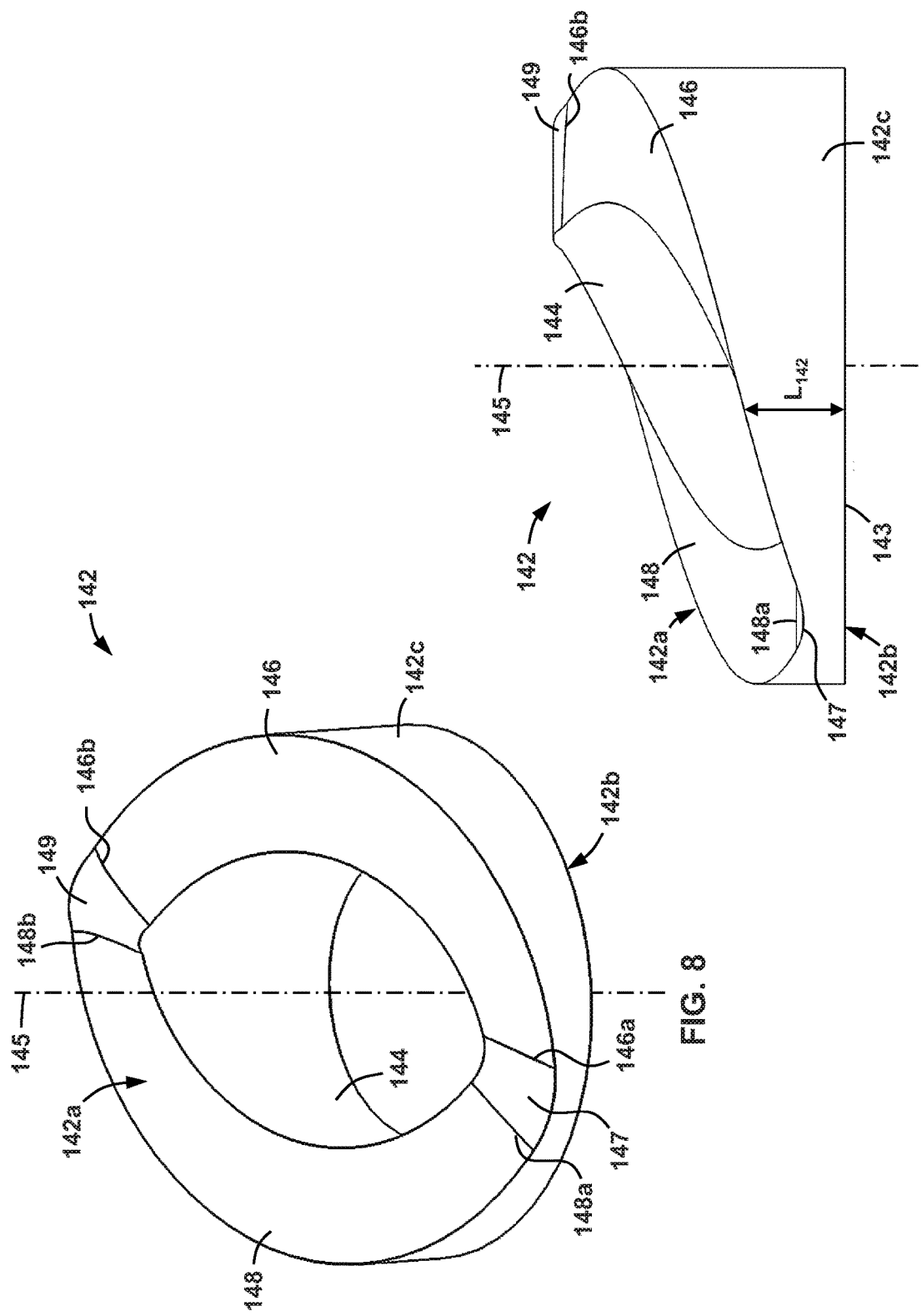

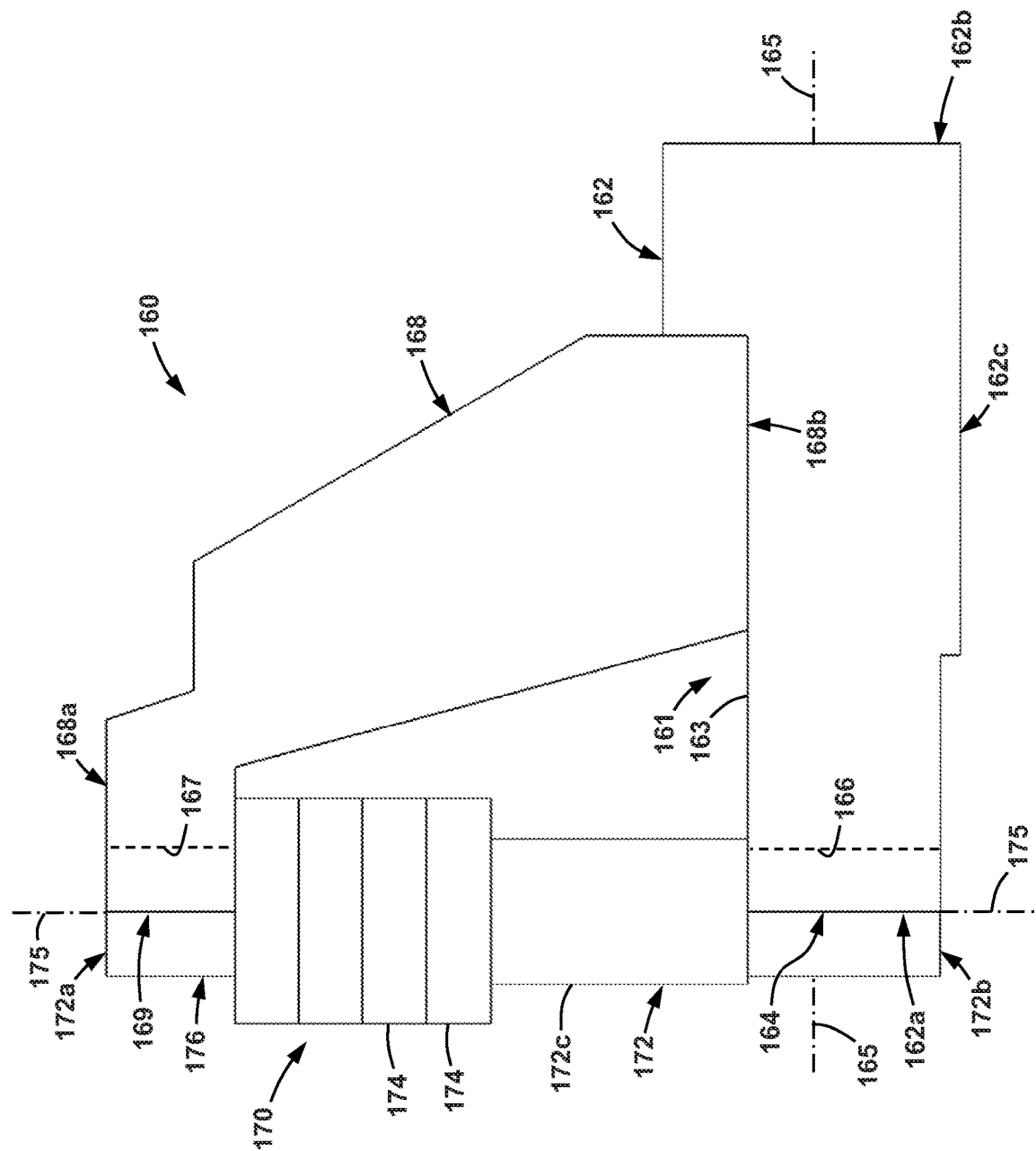

DIRECT DRIVE PUMP ASSEMBLIES

CROSS-REFERENCE TO RELATED APPLICATIONS

This application is a National Phase Entry into the U.S. under 35 U.S.C. § 371 of and claims priority to PCT Application No. PCT/US2017/013048, filed Jan. 11, 2017, entitled "Direct Drive Pump Assemblies," which claims the benefit of U.S. Provisional Application No. 62/277,363, filed Jan. 11, 2016, entitled "Direct Drive Mud Pump;" U.S. Provisional Application No. 62/423,008, filed Nov. 16, 2016; entitled "Direct Drive Pump Assemblies;" and U.S. Provisional Application No. 62/429,446, filed Dec. 2, 2016, entitled "Direct Drive Pump Assemblies;" the entire contents of each being incorporated by reference herein for all purposes.

STATEMENT REGARDING FEDERALLY SPONSORED RESEARCH OR DEVELOPMENT

Not applicable.

BACKGROUND

This disclosure relates generally to systems for pressurizing a working fluid. More particularly, this disclosure relates to pumping systems that include one or more direct drive pump assemblies for pressurizing a working fluid for subsequent injection into a subterranean wellbore.

To form an oil or gas well, a bottom hole assembly (BHA), including a drill bit, is coupled to a length of drill pipe to form a drill string. The drill string is then inserted downhole, where drilling commences. During drilling, fluid, or "drilling mud," is circulated down through the drill string to lubricate and cool the drill bit as well as to provide a vehicle for removal of drill cuttings from the borehole. After exiting the bit, the drilling fluid returns to the surface through an annulus formed between the drill string and the surrounding borehole wall (or a casing pipe lining the borehole wall). Mud pumps are commonly used to deliver drilling fluid to the drill string during drilling operations. Many conventional mud pumps are of a triplex configuration, having three piston-cylinder assemblies driven out of phase by a common crankshaft and hydraulically coupled between a suction manifold and a discharge manifold. During operation of the mud pump, each piston reciprocates within its associated cylinder. As the piston moves to expand the volume within the cylinder, drilling fluid is drawn from the suction manifold into the cylinder. After the piston reverses direction, the volume within the cylinder decreases and the pressure of drilling fluid contained with the cylinder increases. When the piston reaches the end of its stroke, pressurized drilling fluid is exhausted from the cylinder into the discharge manifold. While the mud pump is operational, this cycle repeats, often at a high cyclic rate, and pressurized drilling fluid is continuously fed to the drill string at a substantially constant rate.

BRIEF SUMMARY OF THE DISCLOSURE

Some embodiments disclosed herein are directed to a pump assembly for pressurizing a working fluid. In an embodiment, the pump assembly includes a base, a fluid end coupled to the base, a driver coupled to the base, and a transmission coupled between the driver and the fluid end. The transmission includes an input shaft having an input shaft axis, an offset collar coupled to the input shaft and including a throughbore that extends at a non-zero angle with respect to the input shaft axis, and a linking member including a spherical member, a first shaft extending along a first shaft axis and a second shaft extending along a second shaft axis. The first shaft is received with the throughbore of the offset collar, and the spherical member is slidingly received within a seat coupled to the base. In addition, the transmission includes a carriage assembly including a projection. The second shaft extends through the projection. In addition, the pump assembly includes a piston coupled to the carriage assembly. Rotation of the input shaft about the input shaft axis is configured to cause: the first shaft of the linking member to rotate about the input shaft axis; the spherical member of the linking member to pivot within the seat; and the carriage assembly to reciprocate relative to the base.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 8 and 9 are perspective and side views, respectively, of one of the cams of the cam assembly of FIG. 7;

FIG. 10 is a side view of the fixed follower assembly of the transmission assembly of FIG. 6;

DETAILED DESCRIPTION OF EXEMPLARY EMBODIMENTS

Figure 1:
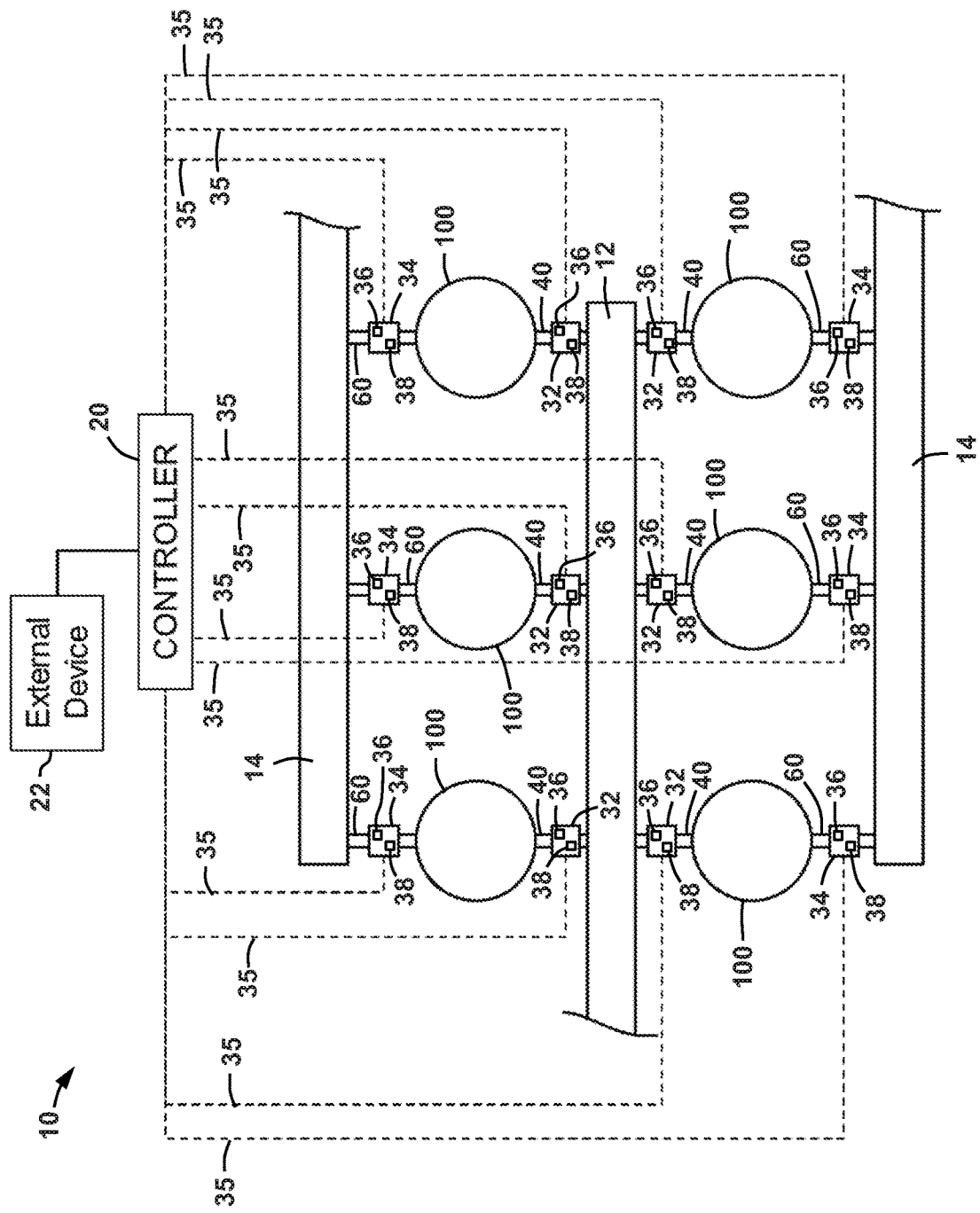
FIG. 1 is a schematic view of a pumping system for pressurizing a working fluid in accordance with at least some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described above, mud pumps, including multiple piston-cylinder assemblies driven out of phase by a common crankshaft, are typically used to deliver drilling fluid to a drill string during drilling operations. These pumps have a set footprint and configuration. Thus, if it is desired to increase the flow rate of drilling fluid above what the piston-cylinder assemblies can deliver, an additional mud pump must be installed, or another mud pump must be designed and fabricated that includes the appropriate number of piston-cylinder assemblies to provide the desired flow rate of drilling fluid. As a result, these conventional mud pumps are not easily adaptable to the changing specifications and needs of many drilling applications. In addition, adequate space must be provided at the drill site to accommodate not only the size of these mud pumps but also the set footprint thereof.

Accordingly, embodiments disclosed herein include pumping systems for pressurizing a working fluid (e.g., drilling fluid) for injection into a subterranean well, that include a plurality of modular pump assemblies. As a result, the number and specific arrangement of the modular pump assemblies may be altered as desired to accommodate a specific flow rate, pressure, and spacing requirements of the drilling operation.

Referring now to FIG. 1, a pumping system 10 for pressurizing a working fluid (e.g., drilling mud) is shown. System 10 generally includes a suction manifold 12, a pair of discharge manifolds 14, and a plurality of modular pump assemblies 100. Suction manifold 12 is in fluid communication with a working fluid source (e.g., a mud pit), and discharge manifolds 14 are in fluid communication with a central throughbore of a drill string. While not specifically shown, in this embodiment, the discharge manifolds 14 merge into or communicate with a singular discharge line or manifold downstream of pump assemblies 100. Each pump assembly 100 is coupled to suction manifold 12 with a corresponding suction line 40, and is coupled to discharge manifold 14 with a corresponding discharge line 60, such that each pump assembly 100 is configured to receive fluids from suction manifold 12 via the corresponding suction line 40, and emit pressurized fluid to one of the discharge manifolds 14 via the corresponding discharge line 60.

In addition, as shown in FIG. 1, pumping system 10 includes a plurality of suction valves 32 and discharge valves 34. Each of the suction valves 32 is disposed along one of the suction lines 40 and each of the discharge valves 34 is disposed along one of the discharge lines 60. Each of the valves 32, 34 is coupled to a central controller 20 through a corresponding connection 35 (which may be any suitable wired or wireless connection for communicating signals). Controller 20 may include a processor and a memory, where the memory includes software for execution by the processor to provide all of the functionality of controller 20 disclosed herein. Each of the valves 32, 34 also includes a pair of sensors 36, 38 that are configured to sense whether the corresponding valve (e.g., valve 32, 34) is opened or closed (i.e., whether the valves 32, 34 are in an open position or a closed position, respectively). Specifically, one sensor 36 is configured to sense when the corresponding valve is in the open position (to thereby allow fluid to flow freely along the corresponding line 40, 60), and the other sensor 38 is configured to sense when the corresponding valve is in the closed position (to thereby prevent or restrict fluid flow along the corresponding line 40, 60). The sensors 36, 38 are each configured to communicate with controller 20 via connections 35 so that controller 20 may know whether each valve 32, 34 is in the open or closed position. In this embodiment, controller 20 is coupled to an external device 22, such as, for example, a display (e.g., a computer monitor) that is further configured to display information (e.g., a graphic) that shows which of the valves 32, 34 is in the open position and which of the valves 32, 34 is in the closed position. In addition, in some embodiments, controller 20 may be configured to actuate each of the valves 32, 34 between the open and closed positions.

Figure 2:
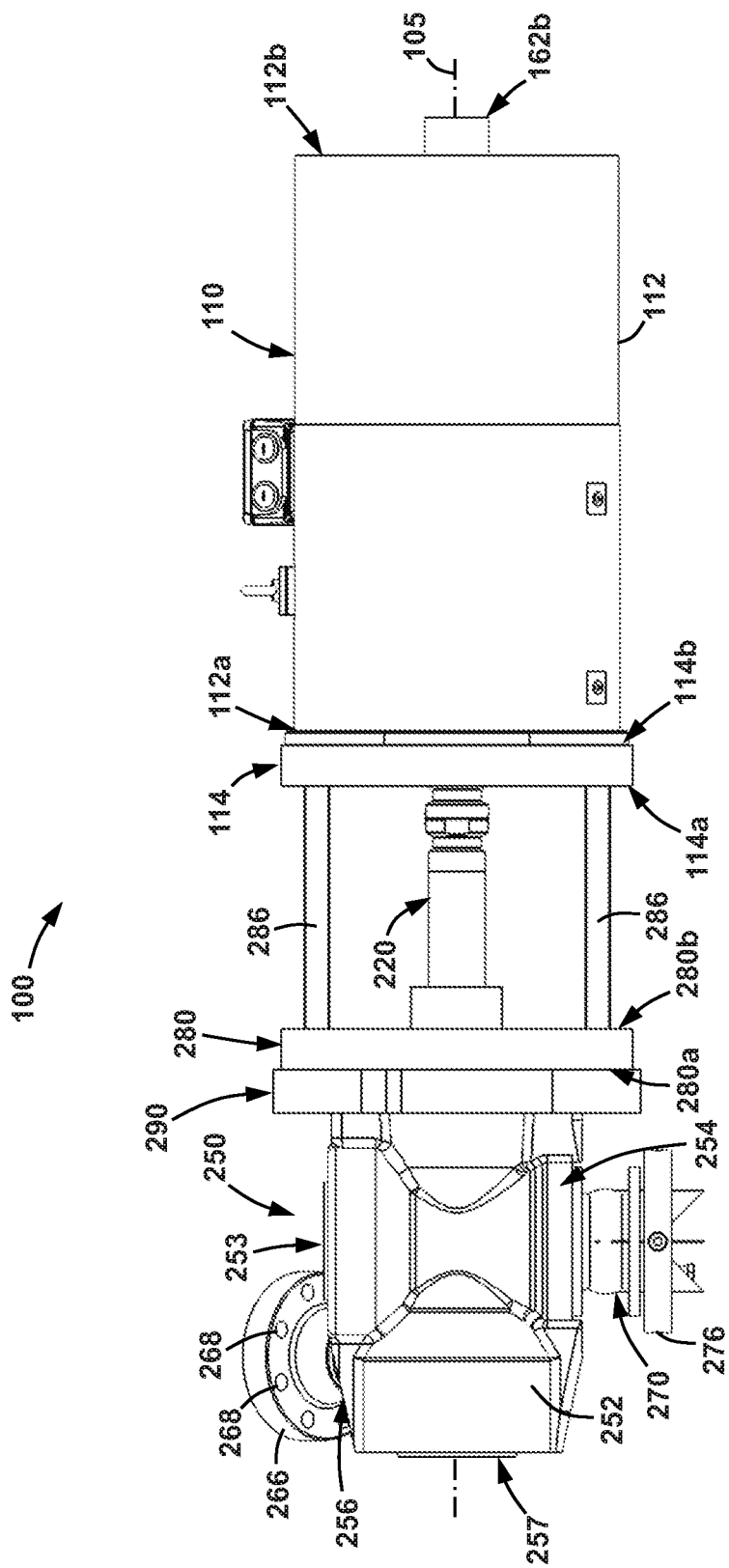
FIG. 2 is a side view of one of the modular pump assemblies of the pumping system of FIG. 1.
Figure 3:
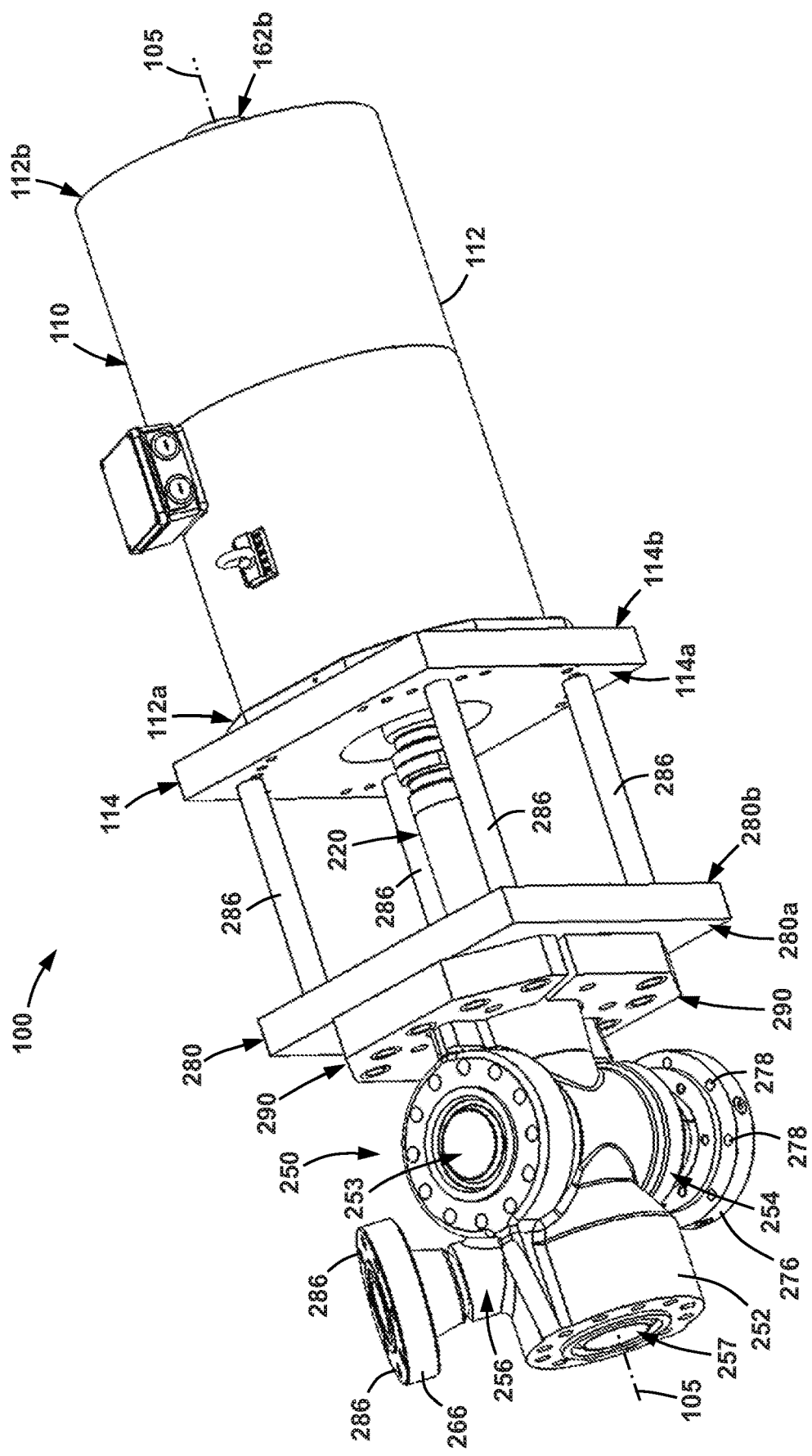
FIG. 3 is a perspective view of the modular pump assembly of FIG. 2.
Figure 4:
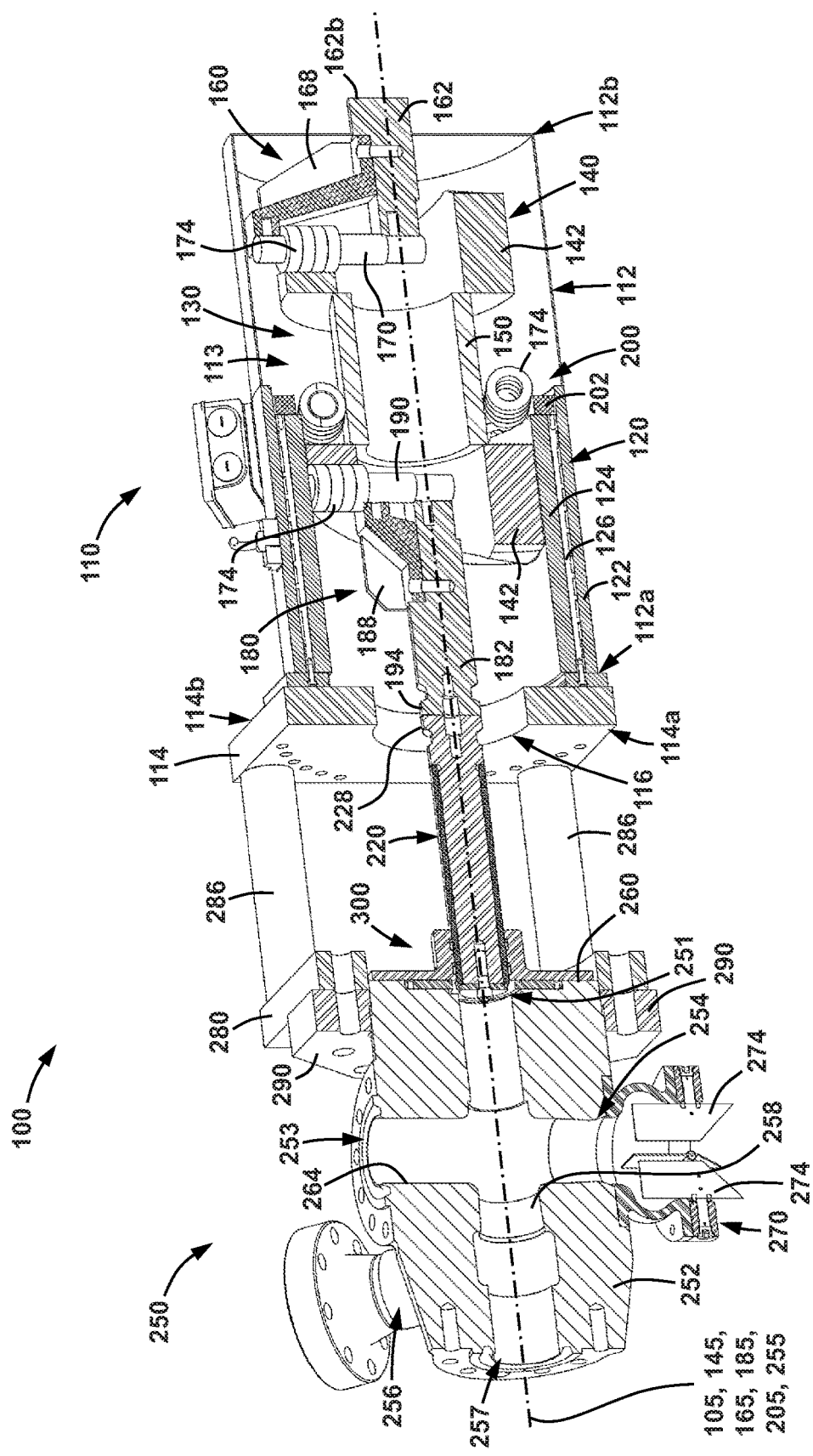
FIGS. 4 and 5 are sequential partial cross-sectional view of the modular pump assembly of FIG. 2.

Referring now to FIGS. 2-4, where one of the pump assemblies 100 is shown, it being understood that each of the pump assemblies 100 are similarly constructed. Pumping assembly 100 includes a central or longitudinal axis 105, a power-end section 110, and a fluid-end section 250 axially adjacent the power-end section 110. Power-end section 110 drives reciprocation of a plunger 220 within fluid-end section 250 to pressurize a working fluid (e.g., drilling mud) during operations. For example, as shown in FIG. 1, reciprocation of plunger 220 within fluid-end section 250 of each pump assembly 100 causes flow of working fluid from suction manifold 12 through the corresponding suction line 40, through pump assembly 100 and into one of the discharge manifolds 14 via the corresponding discharge line 60.

Referring back now to FIGS. 2-4, and specifically to FIG. 4, power-end section 110 includes an outer casing 112 that includes a first or inner end 112a and a second or outer end 112b opposite inner end 112a. Outer casing 112 defines an inner cavity 113 that extends axially from inner end 112a toward outer end 112b. In addition, an adapter plate 114 is coupled to inner end 112a to facilitate coupling of power-end section 110 to fluid-end section 250. A best shown in FIGS. 3 and 4, adapter plate 114 includes a first side 114a, a second side 114b opposite first side 114a, and a central aperture 116 extending between sides 114a, 114b. Second side 114b of adapter plate 114 is secured with inner side 112a of outer casing 112 such that aperture 116 on plate 114 provides an opening into cavity 113.

As is best shown in FIG. 4, inner cavity 113 supports and houses a motor 120 and a transmission assembly 130. In this embodiment, motor 120 is an electric motor that includes a stator 122 and a rotor 124 concentrically disposed within the stator 122 about axis 105. A thermal transfer member 126 (or cooling jacket) is disposed radially between the stator 122 and rotor 124 to transfer thermal energy (e.g., heat) away from rotor 124. During operations, electric current is routed through conductor windings (not shown) extending through stator 122 to induce a rotating magnetic field that causes rotation of rotor 124 about central axis 105 in a manner known to one of ordinary skill. In some embodiments, motor 120 is a model MST 53-L electric motor available from REXROTH® of Springdale, Ark. However, it should be appreciated that in other embodiments, motor 120 may not be an electric motor and may instead comprise any other suitable type of motor suitable for driving rotation of another component (e.g., an internal combustion engine, a hydraulic motor, a pneumatic motor, etc.).

Figure 6:
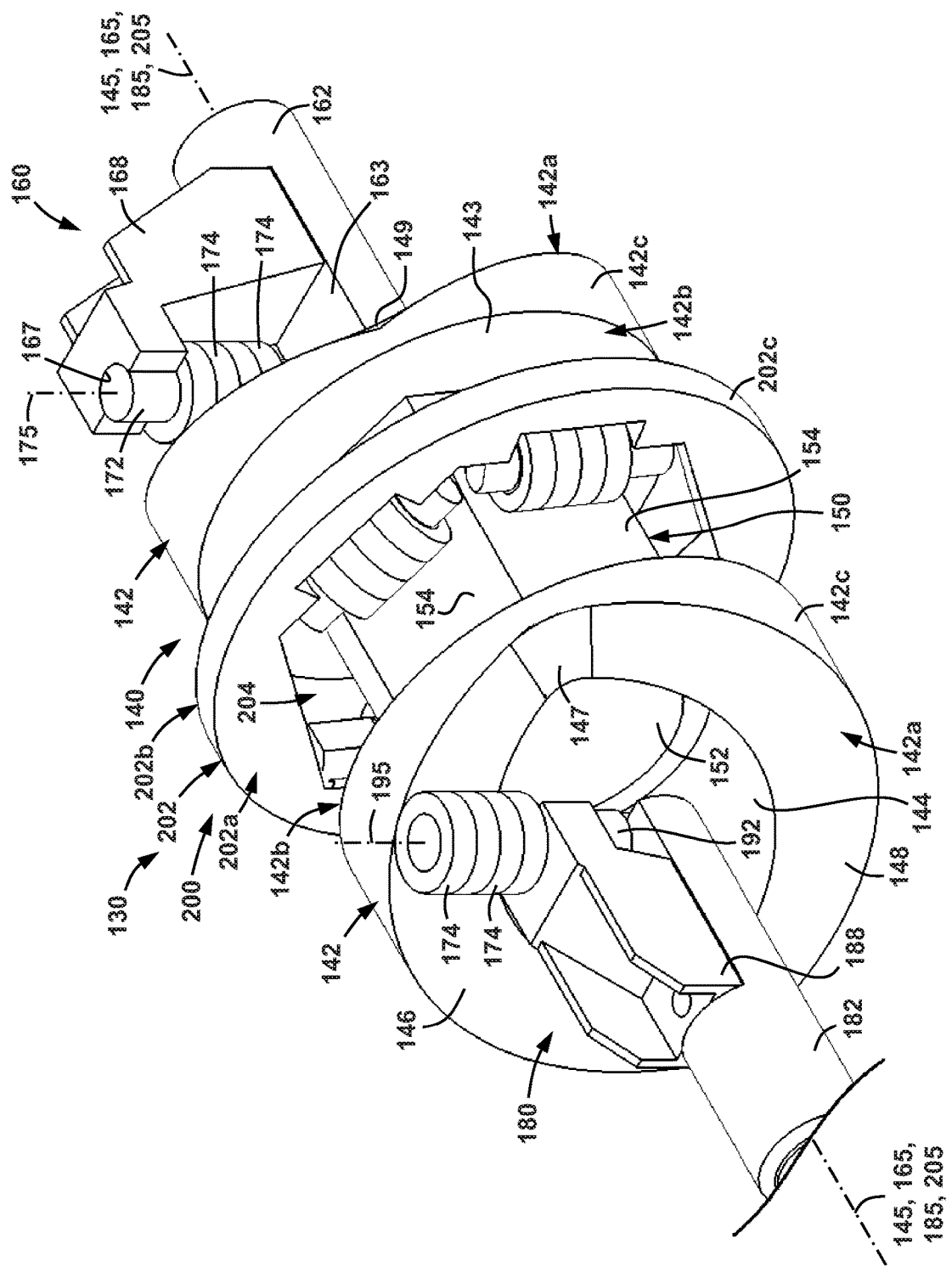
FIG. 6 is a perspective view of the transmission assembly for use within the modular pump assembly of FIG. 2.
Figure 7:
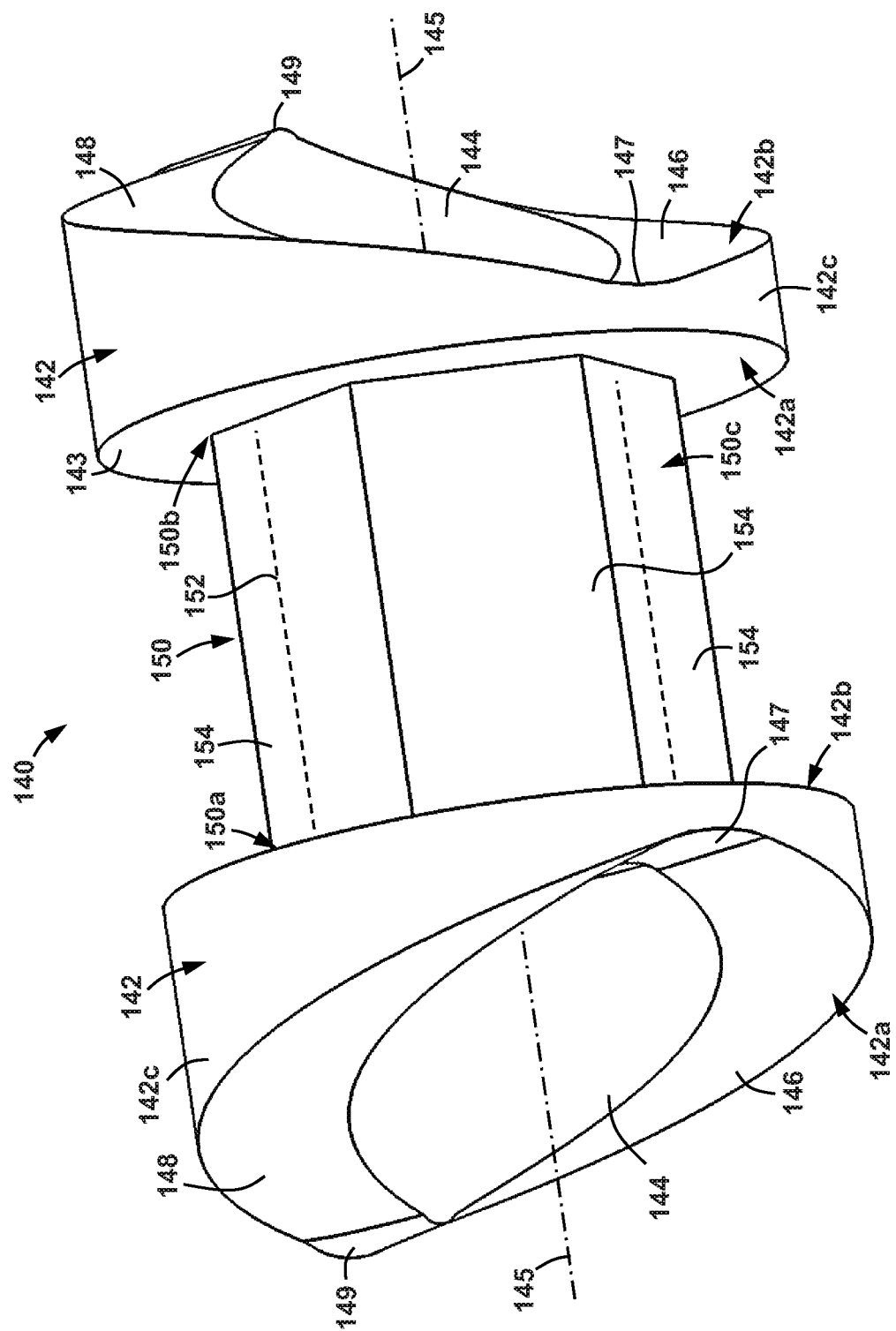
FIG. 7 is a perspective view of the cam assembly of the transmission assembly of FIG. 6.

Referring now to FIGS. 4 and 6-9, transmission assembly 130 includes a cam assembly 140, a pair of follower assemblies 160, 180, and a torque transfer assembly 200. As is best shown in FIGS. 6 and 7, cam assembly 140 includes a central or longitudinal axis 145 that is aligned with axis 105 during operations, a pair of helical cams 142, and a connecting member 150 coupled to and extending axially between cams 142.

As is best shown in FIGS. 7-9, each cam 142 includes a first side 142a, a second side 142b axially opposite first side 142b, a radially outer cylindrical surface 142c extending axially between sides 142a, 142b, and a throughbore 144 also extending axially between sides 142a, 142b. As best shown in FIGS. 6 and 7, the first side 142a of each cam 142 faces axially away from connecting member 150 and the second side 142b faces axially toward connecting member 150. Thus, first side 142a may be referred to herein as an "outer side" 142a, and second side 142b may be referred to herein as an "inner side" 142b.

Referring specifically now to FIGS. 8 and 9, inner side 142 includes an annular planar surface 143 that extends radially between radially outer surface 142c and throughbore 144. Also, outer side 142a of each cam 142 includes a pair of helical surfaces—in particular a first helical surface 146 extending in a first helical direction about axis 145 and a second helical surface 148 extending in a second helical direction about axis 145 that is opposite the first helical direction of the first helical surface 146. Each helical surface 146, 148 includes a first end 146a, 148a, respectively, and a second end 146b, 148b, respectively, opposite the first end 146a, 148a, respectively. First ends 146a, 148a of helical surfaces 146, 148, respectively, are angularly proximate one another and second ends 146b, 148b of helical surfaces 146, 148 are angularly proximate one another along outer side 142a. Helical surfaces 146, 148 are each helicoids that extend between their respective ends 146a, 148a, 146b, 148b in opposing helical directions. As used herein, the term helicoid refers to a surface that is formed by simultaneously rotating a line or curve about an axis and translating the line or curve along the axis (e.g., a screw surface) (i.e., the term helicoid refers to a surface that is formed by helically translating a line or curve about an axis). In this embodiment, surfaces 146, 148 are each geometrically defined by a line segment extending radially between throughbore 144 and radially outer surface 142c with respect to axis 145 that is simultaneously rotated about axis 145 and translated along axis 145. As a result, any plane extending perpendicularly through axis 145 that also extends through one of the surfaces 146, 148, between the respective ends 146a, 146b, 148a, 148b, will include a radial line segment from the intersected surface 146, 148. To form the opposing helical directions of surfaces 146, 148, the direction of rotation for surface 146 is opposite the direction of rotation for surface 148. Thus, surfaces 146, 148 extend helicoidally with respect to axis 145 between their respective ends 146a, 146b, 148a, 148b—with surface 146 extending helicoidally in a first direction and surface 148 extending helicoidally in a second direction that is opposite the first direction.

A first transition surface 147 extends angularly between ends 146a, 148a, and a second transition surface 149 extends angularly between ends 146b, 148b. Transition surfaces 147, 149 are curved to provide a smooth transition between the adjoining helical surfaces 146, 148. Due to the opposite helical directions of surfaces 146, 148, transition surface 147 is concave in the axial direction and transition surface 149 is convex in the axial direction. In other words, first transition surface 147 curves axially toward inner side 142b and second transition surface 149 curves axially away from inner side 142b. In addition, the opposite helical directions of surfaces 146, 148 also cause an axial length $L_{142}$ of each cam 142, that extends axially between sides 142a, 142b, to increase when moving radially from first transition section 147 to second transition section 149 and to decrease when moving radially from second transition section 149 to first transition section 147. Thus, axial length $L_{142}$ is at a relative minimum in first transition section 147 (e.g., at the midpoint of transition section 147 circumferentially mid-way between ends 146a, 148a of helical surfaces 146, 148, respectively) and is at a relative maximum in second transition section 149 (e.g., at the midpoint of transition section 149 circumferentially mid-way between ends 146b, 148b of helical surfaces 146, 148, respectively). Each transition surface 147, 149 may take up approximately 15° of the outer side 142a of cam 142 when viewed axially; however, other sizes of surfaces 147, 149 are possible.

Referring now to FIGS. 4 and 7, connecting member 150 includes a first end 150a, a second end 150b opposite first end 150a, a radially outer surface 150c extending axially between ends 150a, 150b, and a throughbore 152 also extending axially between ends 150a, 150b. As best shown in FIG. 7, radially outer surface 150c is polygonal in radial cross-section such that radially outer surface 150c includes a plurality of planar surfaces 154 that extend axially between ends 150a, 150b. In this embodiment, radially outer surface 150c is hexagonal in radial cross-section such that radially outer surface 150c includes are a total of six (6) planar surfaces 154 extending axially between ends 150a, 150b. In this embodiment, throughbore 152 is generally cylindrical; however, other shapes are possible.

Referring now to FIGS. 4, 6, and 7, connecting member 150 is disposed axially between cams 142 along axis 145. Specifically, first end 150a of connecting member 150 engages and abuts inner side 142b of one of the cams 142 and the second end 150b of connecting member 150 engages and abuts inner side 142b of the other of the cams 142. In addition, cams 142 are mounted to connecting member 150 such that first transition sections 147 of both cams 142 are circumferentially or angularly aligned with one another about axis 145 and second transition sections 149 of both cams 142 are circumferentially or angularly aligned with one another about axis 145. Further, as is best shown in FIGS. 4 and 7, when connecting member 150 is engaged axially between cams 142, throughbores 142d of cams 142 and throughbore 152 of connecting member 150 are all axially aligned along axis 145.

Referring now to FIGS. 4, 6, and 10, follower assembles 160, 180 include a fixed follower assembly 160 and a movable follower assembly 180. Fixed follower assembly 160 includes a central shaft 162, a support bracket 168, and a bearing member 170.

Referring specifically now to FIG. 10, central shaft 162 is an elongate member that includes a central or longitudinal axis 165, a first or inner end 162a, a second or outer end 162b opposite inner end 162a, and a radially outer surface 162c extending axially between ends 162a, 162b. Inner end 162a includes an axially extending recess 164 that includes a concave cylindrical mounting surface 166 extending cylindrically about a radius of axis 135 (i.e., a line extending orthogonally to axis 135). In addition, shaft 162 includes a mounting recess 161 extending radially inward from radially outer surface 162c that defines an axially extending planar mounting surface 163 that extends axially from inner end 162a of central shaft 162 with respect to axis 165.

Support bracket 168 includes a first or upper end 168a, and a second or lower end 168b opposite upper end 168a. Lower end 168b is engaged with and secured to planar mounting surface 163 on central shaft 162 such that upper end 168a is distal to central shaft 162. In some embodiments, lower end 168b is engaged with planar mounting surface 163 with a coupling member (e.g., bolt, rivet, screw, nail, etc.); however, in other embodiments, lower end 168b may be engaged with surface 163 through some other method (e.g., welding, adhesive, etc.). Upper end 168a includes a recess 169 that defines a concave cylindrical mounting surface 167. Lower end 168b is mounted to planar mounting surface 163 of central shaft 162 such that concave cylindrical mounting surface 167 extends cylindrically about a radius of axis 165. In particular, in this embodiment, both concave cylindrical mounting surfaces 166, 167 extend cylindrically about the same radius of axis 165.

Bearing member 170 includes an elongate shaft 172 and a plurality of bearing elements 174 rotatably mounted to shaft 172. Shaft 172 includes a central or longitudinal axis 175, a first or upper end 172a, a second or lower end 172b opposite upper end 172a, and a radially outer surface 172c extending axially between ends 172a, 172b. Radially outer surface 172c includes a first or upper cylindrical mounting section 176 extending axially from upper end 172a, and a second or lower cylindrical mounting section 178 extending axially from lower end 172b. Upper mounting section 176 is received within recess 169 and engaged and secured to concave cylindrical mounting surface 167 and lower mounting section 178 is received within recess 164 and engaged and secured to concave cylindrical mounting surface 166. Thus, axis 165 is aligned with the axis of curvature of each of the concave cylindrical mounting surfaces 166, 167. Bearing elements 174 are cylindrical members that are disposed about shaft 172 and axially positioned between upper and lower cylindrical mounting sections 176, 178 respectively. During operations, bearing elements 174 are free to rotate about axis 175 relative to shaft 172. As will be described in more detail below, bearing elements 174 engage with helical surfaces 146, 148 on one of the cams 142 to facilitate axial movement of plunger 220 during operation of pump assembly 100. In at least some embodiments, bearing elements 174 may comprise self-aligning bearings (e.g., spherical self-aligning bearings) to maintain adequate contact in spite of machining tolerances and variances during operations.

Figure 11:
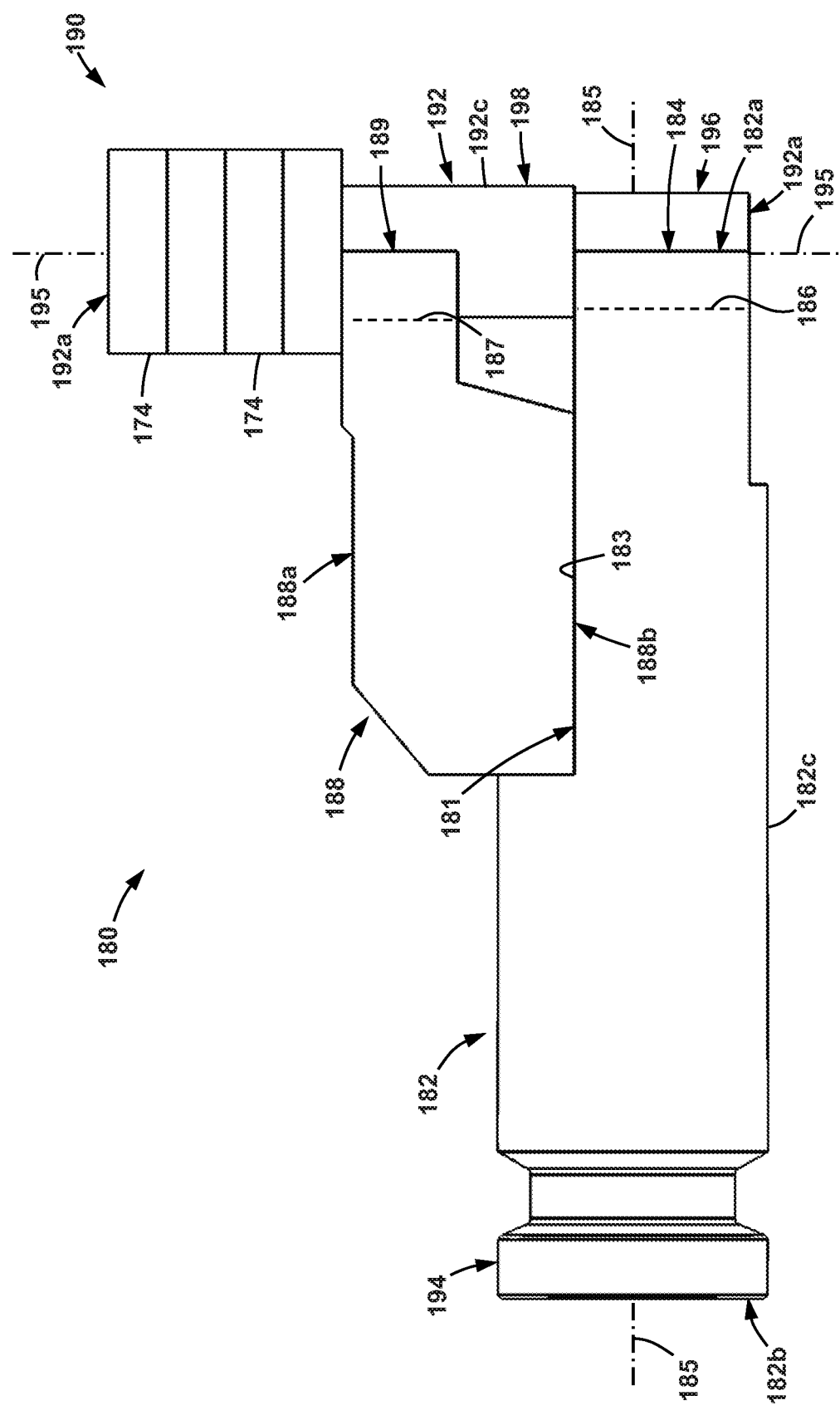
FIG. 11 is a side view of the moving follower assembly of the transmission assembly of FIG. 6.

Referring now to FIG. 11, moving follower assembly 180 includes a central shaft 182, a support bracket 188, and a bearing member 190. Central shaft 182 is an elongate member including a central or longitudinal axis 185, a first or inner end 182a, a second or outer end 182b opposite inner end 182a, and a radially outer surface 182c extending axially between ends 182a, 182b. Inner end 182a includes an axially extending recess 184 that includes a concave cylindrical mounting surface 186 extending cylindrically about a radius of axis 185 (i.e., a line extending orthogonally to axis 185). In addition, shaft 182 includes a mounting recess 181 extending radially inward from radially outer surface 182c that defines an axially extending planar mounting surface 186 that extends axially from inner end 182a of central shaft 182. Further, outer end 182b includes a connector 194 that, as will be described in more detail below, is configured to engage and mate with a corresponding connector on plunger 220. In this embodiment, connector 194 includes a threaded mounting recess 191 that extends axially from outer end 182b of shaft 182.

Referring still to FIG. 11, support bracket 188 includes a first or upper end 188a, and a second or lower end 188b opposite upper end 188a. Lower end 188b is engaged with and secured to planar mounting surface 183 on central shaft 182 such that upper end 188a is distal to central shaft 182. In some embodiments, lower end 188b is engaged with planar mounting surface 183 with a coupling member (e.g., bolt, rivet, screw, nail, etc.); however, in other embodiments lower end 188b may be engaged with surface 183 through some other method (e.g., welding, adhesive, etc.). Upper end 188a includes a recess 189 that defines a concave cylindrical mounting surface 187. Lower end 188b is mounted to planar mounting surface 183 of central shaft 182 such that concave cylindrical mounting surface 187 extends cylindrically about a radius of axis 185. In particular, in this embodiment, both concave cylindrical mounting surfaces 186, 187 extend cylindrically about the same radius of axis 185.

Bearing member 190 includes an elongate shaft 192 and a plurality of bearing elements 174 rotatably mounted to shaft 192. Shaft 192 includes a central or longitudinal axis 195, a first or upper end 192a, a second or lower end 192b opposite upper end 192a, and a radially outer surface 192c extending axially between ends 192a, 192b. Radially outer surface 192c includes a first or lower cylindrical mounting section 196 extending axially from lower end 196b, and a second or upper cylindrical mounting section 198 extending axially from lower cylindrical mounting section 196. Upper mounting section 198 is received within recess 189 and engaged and secured to concave cylindrical mounting surface 187 and lower mounting section 196 is received within recess 184 and engaged and secured to concave cylindrical mounting surface 186. Thus, axis 195 is aligned with the axis of curvature of each of the concave cylindrical mounting surfaces 186, 187. Bearing elements 174 are the same as those previously described for fixed follower assembly 160. In addition, as shown in FIG. 11, bearing elements 174 of moving follower assembly 180 are rotatably disposed about shaft 192 and axially positioned above each of the upper and lower cylindrical mounting sections 198, 196, respectively. During operations, bearing elements 174 are free to rotate about axis 195 relative to shaft 192. As will be described in more detail below, bearing elements 174 engage with helical surfaces 146, 148 on one of the cams 142 to facilitate axial movement of plunger 220 during operation of pumping assembly 100.

Figure 12:
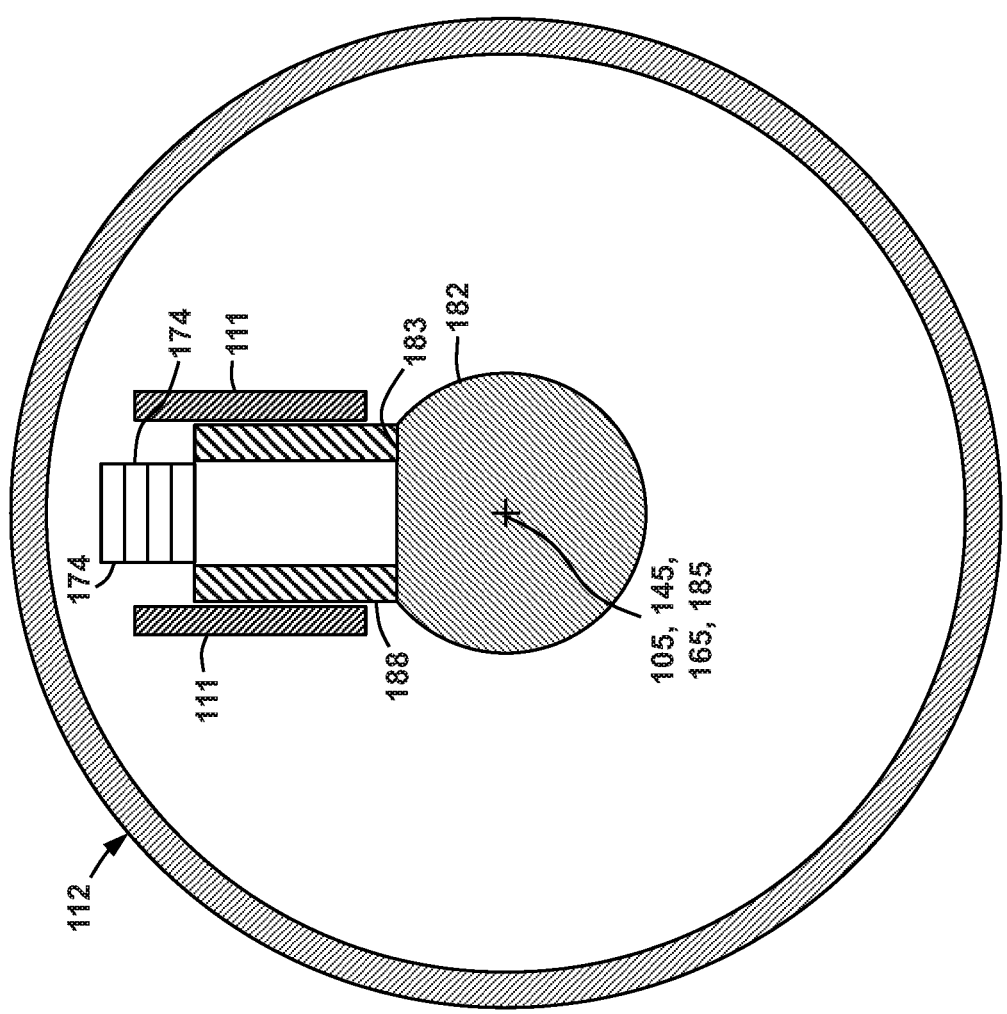
FIG. 12 is a schematic cross-sectional view of the moving follower assembly of FIG. 11 disposed within the cavity of the outer housing of the power-end section of the module pump assembly of FIG. 2.

Referring again to FIG. 4, during operations, follower assemblies 160, 180, and cam assembly 140 are disposed within cavity 113 such that axes 145, 165, 185 of assemblies 140, 160, 180, respectively, are aligned with axis 105 of pump assembly 100. In addition, outer end 162b of central shaft 162 of fixed follower assembly 160 extends through and is engaged with outer end 112b of outer casing 112, such that the position of assembly 160 is fixed within cavity 113. Further, referring briefly to FIG. 12, when moving follower assembly 180 is inserted within cavity 113, support bracket 188 is slidably received between two axially extending rails 111 secured within cavity 113 (e.g., rails 111 may be secured to inner end 112a and/or adapter plate 114). During operations, moving follower assembly 180 is allowed to axially traverse within cavity 113 with respect to axis 105 (and thus also axes 145, 165, 185) through sliding engagement between bracket 188 and rails 111 (note: only follower assembly 180 and rails 111 are shown within cavity 113 for convenience, and so as not to unduly complicate the figure).

Referring now to FIGS. 4 and 6, when follower assemblies 160, 180, and cam assembly 140 are inserted within cavity 113 as described above, bearing elements 174 on shaft 172 of fixed follower assembly 160 engage with the helical surfaces 146, 148 on outer side 142a of one of the cams 142 and bearing elements 174 on shaft 192 of moving follower assembly 180 engage with the helical surfaces 146, 148 on outer side 142a of the other of the cams 142. Thus, rotation of cam assembly 140 about axis 105 causes rolling engagement between bearing elements 174 and helical surfaces 146, 148. During operations, as bearing elements 174 of assemblies 160, 180 traverse along helical surface 146, 148 from transition sections 147 toward transition sections 149 of cams 142, the axial distance between bearing elements 174 on moving follower assembly 180 and bearing members 174 on fixed follower assembly 160 increases thereby forcing moving follower assembly 180 to move axially away from fixed follower assembly 160 along axis 105 (see e.g., progression from FIG. 4 to FIG. 5). Conversely, as bearing elements 174 of assemblies 160, 180 traverse along helical surfaces 146, 148 from transition section 149 toward transition section 147, the axial distance between bearing members 174 on moving follower assembly 180 and bearing elements 174 on fixed follower assembly 160 decreases thereby allowing follower assembly 180 to move axially toward fixed follower assembly 160 along axis 105 (see e.g., progression from FIG. 5 to FIG. 4). In particular, because the transition sections 147, 149 of cams 140 in assembly 140 are circumferentially aligned as previously described above, traversing the bearing elements 174 of assemblies 160, 180 along surface 146, 148 of cams 142 from transition section 147 to transition section 149 results in a total increase in the axial distance between bearing members 174 on assembly and bearing elements 174 on assembly 180 that is equal to two times (2×) the maximum value of the axial length $L_{142}$ of cams 142. Thus, continuous rotation of cam assembly 140 about axis 105 causes axial reciprocation of moving follower assembly 180 along axis 105 of pump assembly 100.

In addition, it should also be appreciated that because the axial position of fixed follower assembly 160 is constant within cavity 113, continuous rotation of cam assembly 140 about axis 105 also causes axial reciprocation of connecting member 150 along axis 105. Specifically, as bearing elements 174 of assemblies 160, 180 traverse along helical surfaces 146, 148 of cams 142 from transition section 147 toward transition section 149, connecting member 150 translates axially toward inner end 112a of outer casing 112 (see e.g., progression from FIG. 4 to FIG. 5). Conversely, as bearing elements 174 of assemblies 160, 180 traverse along helical surfaces 146, 148 of cams 142 from transition section 149 toward transition section 147, connecting member 105 translates axially toward outer end 112b of outer casing 112 (see e.g., progression from FIG. 5 to FIG. 4).

Figure 13:
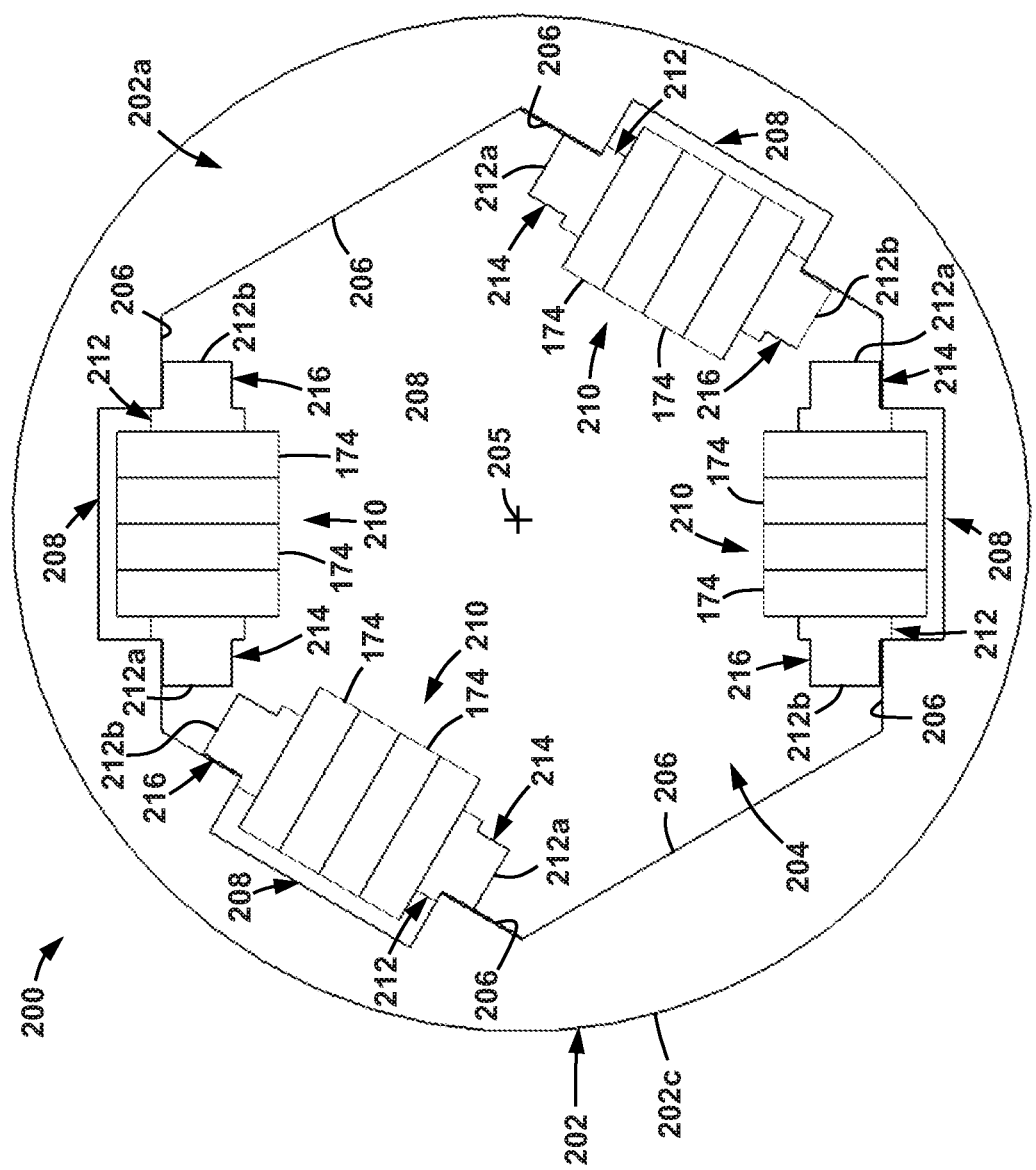
FIG. 13 is a front view of the torque transfer assembly of the transmission assembly of FIG. 6.

Referring now to FIGS. 6 and 13, torque transfer assembly 200 couples rotor 124 of motor 120 to cam assembly 140, such that motor 120 and torque transfer assembly 200 may cause cam assembly 140 to rotate about axis 105 during operations. Torque transfer assembly 200 generally comprises a body 202, and a plurality of roller assemblies 210 coupled to body 202.

Body 202 includes a central axis 205 that is aligned with axes 105, 145, 165, 185 during operations, a first side 202a, a second side 202b opposite first side 202a, a radially outer surface 202c extending axially between sides 202a, 202b, and a central aperture 204 also extending axially between sides 202a, 202b. In this embodiment, body 202 is a disc shaped member, and thus, radially outer surface 202c is cylindrical about axis 205. As is best shown in FIG. 13, aperture 204 is polygonal in shape and thus includes a plurality of planar surfaces 206 circumferentially arranged about axis 205 and extending axially between sides 202a, 202b. In this embodiment, aperture 204 is hexagonal in shape and therefore includes a total of six (6) planar surfaces 206. In other embodiments, aperture 204 may be formed in a variety of other shapes, such as, for example, cylindrical, oval, square, pentagonal, octagonal, etc. In this embodiment, aperture 204 is hexagonal in shape so as to substantially match the shape of connecting member 150 of cam assembly 140; however, such congruence is not required.

As shown in FIG. 13, a subset of the planar surfaces 206 each include a rectangular recess 208 extending radially outward from axis 205 and into the respective surface 206. In particular, in this embodiment, a total of four (4) of the surfaces 206 include a rectangular recess 208, such that the four recesses 208 are disposed in two pairs that are disposed radially opposite one another across axis 205 (i.e., each recess 208 is disposed 180° about axis 205 from another of the recesses 208). In other embodiments, all of the surfaces 206 may include a rectangular recess 208.

Referring specifically now to FIG. 13, roller assemblies 210 are disposed within aperture 204 and are coupled to the surfaces 206 that include recesses 208. Each roller assembly 210 includes a central shaft 212, and a plurality of bearing elements 174 rotatably mounted to shaft 212. The bearing elements 174 are substantially the same as those described above for follower assemblies 160, 180, and thus, a detailed description of bearing elements 174 in roller assemblies 210 is omitted in the interests of brevity.

Central shaft 212 of each assembly 210 is an elongate member that includes a central axis 215, a first end 212a, a second end 212b opposite first end 212a, a first engagement section 214 extending axially from first end 212a, and a second engagement section 216 extending axially from second end 212b. Bearing elements 174 are rotatably disposed about shaft 212 axially between engagement sections 214, 216 along axis 215 such that bearing elements 174 are each free to rotate about axis 215 relative to shaft 212 during operations. Each roller assembly 210 is mounted within aperture 204 such that bearing elements 174 are disposed within one of the rectangular recesses 208, and first and second engagement sections 214, 216 are engaged with or otherwise coupled to planar surface 206 carrying recess 208.

Figure 14:
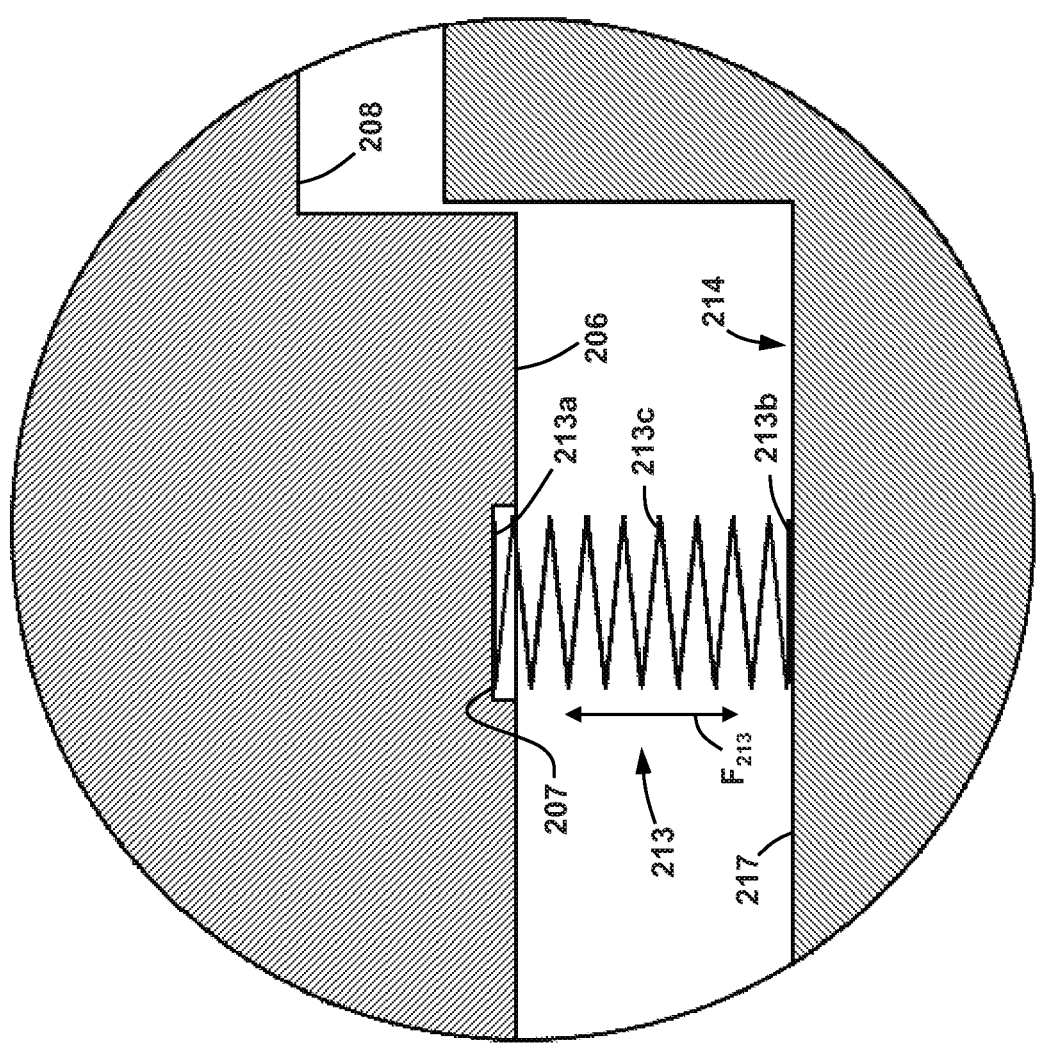
FIG. 14 is a schematic cross-section view of the coupling between one of the roller assemblies and the body of the torque transfer assembly of FIG. 13.

In some embodiments, engagement sections 214, 216 may be coupled to planar surface 206 with a biasing member (e.g., coiled spring, leaf spring, piston, etc.) such that shaft 212 and bearing members 174 are biased radially inward toward axis 205. For example, referring briefly to FIG. 14, a biasing member 213 is schematically shown coupling surface 206 to first engagement section 214 of shaft 212. In this embodiment, a similar biasing member 213 is also engaged between surface 206 and second engagement section 216 in the same manner as that shown for engagement section 214. Thus, only the engagement between biasing member 213 and first engagement section 214 is described herein in the interests of brevity (it being understood that the engagement between the similar biasing member 213 and second engagement section 216 is substantially the same). As shown in FIG. 14, in some embodiments, surface 206 may include a mounting recess 207 adjacent the rectangular recess 208 and engagement section 214 may include a planar engagement surface 217 that extends axially with respect to axis 215. In this embodiment, biasing member 213 is a coiled spring that includes a first end 213a, a second end 213b opposite first end 213a, and a body 213c extending helically between ends 213a, 213b. First end 213a is received within and mounted to recess 207 and second end 213b is mounted to engagement surface 217 of engagement section 214 (it should be appreciated that in this embodiment, second engagement section 216 of shaft 212 also includes a similar planar engagement surface 217 for engaging with a similar biasing member). Thus, during operations, biasing member 213 generates a biasing force $F_{213}$ that urges ends 213a, 213b apart from one another, and therefore also biases shaft 212 of roller assembly 210 radially toward axis 205 (see FIG. 13).

Referring again to FIGS. 4 and 6, during operations, torque transfer assembly 200 is inserted within cavity 113 and coupled to both rotor 124 and cam assembly 140 to transfer torque about axis 105 generated by motor 120 to cam assembly 140 to thereby drive rotation of cams 142 about axis 105 during pumping operations. Specifically, body 202 is disposed within cavity 113 such that axis 205 aligns with axis 105 (and thus also axes 145, 165, 185). In addition, first side 202a of body 202 is coupled to rotor 124 (e.g., with a plurality of bolts, screws, rivets, or other coupling members extending axially through body 202 and an axial end of rotor 124), and connecting member 150 is received axially through aperture 204 such that bearing elements 174 on roller assemblies 210 engage with planar surfaces 154 on radially outer surface 150c of connecting member 150. In some embodiments, the engagement between bearing elements 174 and planar surfaces 154 is enhanced by biasing members disposed between shafts 212 of roller assemblies 210 and planar surfaces 206 of aperture 204 (e.g., biasing force $F_{213}$ generated by biasing member 213 of FIG. 14).

Figure 5:
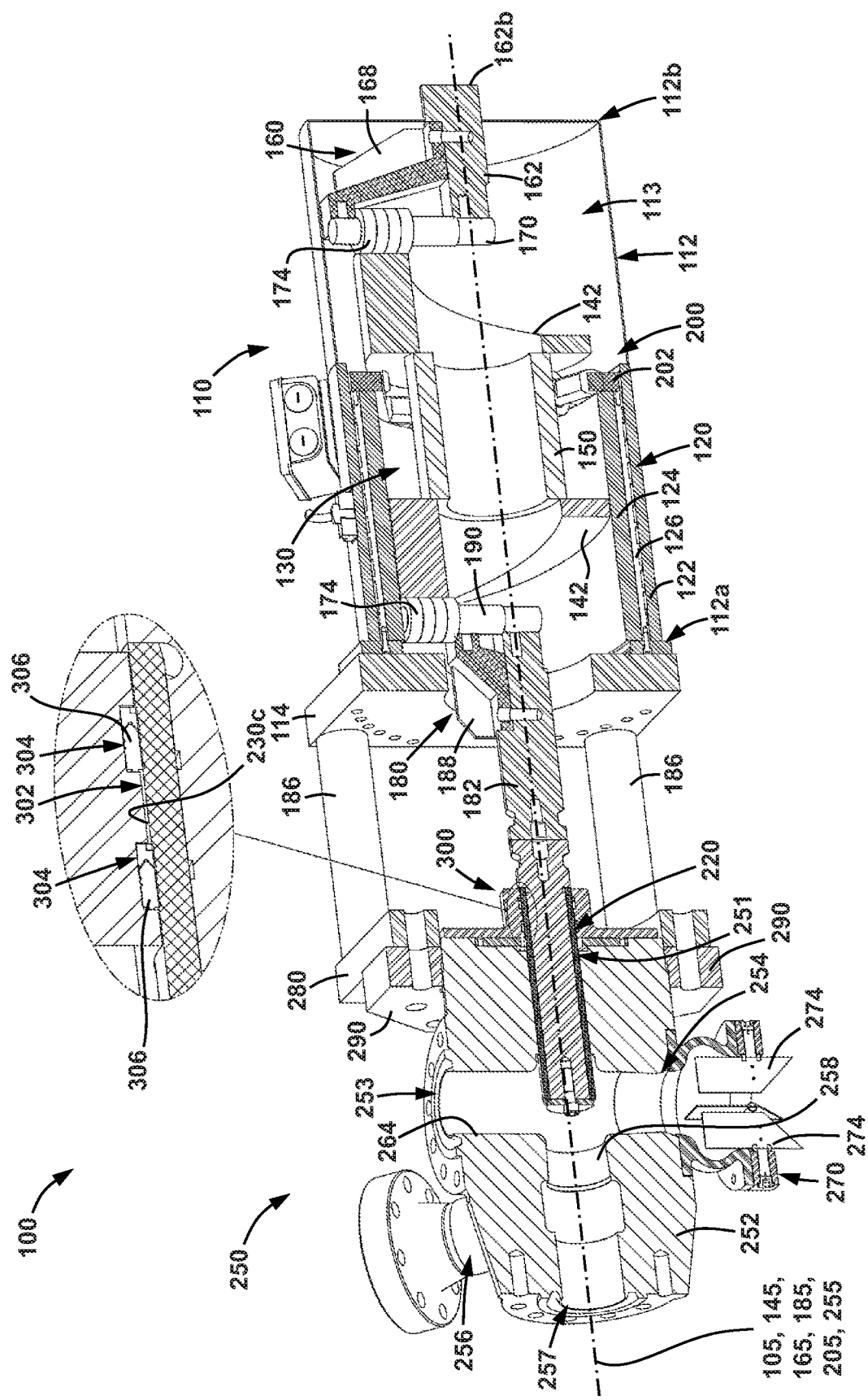

Referring now to FIGS. 4 and 5, during operations, rotor 124 is rotated about axis 105 relative to stator 122 in the manner previously described above. This rotation also causes rotation of body 202 of torque transfer assembly 200 about axis 105. The engagement between bearing elements 174 and planar surfaces 154 extending axially along connecting member 150 allows torque to transfer from body 205, through roller assemblies 210 and into connecting member 150, thereby resulting in a corresponding rotation of cam assembly 140 about axis 105. As previously described, rotation of cam assembly 140 about axis 105 further causes reciprocation of moving follower assembly 180 along axis 105 due to the engagement between bearing elements 174 of follower assemblies 160, 180 and helical surfaces 146, 148 on cams 142. In addition, as previously described, rotation of cam assembly 140 also causes axial reciprocation of connecting member 150 within cavity 113. Thus, as body 202 rotates about axis 105, connecting member 150 translates axially through aperture 204. This relative axial translation is accommodated by rotation of bearing elements 174 of roller assemblies 210 about the corresponding axes 215 and rolling engagement of bearing elements 174 and planar surfaces 154 on connecting member 150.

In addition, as bearing elements 174 on follower assemblies 160, 180 traverse along helical surfaces 146, 148 of cams 142 as described above, the curved shape of transition sections 147, 149 (e.g., particularly the concave curved shape of first transition section 147 and the convex curved shape of transition section 149) smooth out the transition between the opposite helically directed surfaces 146, 148. Without curved transition section 147, 149, the intersections between helical surfaces 146, 148 would be abrupt, thereby potentially causing bearing elements 174 to loose contact (at least momentarily) with cams 142 during rotation thereof.

Figure 15:
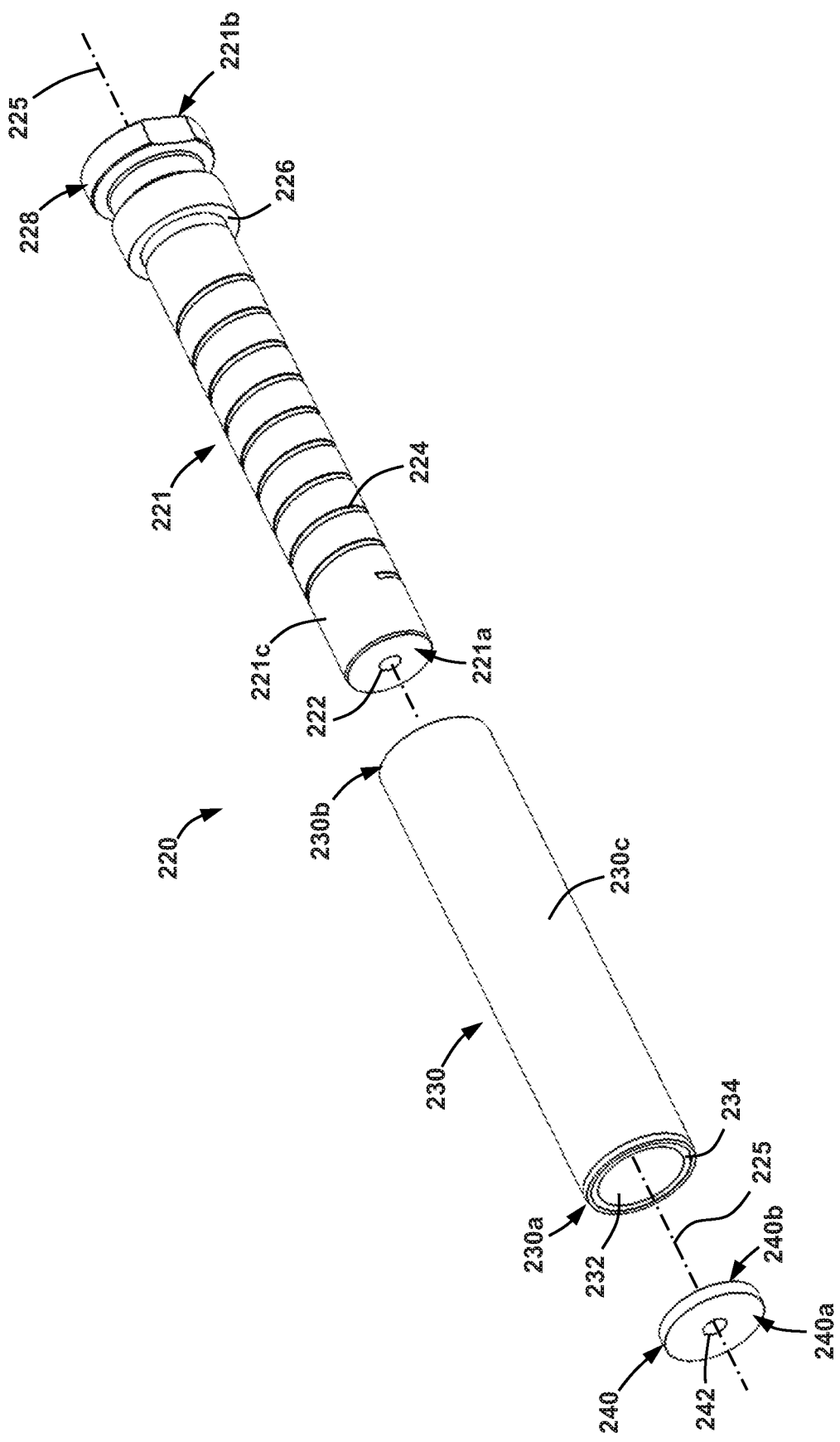
FIG. 15 is an exploded perspective view of the plunger of the module pump assembly of FIG. 2.
Figure 16:
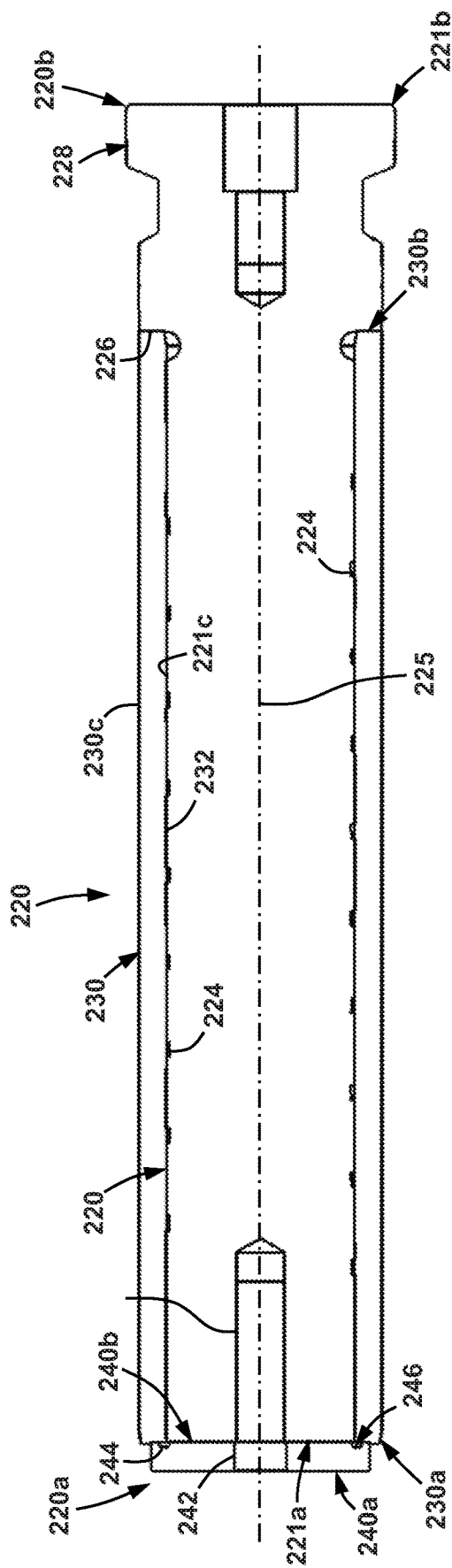
FIG. 16 is a side cross-sectional view of the plunger of FIG. 15.

Referring now to FIGS. 15 and 16, plunger 220 is an elongate member that includes a central or longitudinal axis 225 that is aligned with axis 105 of pump assembly 100 during operations, a first or fluid end 220a, and a second or power end 220b opposite fluid end 220a. In addition, plunger 220 includes body 221 having a first end 221a or fluid end 221a, a second or power end 221b opposite fluid end 221a, and a radially outer surface 221c extending between ends 221a, 221b. Fluid end 221b of body 221 is coincident with fluid end 220a of plunger 220 and power end 221b of body 221 is coincident with power end 221b of body 221. An axially extending mounting aperture 222 extends from fluid end 221a, and a connector 228 for connecting plunger 220 to central shaft 182 of moving follower assembly 180 is disposed at power end 221b. In addition, radially outer surface 221c includes a radially extending annular shoulder 226 disposed axially between fluid end 221a and connector 228. In this embodiment, shoulder 226 is more proximate connector 228 than fluid end 221a. Further, body 221 includes a seal groove 224 extending radially inward from radially outer surface 221c and helically about axis 225. Groove 224 is axially positioned between shoulder 226 and fluid end 221a.

An outer sleeve 230 is disposed about body 221 to sealingly engage with sealing rings (e.g., wiper rings) disposed at the entrance to fluid-end section 250 (note: alternatively, sealing rings may be secured to sleeve 230 that sealingly engage the entrance of fluid-end section 250). 230b opposite first end 230a, a radially outer surface 230c extending axially between ends 230a, 230b, and a throughbore 232 also extending axially between ends 230a, 230b. A sealing surface 234 extends annularly about axis 225 at first end 230a in a region radially disposed between throughbore 232 and radially outer surface 230c. In this embodiment, sleeve 230 comprises a composite material.

As is shown in FIG. 16, sleeve 230 is inserted axially over body 221 until second end 230b of sleeve 230 abuts or engages with shoulder 226 and first end 230a is generally aligned or is at least proximate fluid end 221a of body 221. A sealing cap 240 is then installed on the aligned or proximate ends 221a, 230a of body 221 and sleeve 230, respectively, to secure sleeve 230 to body 221. In particular, sealing cap 240 includes a first side 240a, a second side 240b opposite first side 240a, and a mounting aperture 242 extending axially between sides 240a, 240b. A sealing groove 244 extends axially into second side 240b and annularly about axis 225, that receives a sealing member 246 (e.g., an O-ring, a gasket, etc.) therein. Sealing cap 240 is installed on plunger 220 and sleeve 230 such that second side 240b abuts or engages ends 221a, 230a and in particular such that sealing member 246 within groove 244 engages with sealing surface 234 on end 230a of sleeve 230. In addition, when sealing cap 204 is installed on body 221 and sleeve 230, mounting aperture 242 is aligned with mounting aperture 222, and a coupling member (e.g., screw, nail, bolt, rivet, etc.) is inserted within apertures 242, 222 to compress sealing member 246 against surface 234 and to compress second end 230b of sleeve 230 against shoulder 226. Thus, during operations, as plunger 220 is reciprocated within fluid-end section 250 as described in more detail below, fluid flow axially between ends 221a, 221b of body 221 between radially outer surface 221c and throughbore 232 of sleeve 230 is prevented or at least restricted by the sealing engagement between sealing member 246 and sealing surface 234. Moreover, if fluid should flow past sealing member 246 and surface 234 and between throughbore 232 and radially outer surface 221c, it is directed into helically extending seal groove 224 and thus its axial progression is slowed (if not ceased) by the tortuous flow path created thereby. As a result, groove 224 forms a labyrinth style seal to impede fluid flow between throughbore 232 of sleeve 230 and radially outer surface 221c of body 221.

Referring again to FIG. 4, plunger 220 is mounted to transmission assembly 130 by engaging connector 228 at power end 220b of plunger 220 with connector 194 on outer end 182*b* of central shaft 182 of moving follower assembly 160. Specifically, referring briefly to FIG. 17, connector 228 includes a threaded mounting recess 229 that extends axially from power end 221*b* of body 221. A threaded coupling member 227 (e.g., a threaded rod) is threadably engaged within recess 229 such that one end 227*a* is disposed within recess 229 and an opposite end 227*b* of coupling member 227 extends axially from power end 221*b* of body 221. Thereafter, end 227*b* of coupling member 227 is received within and threadably engaged with recess 191 of connector 194 until end 221*b* of body 221 engages or abuts end 182*b* of central shaft 182 of moving follower assembly 180.

Figure 18:
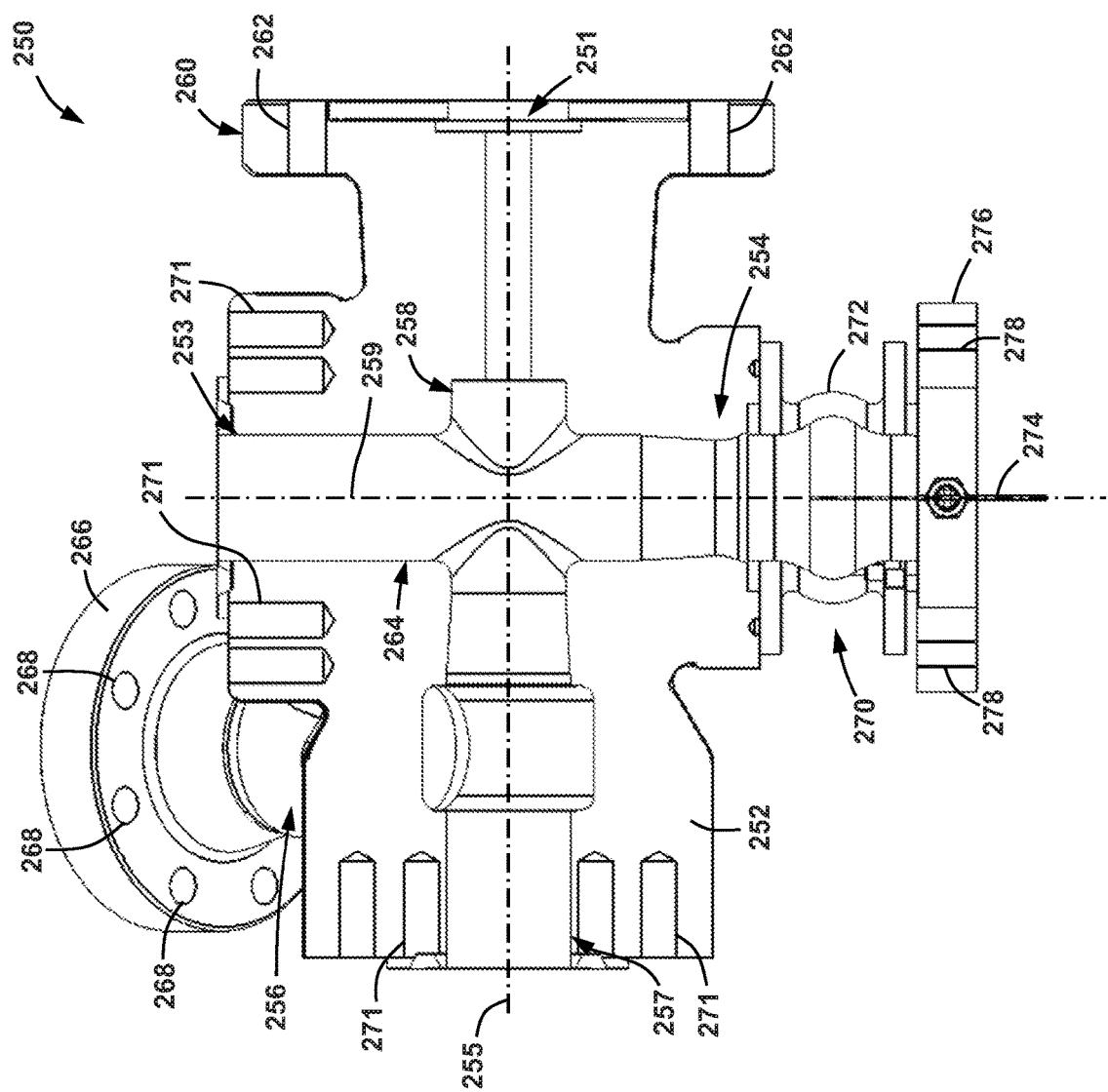
FIG. 18 is a side cross-sectional view of the fluid-end section of the modular pump assembly of FIG. 2.

Referring now to FIG. 18, fluid-end section 250 receives fluid end 221*a* of body 221 of plunger 220 during pumping operations to pressurize a working fluid (e.g., drill mud). Fluid-end section 250 includes a body 252 that includes a working fluid inlet 254, a working fluid outlet 256, a plunger inlet 251, a first access port 253, and a second access port 257. In addition, body 252 defines a first internal passage 258 that extends between plunger inlet 251 and second access port 257 along an axis 255, and a second internal passage 264 that extends between fluid inlet 254 and first access port 253 along an axis 259 that is orthogonal to axis 255 of first internal passage 258. As a result, first and second internal passages 258, 264 intersect one another within body 252 such that access ports 253, 257, fluid inlet 254, fluid outlet 256, and plunger inlet 251 are all in fluid communication with one another.

While not specifically shown, fluid inlet 254 and fluid outlet 256 each include valves that are configured to permit flow in only one direction. For example, fluid inlet 254 may include a valve that is configured to allow fluid to flow into second internal passage 264 via inlet 254 when the pressure within internal passage 264 is below a first predetermined value. Conversely, the valve within the fluid inlet 254 is configured to prevent flow from second internal passage 264 out of body via inlet 254. As another example, fluid outlet 256 may include a valve that is configured to allow fluid to flow from first internal passage 258 out of body 252 via outlet 256 when the pressure within second internal passage 258 is above a second predetermined value. Conversely, the valve within fluid outlet 256 is configured to prevent flow into the first passage 258 via outlet 256. For example, fluid inlet 254 and fluid outlet 256 may be in communication with suction and discharge valves, respectively, that are similar to those disclosed in U.S. Pat. No. 8,220,496, the entire contents of which are incorporated herein by reference for all purposes. In addition, during normal operations, access ports 253 and 257 may be sealed off by blinds or covers (not shown) that are secured to body via coupling members (e.g., bolts, screws, rivets, nails, etc.) inserted within mating apertures 271 extending into body 252 adjacent access ports 253, 257.

Figure 17:
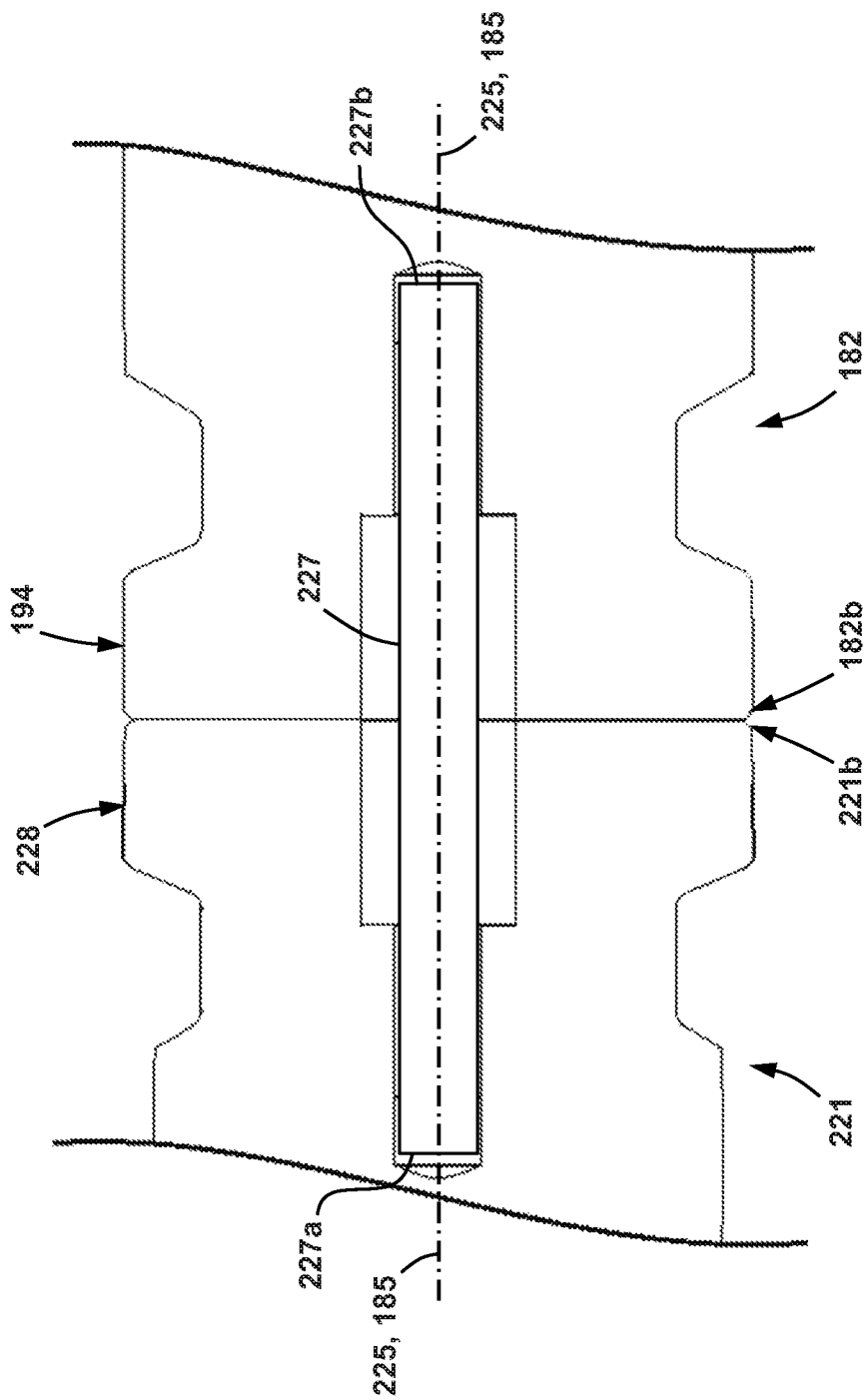
FIG. 17 is an enlarged cross-sectional view showing the coupling between the plunger of FIG. 15 and the central shaft of the moving follower assembly of FIG. 11.

Referring still to FIG. 18, in this embodiment a flow straightener 270 is coupled to body 252 about inlet 254 to substantially straighten the flow of fluids flowing into body 252 via inlet 254 during operations. Flow straightener 270 generally includes a conduit segment 276 that supports a plurality of vanes 274 (only one vane 274 is shown in FIG. 17 for convenience and so as not to unduly complicate the figure). In addition, flow straightener 270 includes a flexible connector 278 that is coupled to and extends between each of the conduit segment 276 and body 252 about inlet 254. Flow straightener 270 may be the same as those disclosed in U.S. Pat. No. 8,220,496, the entire contents of which being previously incorporated herein by reference. Conduit segment 276 includes a plurality of mounting apertures 272 to facilitate coupling between segment 276 and a fluid conduit (e.g., a pipe, hose, etc.) or manifold to receive working fluids from a working fluid source.

As is shown in FIG. 18, body 252 includes a mounting flange 260 disposed about plunger inlet 251 for mounting body 252 to pump assembly 100. Flange 260 includes a plurality of mounting apertures 262 extending therethrough. Similarly, a coupling flange 266 including a plurality of mounting apertures 268 is coupled to body 252 about fluid outlet 256 and is configured to couple fluid outlet 256 to a fluid flow conduit (e.g., pipe, hose, etc.) or a manifold for receiving discharged pressurized working fluid (e.g., drill mud).

Figure 19:
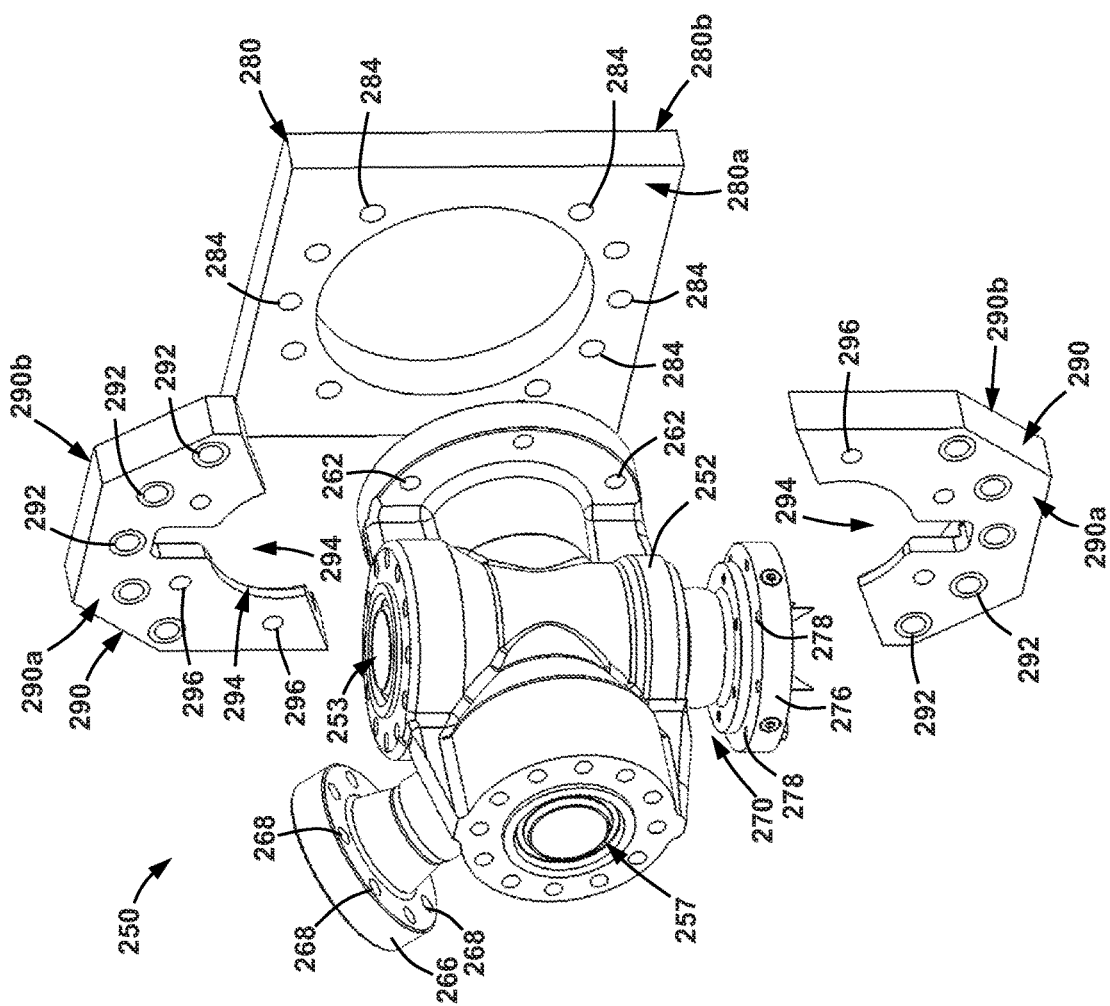
FIG. 19 is an exploded perspective view showing the fluid-end section of FIG. 18 and a pair of claim members for coupling the fluid-end section to an adapter plate.

Referring now to FIG. 19, body 252 of fluid-end section 250 is secured to an adapter plate 280 with a pair of clamping members 290. Adapter plate 280 is a rectangular plate that includes a first side 280*a*, a second side 280*b* opposite first side 280*a*, a central aperture 282 extending through plate 280 between sides 280*a*, 280*b*, and a plurality of mounting apertures 284 circumferentially disposed about central aperture 282. Each clamping member 290 is a generally C-shaped member that includes a first side 290*a* and a second side 290*b* opposite first side 290*a*. In addition, each clamping member 290 includes central recess 294 extending between sides 290*a*, 290*b*, a first plurality of mounting apertures 292, and a second plurality of mounting apertures 296.

To mount body 252 to adapter plate 280, mounting flange 260 on body 252 is received within central aperture 282 in plate 280. Thus, central aperture 280 has a diameter than is equal to or larger than the outer diameter of mounting flange 260. Thereafter, clamping members 290 are installed about body 252 such that second sides 290*b* abut or engage first side 280*a* of adapter plate 280 and body 252 is received within recesses 294. In addition, when clamping members 290 are installed on body 252 and plate 280, mounting apertures 292 on clamping members 290 are aligned with the mounting apertures 284 on plate 280, and mounting apertures 296 on clamping members 290 are aligned with mounting apertures 262 on flange 260. A first plurality of coupling members (not shown) may then be inserted through the aligned apertures 296, 262 to secure flange 260 and body 252 to clamping members 290 and a second plurality of coupling members (not shown) may be inserted through the aligned apertures 292, 284 to secure clamping members 290 to adapter plate 280.

Referring again to FIGS. 2-5, to couple fluid-end section 250 to power-end section 110, plunger 220 is inserted through central aperture 116 in adapter plate 114 and is secured to central shaft 182 of moving follower assembly 180 via connectors 228, 194 in the manner described above. Fluid end 220*a* of plunger 220 is then inserted through plunger inlet 251 into internal flow passage 258 along axis 255, and adapter plate 280 is coupled to adapter plate 114 with a plurality of tie bars 286. Thus, axis 255 of internal flow passage 258 is aligned with axis 105 of pump assembly 100. In particular, in this embodiment, a total of four (4) tie bars 286 extend from second side 280*b* of adapter plate 280 of fluid-end section 250 to first side 114*a* of adapter plate 114 of power-end section 110. While not shown, suitable mounting assemblies are disposed in second side 280*b* of adapter plate 280 and first side 114*a* of adapter plate 114 to receive tie bars 286. For example, in this embodiment, the ends of tie bars 286 are threadably received within suitable threaded mounting apertures in adapter plates 280, 114. In other embodiments, the ends of tie bars 286 may be affixed to sides 280b, 114a of plates 280, 114, respectively by some other method (e.g., welding, adhesive, etc.).

In addition, as is best shown in FIG. 5, a wiper housing 300 is coupled to body 52 of fluid end 250 such that housing 300 is disposed within apertures 282 of adapter plate 280. Housing 300 includes a central throughbore 302 that is coaxially aligned with axis 105. Throughbore 302 includes a plurality (two in this embodiment) annular recesses 304 that are axially spaced from one another along axis 105. Each recess 304 receives a sealing ring 306 therein (e.g., a wiper seal) that sealingly engages with plunger 220 (particularly with radially outer surface 230c of sleeve 230) to thereby prevent the flow of fluids out of or into fluid end 250 along plunger 220 (i.e., into body 252 through plunger inlet 251). As a result, sealing rings 306 form a dynamic seal with plunger 220 (particularly with radially outer surface 230c of sleeve 230) during pumping operations.

Referring now to FIGS. 4 and 5, following assembly of pump assembly 100 as discussed above, motor 120 in cavity 113 of power-end section 110 is energized to rotate rotor 124 about axis 105 as previously described above. Rotation of rotor 124 about axis 105 also drives rotation of torque transfer assembly 200 and cam assembly 140 about axis 105, which thereby results in reciprocation of central shaft 182 of moving follower assembly 180 as previously described above. Because central shaft 182 of moving follower assembly 180 is secured to power end 220b of plunger 220 in the manner described above, reciprocation of central shaft 182 also causes a similar axial reciprocation of plunger 220 along axis 105, which results in an axial reciprocation of fluid end 220a of plunger 220 along internal flow passage 258 of body 252. During this process, as fluid end 220a translates axially away from access port 257 along passage 258 (see progression from FIG. 5 to FIG. 4), the pressure within internal passages 258, 264 decreases thereby causing the discharge valve (not shown) coupled to fluid outlet 256 to close and causing the suction valve (not shown) coupled to fluid inlet 254 to open and allow working fluid (e.g., drilling mud) to flow into body 252 via fluid inlet 254. Conversely, as fluid end 220a of plunger translates axially toward access port 257 (see the progression from FIG. 4 to FIG. 5), the pressure within internal passages 258, 264 increases thereby causing the suction valve (not shown) coupled to inlet 254 to close and causing discharge valve (not shown) to open and allow working fluid (e.g., drilling mud) to flow out of body 252 via fluid outlet 256. Thus, reciprocation of plunger 220 via motor 120 and transmission assembly 130 facilitates the pressurization and pumping of working fluid through body 252 of fluid-end section 250. As plunger 220 reciprocates within body 252 of fluid-end section 250, fluid (e.g., drilling mud) is prevented or at least restricted from flowing out of or into inlet 251 of body 252 along plunger 220 by the dynamic seal formed between sealing rings 306 and the radially outer surface 230c of sleeve 230.

During the pumping operations described above, the motor 120 may be operated such that the rotational speed of rotor 124 and thus cam assembly 140 is slowed as bearing elements 174 on follower assemblies 160, 180 approach and traverse across transition sections 147, 149 along cams 142. This reduction in rotational speed, along with the curved shape of transition sections 147, 149 helps to ensure that bearing elements 174 do not loose contact with outer ends 142a of cams 142 (e.g., due to the change in helical direction between surfaces 146, 148).

While embodiments of the pump assembly 100 disclosed herein have accomplished reciprocal motion of plunger 220 with a rotating cam assembly 140 including cams 142 that have oppositely directed helical surfaces 146, 148, it should be appreciated that a number of different transmission assemblies may be utilized to accomplish the same motion of plunger 220. For example, referring now to FIG. 20, in some embodiments, a double screw shaft 400 may replace transmission assembly 130, previously described.

Figure 20:
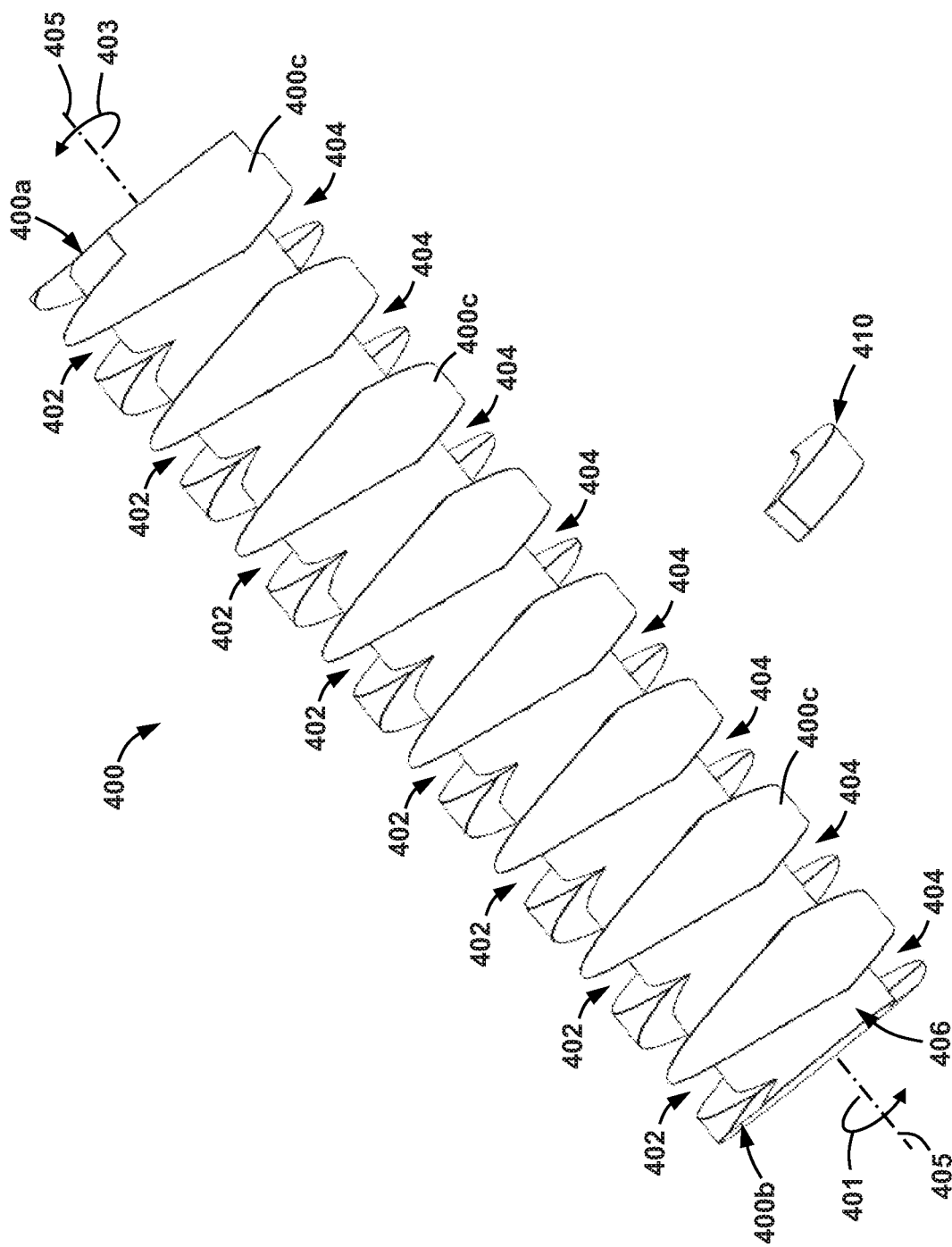
FIG. 20 is a perspective view of an alternative embodiment of a transmission assembly for use within the modular pump assembly of FIG. 2.

As shown in FIG. 20, shaft 400 includes a central or longitudinal axis 405, a first end 400a, a second end 400b opposite first end 400a, and a radially outer surface 400c extending axially between ends 400a, 400b. In addition, shaft 400 includes a pair of helical grooves extending between ends 400a, 400b. Specifically, a first helical groove 402 extends radially inward from radially outer surface 400c and helically between ends 400a, 400b along a first helical direction. A second helical groove 404 also extends radially inward from radially outer surface 400c and helically between ends 400a, 400b along a second helical direction that is opposite the first helical direction of the first helical groove 402. Thus, first and second helical grooves 302, 304, respectively, intersect one another at several points along shaft 400. At second end 400b, helical grooves 302, 304 meet at a transition section 406.

A follower or key member 410 is inserted within one of the grooves 302, 304 and is configured to slide therealong during operations. Key member 410 may be coupled to plunger 220 (e.g., via a support bracket or similar mechanism) such that axial movement of key member 410 along shaft 400 also causes axial movement of plunger 220 along axis 105.

During operations, key member 410 is first disposed within first helical groove 402 and shaft 400 is rotated about axis 405 relative to key member 410 such that key member 410 slidingly engages groove and translates axially along shaft 400. For example, in the embodiment shown, if shaft 400 is rotated about axis 405 in a first direction 30, key member 410 slidingly engages first helical groove 402 and translates axially from first end 400a toward section end 400b. Continued rotation of shaft 400 about axis 405 in direction 401 eventually causes key member 410 to traverse through transition section 406 and into second helical groove 404. Thereafter, continued rotation of shaft 400 about axis 405 in direction 401 causes key member 410 to now sliding engage second helical groove 404 such that member 410 translates axially along shaft 400 from second end 400b to first end 400a. Thus, continuous rotation of shaft 400 in a single direction (e.g., direction 401) about axis 405 results in an axial reciprocation of key member 410 along axis 405 (and thus also a reciprocation of plunger 220).

In this embodiment, only one transition section 406 is shown between first and second helical grooves 302, 304 at second end 400b, such that rotation of shaft 400 about axis 405 in direction 401 allows for continuous reciprocation of key member 410 until key member 410 reaches the end of second helical groove 404 at first end 400a. Thereafter, shaft 400 may then be rotated in a second direction 403 that is opposite first direction 401 to cause sliding engagement between key member 410 and second helical groove 404 and a resulting axial translation of key member 410 toward second end 400b, until key member 410 again enters transition section 406. Thereafter continued rotation of shaft 400 about axis 405 in the second direction 403 causes key member 410 to slide along first helical groove 402 and axially translate along axis 405 toward first end 400a.

Alternatively, in other embodiments, a second transition section between grooves 302, 304 may disposed at first end 400a in addition to the transition section 406 at second end 400b. In these embodiments, continuous rotation of shaft 400 about either of the directions 401, 403 will result in a continuous reciprocation of key member 410 (and thus plunger 220) along axis 405 between ends 400a, 400b, with the axial direction of key member 410 changing after passing through each transition section 406 in the manner described above.

Figure 21:
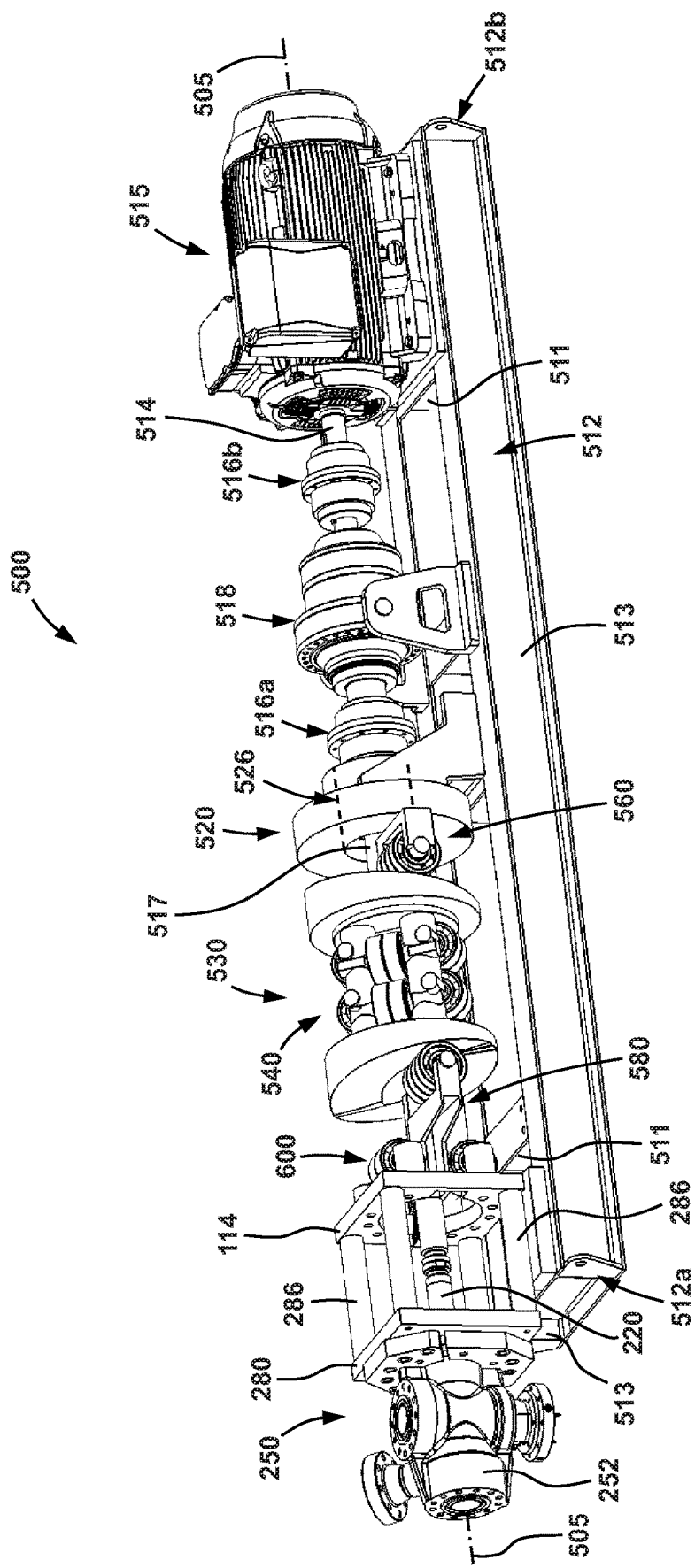
FIG. 21 is a perspective view of another of the modular pumping assemblies for use within the pumping system of FIG. 1 in accordance with at least some embodiments.

Referring now to FIG. 21, where another pump assembly 500 for use in place of any one or more of the pump assemblies 100 within pumping system 10 is shown. Pump assembly 500 shares many of the same components with pump assembly 100, and thus, like components between pump assemblies 100, 500 are represented with like reference numerals, and the description below will focus on the components and features of pump 500 that are different from pump assembly 100. In particular, in this embodiment pump assembly 500 includes a central or longitudinal axis 505, a power-end section 510, and fluid-end section 250 (previously described) axially adjacent the power-end section 510. In addition, as is shown in FIG. 21, each of the power-end section 510 and fluid-end section 250 are supported by a base or skid 512 that includes a first end 512a, a second end 512b opposite first end 512a, a pair of axial support members 513 extending between ends 512a, 512b, and a plurality transverse support members 511 spanning between axially support members 513.

As with pump assembly 100, power-end section 510 drives reciprocation of plunger 220 along axis 505 within fluid-end section 250 to pressurize a working fluid (e.g., drilling mud) during operations. For example, reciprocation of plunger 220 within fluid-end section 250 of pump assembly 500 (or each of a plurality of pump assemblies 500 within pumping system 10) causes flow of working fluid from a suction manifold (e.g., suction manifold 12 in FIG. 1), through pump assembly 500 and into a discharge manifold (e.g., one of the discharge manifolds 14 in FIG. 1).

Referring still to FIG. 21, power-end section 510 includes a motor 515, a bearing support housing 520, and a transmission assembly 530. Motor 515 is disposed on skid 512 at end 512b, transmission assembly 530 is disposed proximate fluid-end section 250, and bearing support housing 520 is disposed on skid 512 axially between transmission assembly 530 and motor 515.

Motor 515 includes an output shaft 514 extending therefrom along axis 505, and is configured to drive rotate shaft 514 about axis 505 during operations. Motor 515 may comprise any suitable motor for rotating a shaft about an axis (e.g., shaft 514 about axis 505), such as, for example, an electric motor, a hydraulic motor, an internal combustion engine, etc. Output shaft 514 is coupled to a driver shaft 517 that, as will be described in more detail below, drives rotation of a cam assembly 540 within transmission assembly 530 during operations. In this embodiment, output shaft 514 is coupled to driver shaft 517 via a pair of couplings 516a, 516b, and a gear box 518 axially disposed between couplings 516a, 516b. Thus, a first of the couplings 516a is axially disposed between gear box 518 and output shaft 514, and a second of the couplings 516b is axially disposed between gear box 518 and bearing support housing 520. Gear box 518 includes one or more internal gears (e.g., planetary gears—not shown) that convert the rotational speed of shaft 514 by motor 515 into a desired rotational speed of driver shaft 517 for driving reciprocation of plunger 220 within fluid-end section 250. As a result, during operations, shafts 514, 517 may rotate at different speeds during operations.

Referring still to FIG. 21, bearing support housing 520 includes a central cavity 526 extending axially therethrough that houses and supports one or more bearings (e.g., radial bearings—not shown) therein for supporting the rotation of driver shaft 517 during operations. Bearing support housing 520 is fixed to skid 512, and particularly to axial support members 513 via a mounting bracket 524, such that bearing support housing 520 is disposed between second coupling 516b and transmission assembly 530, and receives driver shaft 517 through central cavity 526. In addition, bearing support housing 520 includes a radially extending annular support surface 522 that, as will be described in more detail below, supports one of the follower assemblies (e.g., fixed follower assembly 560) of transmission assembly 530.

Transmission assembly 530 includes a cam assembly 540, and a pair of follower assemblies 560, 580. As will be described in more detail below, during operations, cam assembly 540 is driven to rotate about axis 505 by driver shaft 517 to thereby cause reciprocation of plunger 220 along axis 505 via follower assemblies 560, 580.

Figure 22:
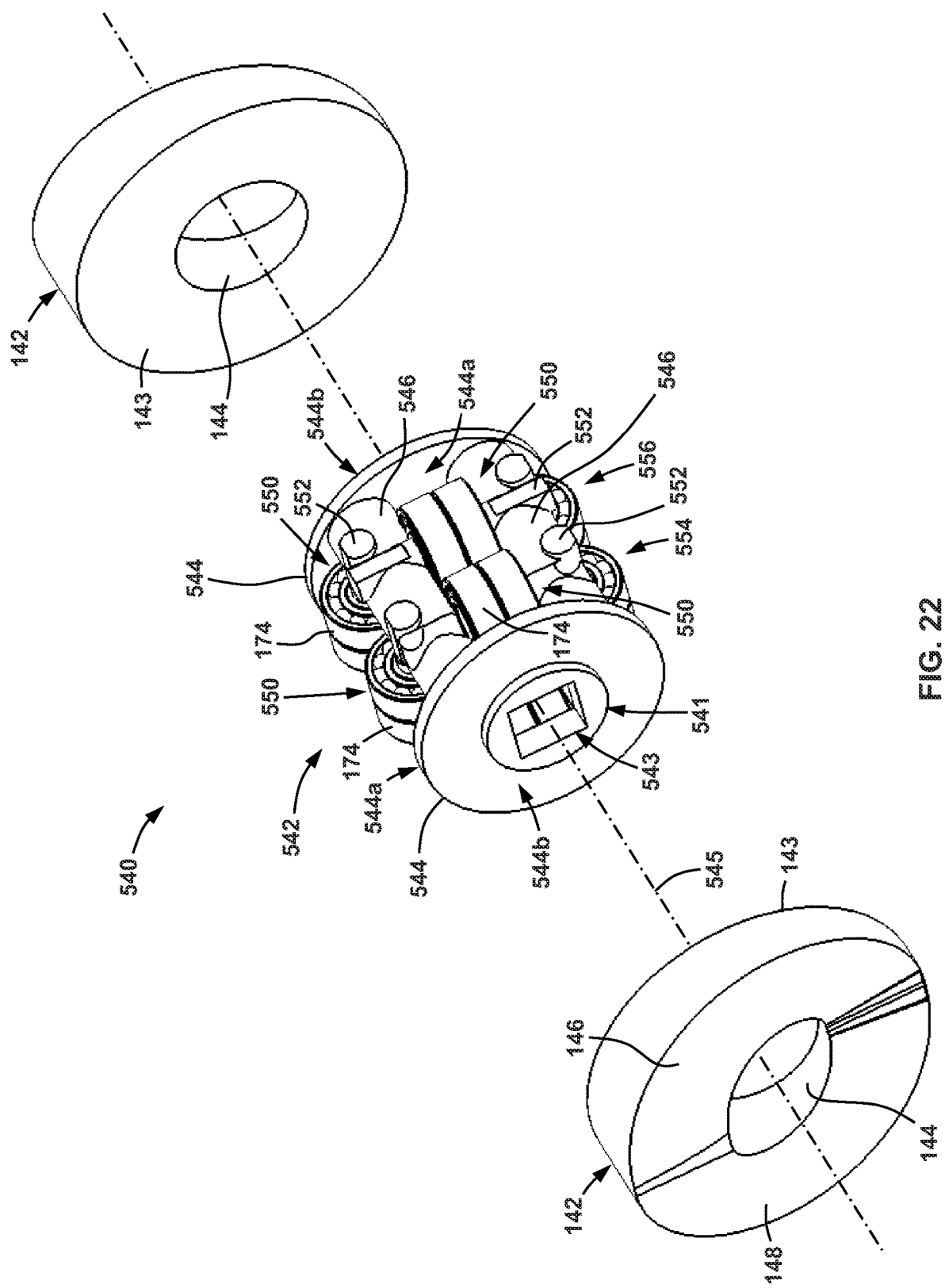
FIG. 22 is an exploded perspective view of the cam assembly of the pump assembly of FIG. 21.

Referring now to FIG. 22, cam assembly 540 includes a pair of the cams 142 previously described above, coupled to one another and axially separated by a torque transfer assembly 540 along a central axis 545 that is aligned with axis 505 during operations. Torque transfer assembly 542 includes a pair of end plates 544 that are coupled to one another with a plurality of tie bars 546. Each end plate 544 includes a first or inner side 544a, and a second or outer side 544b opposite inner side 544a. Outer side 544b includes a cylindrically shaped, axially extending projection 541. In addition, each end plate 544 includes a central aperture 543 extending both through projection 541 and axially between sides 544a, 544b. In this embodiment, aperture 543 is rectangular (e.g., square) in shape; however, other shapes are possible in other embodiments.

Each of the tie bars 546 extend axially between inner sides 544a of end plates 544 such that plates 544 are axially separated by tie bars 546. In addition, tie bars 546 are uniformly, angularly spaced about axis 545 such that each tie bar 546 is equally angularly spaced from each immediately angularly adjacent tie bar 546 about axis 545. In this embodiment, there are a total of four (4) tie bars 546 extending axially between inner sides 544a of end plates 544, such that each tie bar 546 is spaced approximately 90° from each immediately angularly adjacent tie bar 546 about axis 545. When tie bars 546 couple end plates 544 to one another as shown in FIG. 22, central apertures 543 of each end plate 544 are axially aligned with one another along axis 545.

Referring still to FIG. 22, a plurality of roller assemblies 550 are coupled to tie bars 546 to support relative axial engagement of cam assembly 540 with driver shaft 517 during operations. In particular, each roller assembly 550 includes a central shaft 552 and one or more (in this case two) bearing elements 174 (previously described) rotatably mounted central shaft 552. Each shaft 552 is coupled to and spans between two of the tie bars 546 such that each bearing element 174 is configured to rotate about a corresponding axis (i.e., an axis extending along the corresponding shaft 552) that is disposed within a plane that is orthogonal or perpendicular to the central axis 545 (and thus also the central axis 505 of pump assembly 500). In this embodiment, roller assemblies 550 are disposed in one of two axially adjacent rows 554, 556. Because there are a total of four (4) tie bars 546, each row 554, 556 includes a total of four (4) uniformly angularly spaced roller assemblies 550. Thus, within each row 554, 556, each roller assembly 550 is angularly spaced approximately 90° about axis 545 from each immediately angularly adjacent roller assembly 550.

Figure 23:
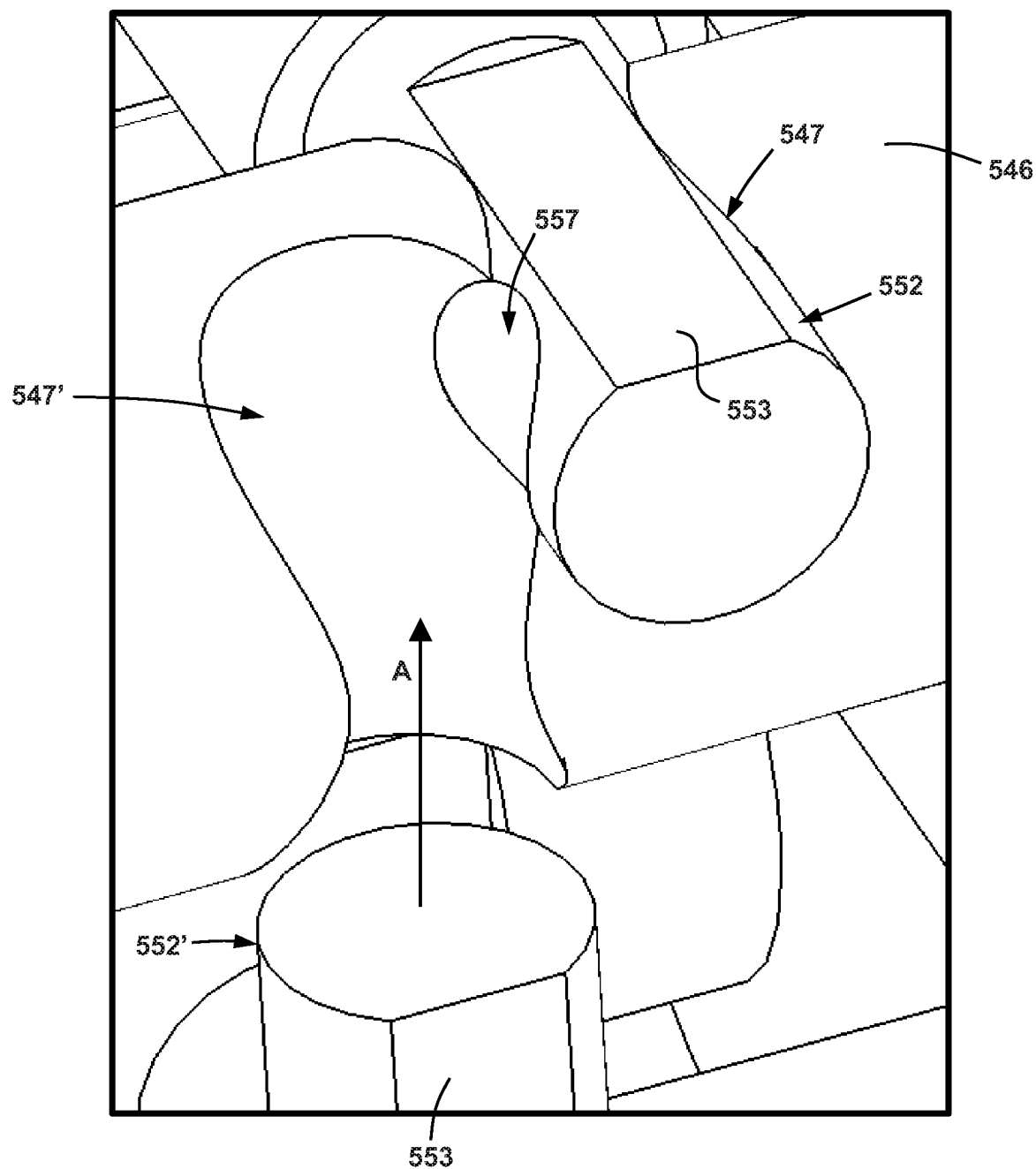
FIG. 23 is an enlarged perspective view of the connection between a pair of the roller assemblies and the tie bars of the torque transfer assembly of the cam assembly of FIG. 22.

Referring now to FIGS. 22 and 23, in this embodiment each of the shafts 552 of roller assemblies 550 within each row 554, 556 are interlocked with one another such that loads are substantially distributed through and borne collectively by the roller assemblies 550 within each row 554, 556 during operations. In particular, as shown in FIG. 23, shafts 552 of roller assemblies 550 are inserted within cylindrical recesses 547 extending into tie bars 546. Bolts, screws or other suitable coupling members are then inserted through shafts 550 and into tie bars 546 to further secure shafts 552 within recesses 547 during operations. In particular, while not particularly shown, in this embodiment, one or more screws may be inserted through planar mounting surfaces 553 on shafts 552 and into recesses 547 of tie bars 546. As is also shown in FIG. 23, each shaft 552 includes a cylindrical notch 557 extending therein at one of the ends thereof. When each shaft 552 is inserted within a pair of cylindrical recesses 547 in tie bars 546, notch 557 is substantially aligned within one of the recesses 547 extending in one of the tie bars 546 (the recess 547 that is aligned with notch 557 is designated as recess 547' in FIG. 23). As a result, when the shaft 552' of an adjacent roller assembly 550 is inserted within the recess 547' (e.g., along direction A as shown in FIG. 23), the outer surface of the shaft 552' slidingly engages each of the cylindrical recess 547' and the cylindrical notch 557 on shaft 552. Accordingly, in at least some embodiments, it is preferable that the curvature of notches 557 substantially matches the curvature of recesses 547. While not shown in FIG. 23, the opposite end of shaft 552' includes a similar notch 557 that slidably receives an end of another shaft (e.g., shaft 552) of still another of the roller assemblies 550 in the same manner as shown in FIG. 23. As a result, for each row 554, 556, the shafts 552 of each roller assembly 550 are interconnected or interlocked such that when a force or load is experienced by one of the roller assemblies (e.g., via one or more of the bearing elements 174), the load is spread amongst and borne by each of the roller assemblies 550 (e.g., at shafts 552). Without being limited to this or any other theory, this interlocking of the shafts 552 of roller assemblies 550 within each row 554, 556 reduces the loads borne by the coupling members (not shown) securing shafts 552 within recesses 547 in tie bars 546, so that fewer and/or smaller coupling members may be used.

Figure 24:
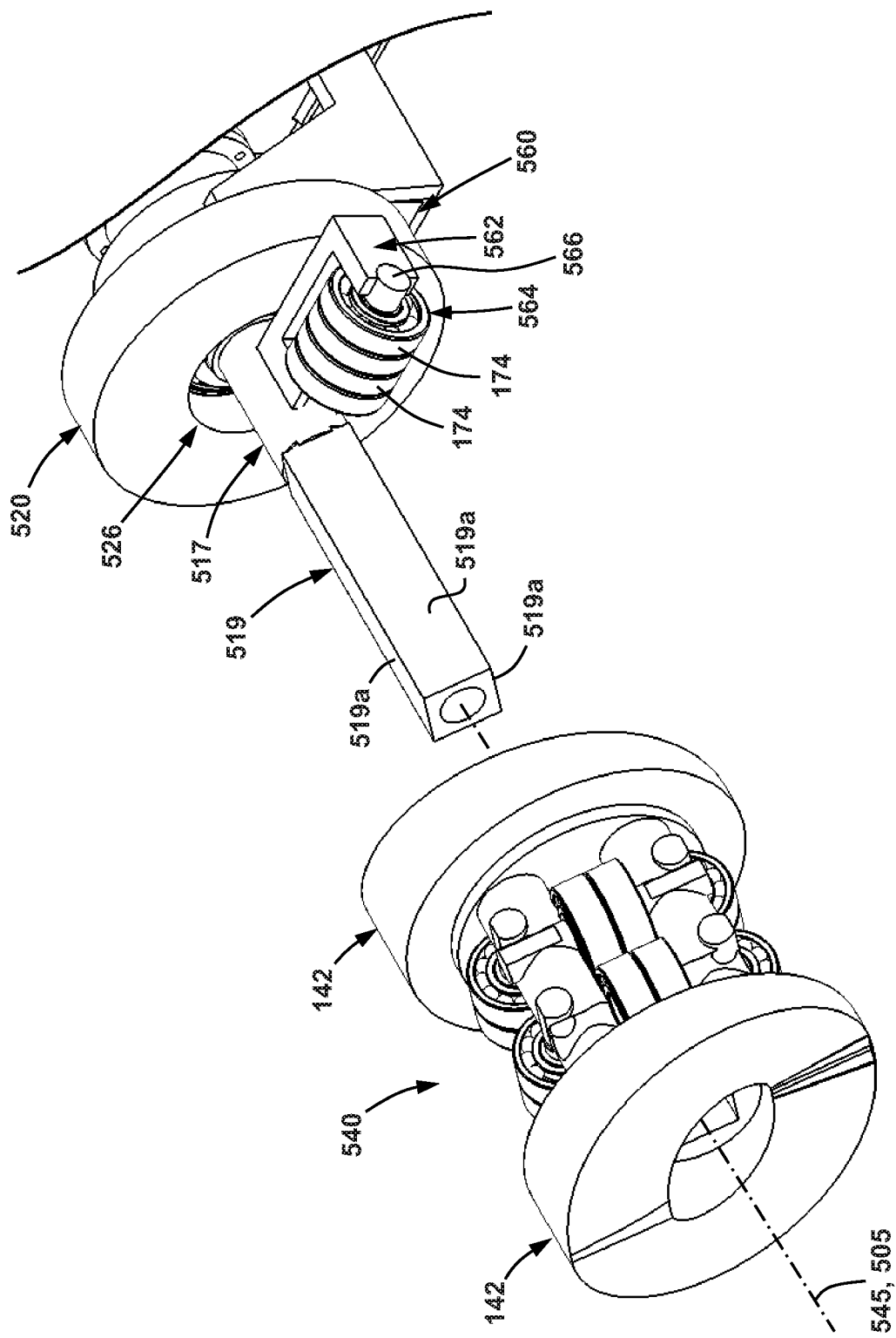
FIG. 24 is a perspective view showing the installation of the cam assembly of FIG. 22 on to a driver shaft coupled to the motor of the pump assembly of FIG. 21.

Referring now to FIG. 24, cam assembly 540 is constructed by mounting each of the cams 142 to one of the end plates 544 of torque transfer assembly 542 so the transition sections 147, 149 of cams 142 in assembly 140 are circumferentially aligned with one another about axis 545 in the same manner as previously described above for cam assembly 140. In particular, each cam 142 is mounted to a corresponding one of the end plates 544 such that throughbore 144 of each cam 144 receives the projection 541 of the corresponding plate 544 and annular planar surface 143 of each cam 142 abuts or engages with outer side 544b of the corresponding plate 544. Cams 142 may be secured to plates 544 of torque transfer assembly 542 in any suitable manner such as, for example, with coupling members (e.g., bolts, screws, rivets, etc.), welding, adhesive, etc.

Thereafter, as is also shown in FIG. 24, the constructed cam assembly 540 is installed onto driver shaft 517 by inserting a rectangular end portion 519 of driver shaft 517 through the aligned apertures 543 in end plates 544 along axis 505. Rectangular end portion 519 includes a plurality of axially extending planar surface 519a, which in this case includes a total of four (4) such axially extending planar surface 519a. As a result, as rectangular portion 519 of driver shaft 517 is inserted through the aligned apertures 543 in plates 544, bearing elements 174 of roller assemblies 550 engage with surface 519a. In addition, in this embodiment, the size of apertures 543 in end plates 544 is larger than rectangular portion 519 of driver shaft 517 such that there is a clearance between rectangular portion 519 and apertures 543. In some embodiments, the clearance between rectangular portion 519 and apertures 543 ranges from 0.05 inches to 0.5 inches, and in at least some embodiments substantially equals 0.1 inches. Without being limited to this or any other theory, the clearance between rectangular portion 519 of driver shaft 517 and apertures 543 helps to ensure that substantially all of the contact between rectangular portion 519 and torque transfer assembly 542 occurs between bearing elements 174 of roller assemblies 550 and planar surfaces 519a of portion 519.

Thus, during operations, rotation of driver shaft 517 about axis 505 causes engagement between planar surfaces 519 on rectangular end portion 519 and bearing elements 174 of roller assemblies 550 so that cam assembly 540 is also driven to rotate about axis 505. In addition, because bearing elements 174 are rotatably disposed along shafts 552 as previously described, cam assembly 540 is also free to traverse axially along axis 505 relative to driver shaft 517 during operations.

Referring again to FIG. 21, follower assemblies 560, 580 include fixed follower assembly 560 and a movable follower assembly 580. Fixed follower assembly 560 is axially disposed between cam assembly 540 and bearing support housing 520 and movable follower assembly 580 is axially disposed between cam assembly 540 and fluid-end section 250.

Referring now to FIGS. 21 and 24, fixed follower assembly 560 includes a mounting bracket 562 and a bearing member 564 mounted to mounting bracket 562. Bearing member 564 includes a central shaft 566 including a central axis 565 that is secured to mounting bracket 562. A plurality of bearing elements 174 are rotatably mounted to central shaft 566 such that each bearing element 174 is configured to rotate about axis 565 during operations. Mounting bracket 562 is secured to annular planar mounting surface 522 of bearing support housing 520 such that central axis 565 of shaft 566 is generally perpendicular or orthogonal to axis 505 of pump assembly 500. Thus, when cam assembly 540 is installed onto driver shaft 517 in the manner described above, one of the cams 142 engages with bearing elements 174 on fixed follower assembly 560. As a result, during operations, as shaft 517 and cam assembly 540 rotate about axis 505, bearing elements 174 rollably engage with surfaces 146, 148, and transition sections 147, 149 on the cam 142 in substantially the same manner as described above for fixed follower assembly 160 and cam assembly 140 in pump assembly 100. Therefore, rotation of cam assembly 540 about axis 505 causes axial translation of cam assembly 540 relative to shaft 517 along axis 505 via the engagement between the bearing elements 174 on fixed follower assembly 560 and surfaces 146, 148 on cam 142 during operations.

Figure 25:
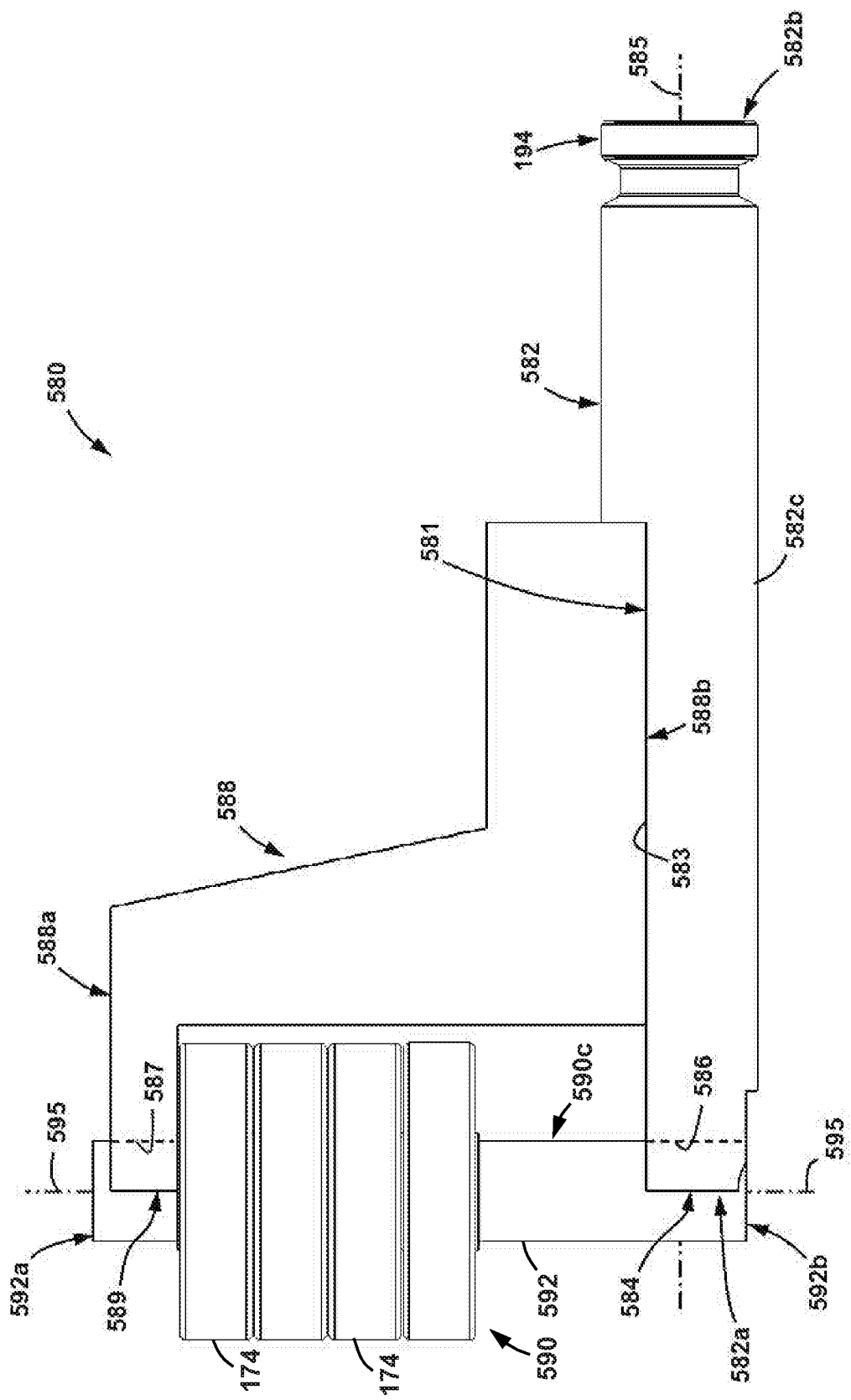
FIG. 25 is a side view of the movable follower assembly of the transmission assembly of the pump assembly of FIG. 21.

Referring now to FIG. 25, movable follower assembly 580 includes a central shaft 582, a support bracket 588, and a bearing member 590. Central shaft 582 is an elongate member that includes a central or longitudinal axis 585 that is substantially aligned with axis 505 during operations. In addition, central shaft 582 includes a first or inner end 582a, a second or outer end 582b opposite inner end 582a, and a radially outer surface 582c extending axially between ends 582a, 582b. Inner end 582a includes an axially extending recess 584 that includes a concave cylindrical mounting surface 586 extending cylindrically about a radius of axis 585 (i.e., a line extending orthogonally to axis 585). In addition, shaft 582 includes a mounting recess 581 extending radially inward from radially outer surface 582c that defines an axially extending planar mounting surface 583 that extends axially from inner end 582a of central shaft 582 with respect to axis 585. Further, outer end 582b includes connector 194 that, as will be described in more detail below, is configured to engage and mate with a corresponding connector on plunger 220 in the same manner as previously described above (e.g., see FIG. 17).

Support bracket 588 includes a first or upper end 588a, and a second or lower end 588b opposite upper end 588a. Lower end 588b is engaged with and secured to planar mounting surface 583 on central shaft 582 such that upper end 588a is distal to central shaft 582. In some embodiments, lower end 588b is engaged with planar mounting surface 583 with a coupling member (e.g., bolt, rivet, screw, nail, etc.); however, in other embodiments, lower end 588b may be engaged with surface 583 through some other method (e.g., welding, adhesive, etc.). Upper end 588a includes a recess 589 that defines a concave cylindrical mounting surface 587. Lower end 588b is mounted to planar mounting surface 583 of central shaft 582 such that concave cylindrical mounting surface 587 extends cylindrically about a radius of axis 585. In particular, in this embodiment, both concave cylindrical mounting surfaces 586, 587 extend cylindrically about the same radius of axis 585.

Bearing member 590 includes an elongate shaft 592 and a plurality of bearing elements 174 rotatably mounted to shaft 592. Shaft 592 includes a central or longitudinal axis 595, a first or upper end 592a, a second or lower end 592b opposite upper end 592a, and a radially outer surface 592c extending axially between ends 592a, 592b. Radially outer surface 592c is received within recess 589 and engaged and secured to concave cylindrical mounting surface 587. In addition, radially outer surface 592c is also received within recess 584 and engaged and secured to concave cylindrical mounting surface 586. Thus, axis 595 is aligned with the axis of curvature of each of the concave cylindrical mounting surfaces 586, 587, and bearing elements 174 are axially disposed between recesses 587, 589 along axis 595. During operations, bearing elements 174 are free to rotate about axis 595 relative to shaft 592. As will be described in more detail below, bearing elements 174 engage with surfaces 146, 148 on one of the cams 142 to facilitate axial movement of plunger 220 during operation of pump assembly 500.

Figure 26:
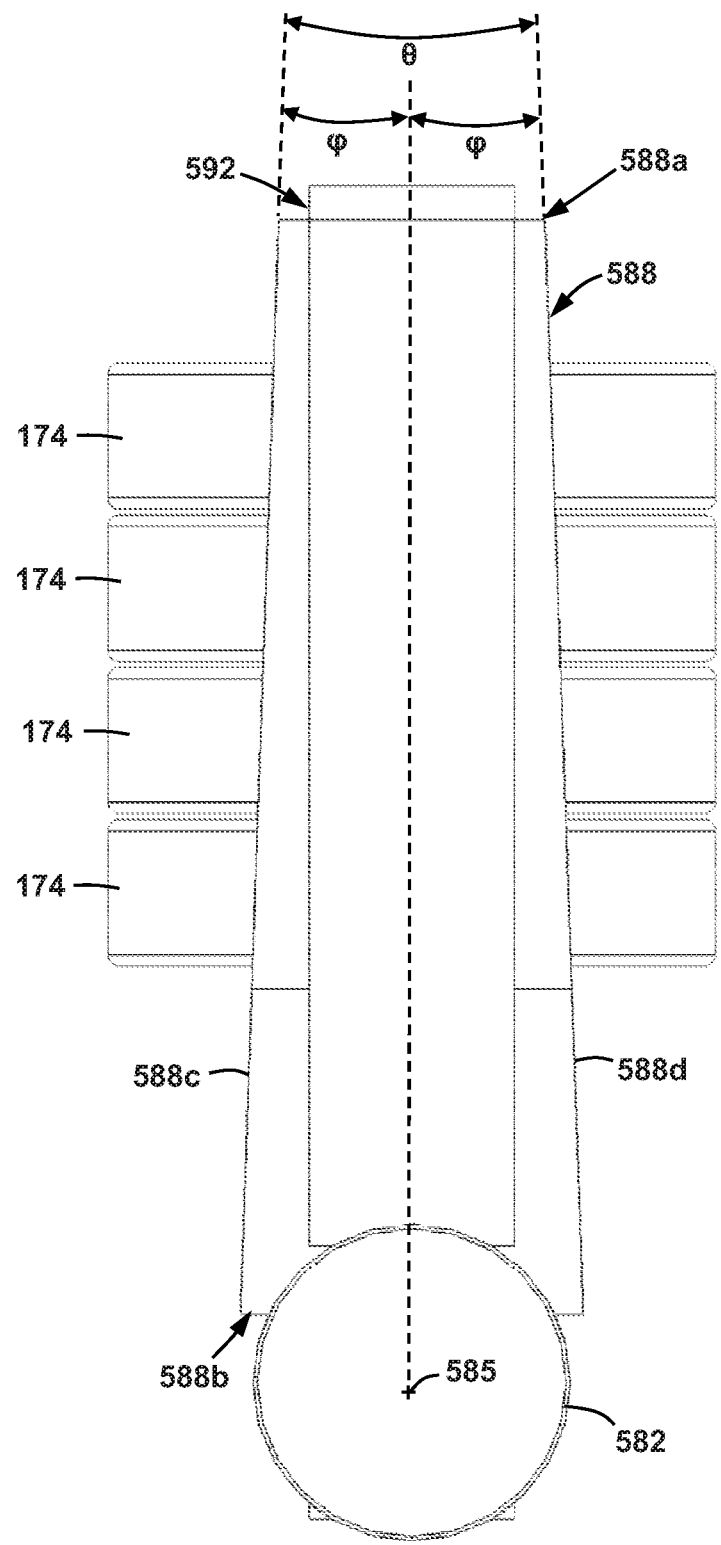
FIG. 26 is a front view of the movable follower assembly of FIG. 25.

Referring now to FIG. 26, support bracket 588 also includes a first planar side 588c extending between ends 588a, 588b, and a second planar side 588d opposite first planar side 588c and also extending between ends 588a, 588b. Planar sides 588c, 588d extend at a non-zero angle φ relative to a radius of axis 585 of central shaft 582. In addition, planar sides 588c, 588d also extend at an angle θ relative to one another which is equal to two times (2×) the angle φ (i.e., θ=2φ). In some embodiments, the angle φ may range from 1° to 10°, and in some of these embodiments may equal 2°. As a result, in these embodiments, the angle θ may range from 2° to 20°, and in some of these embodiments may equal 4°.

Referring again to FIG. 21, during operations, bearing elements 174 on movable follower assembly 560 engage with surfaces 146, 148 on one of the cams 142 of cam assembly 540 in the same manner as that described above for the movable follower assembly 180 in pump assembly 100. Thus, as cam assembly 540 is rotated about axis 505 via shaft 517 and torque transfer assembly 542, movable follower assembly 580 is reciprocated axially with respect to axis 505. To support this axial translation of movable follower assembly 580, a support assembly 600 is coupled to adapter plate 114 (wherein plate 114 is generally the same as previously described above) that engages with movably follower assembly 580 during operations.

Figure 27:
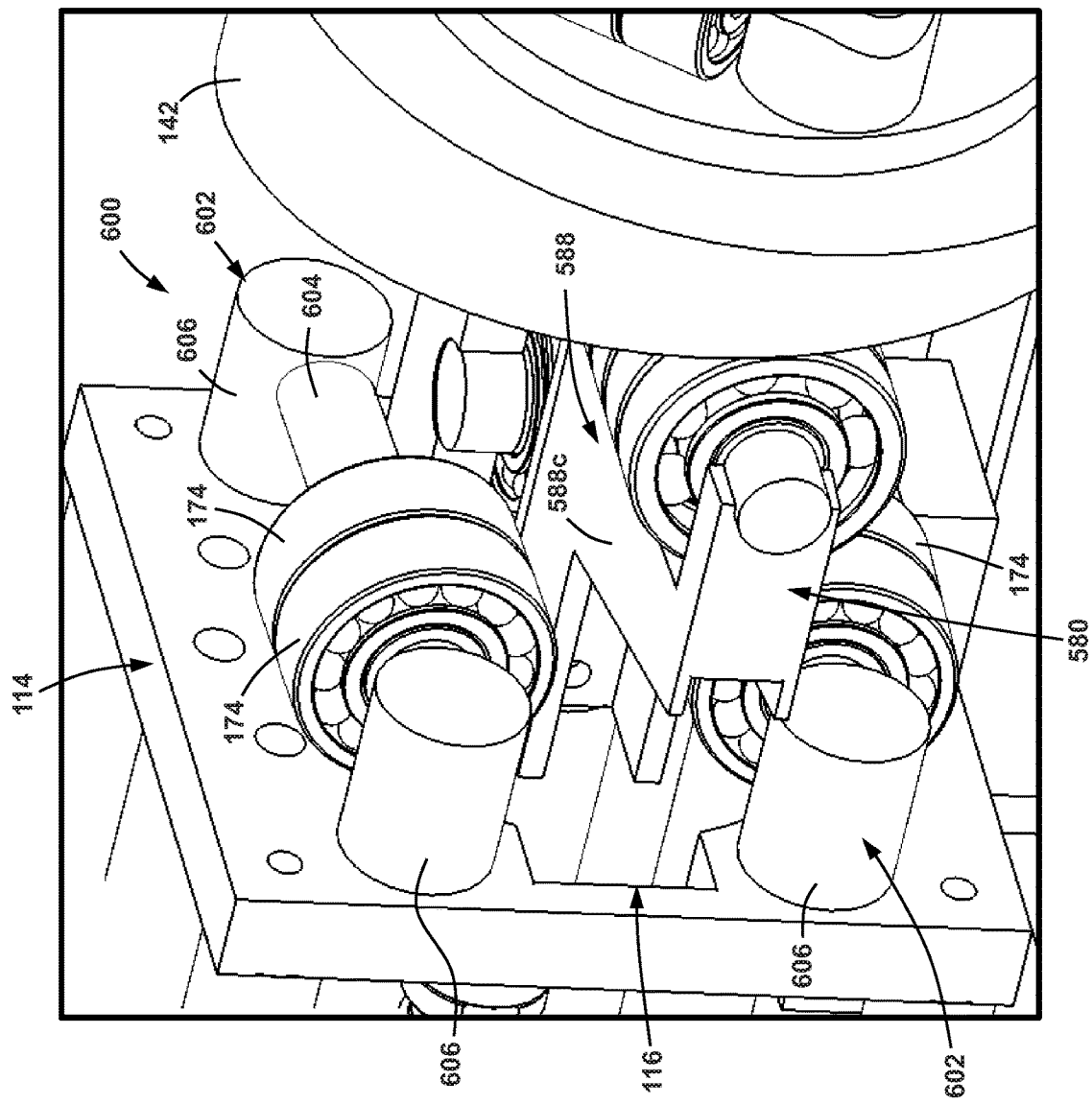
FIG. 27 is an enlarged perspective view of the support assembly for supporting axial translation of the movable follower assembly within the pump assembly of FIG. 21.
Figure 28:
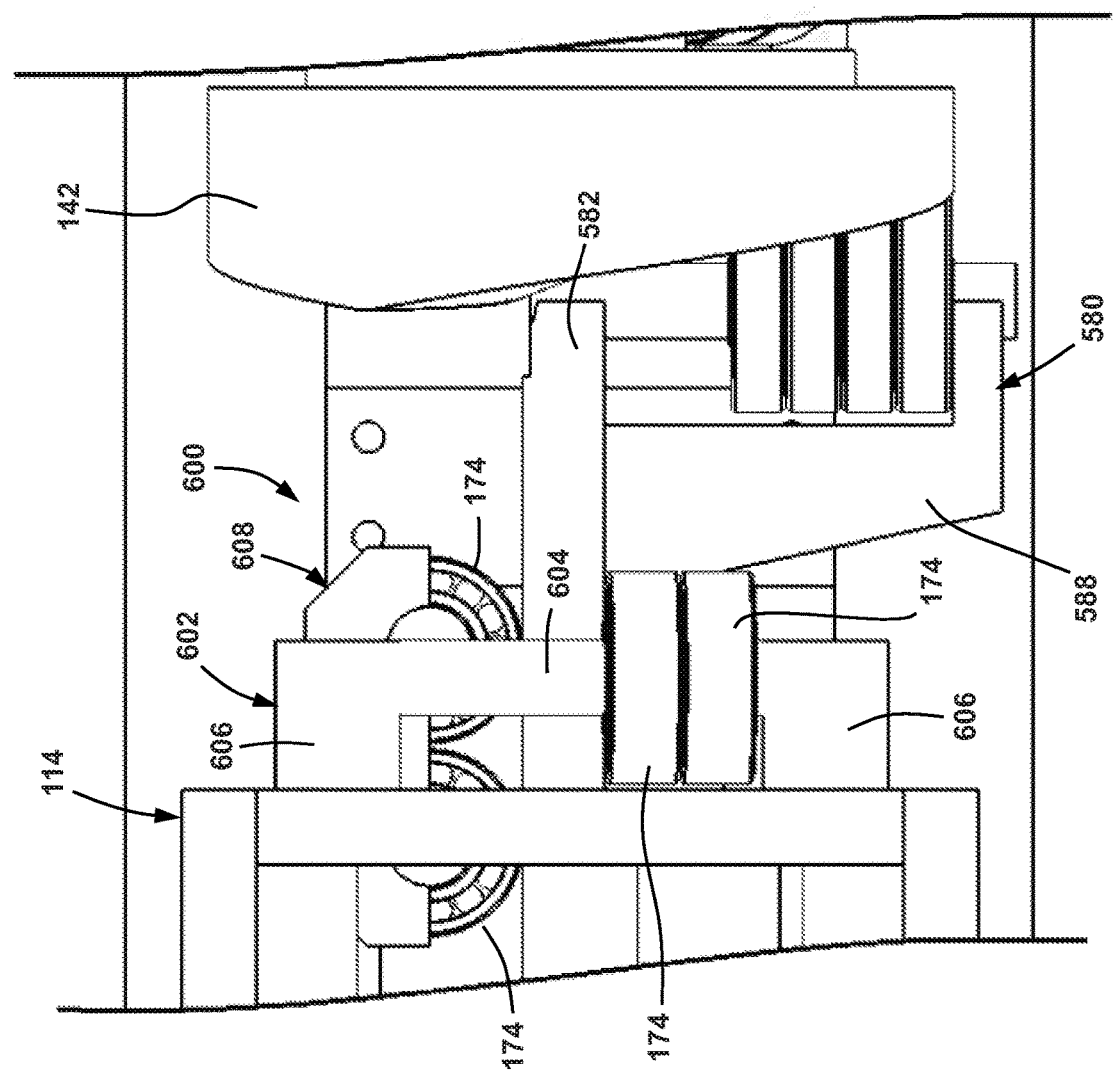
FIG. 28 is a top view of the support assembly of FIG. 27.
Figure 29:
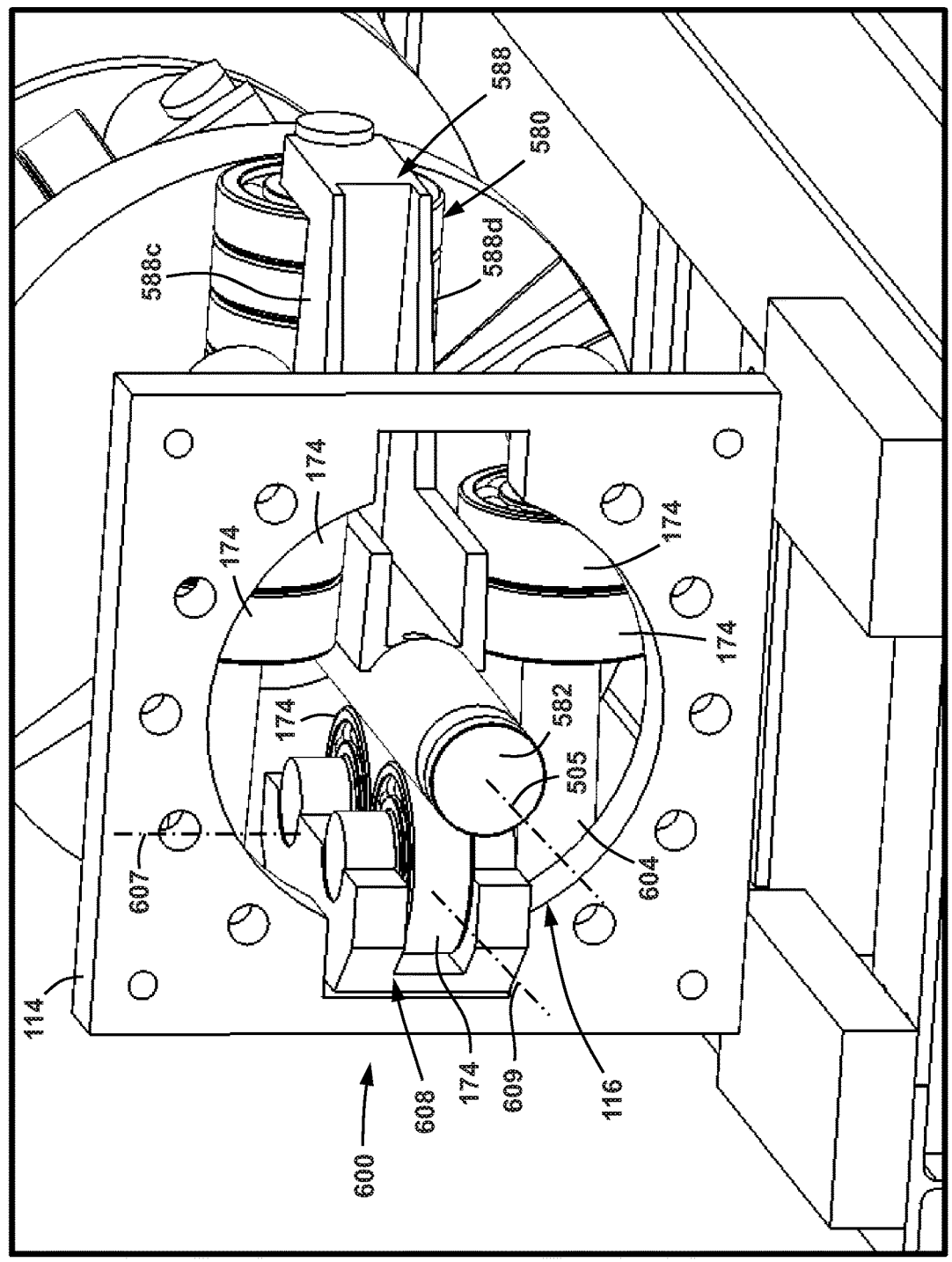
FIG. 29 is another enlarged perspective view of the support assembly of FIG. 27.
Figure 30:
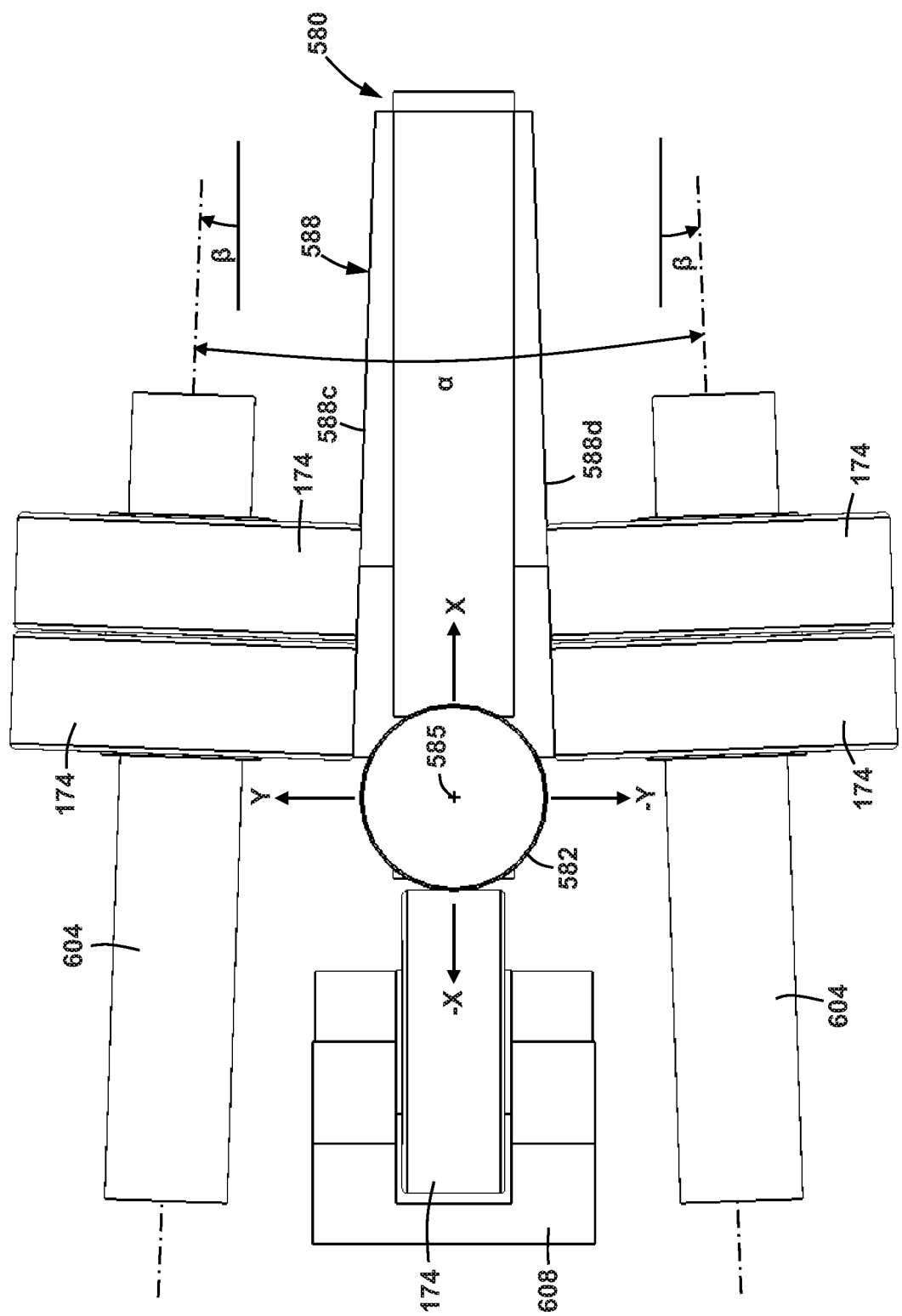
FIG. 30 is a schematic view showing the engagement between the support assembly of FIG. 27 and the movable follower assembly of FIG. 25.

Referring now to FIGS. 27-29, support assembly 600 includes a pair of roller assemblies 602 that each include a central shaft 604 that is further coupled to adapter plate 114 with a pair of bosses 606. A pair of bearing elements 174 are rotatably disposed on each central shaft 602 such that each bearing element may rollably engage with one of the planar sides 588c, 588d of support bracket 588 on movable follower assembly 580. Referring briefly to FIG. 30 (where support assembly 600 and movable follower assembly 580 are schematically shown in space uncoupled to other components of pump assembly 500 for convenience), each shaft 604 includes a central axis 605 that is disposed at a non-zero angle β relative to a radius of axis 585 (and thus also a radius of axis 505). In addition, the axes 605 of shafts 604 also extend at an angle α relative to one another that is equal to two time (2×) the angle β (i.e., α=2β). The angles (e.g., angles α and β) of axes 605 of shafts 604 is chosen to correspond with the angle of planar sides 588c, 588d of support bracket 588 on movable follower assembly 580. Thus, in some embodiments, the angle β may range from 1° to 10°, and in some of these embodiments may equal 2°. As a result, in these embodiments, the angle α may range from 2° to 20°, and in some of these embodiments may equal 4°. Without being limited to this or any other theory, the angles φ, θ, of planar sides 588a, 588d, and the angles β, α of axes 605 of shafts 604 allows bearing elements 174 to resist a lateral deformation of shaft 582 in a first direction X and in second and third directions Y and −Y (with third −Y being opposite second direction Y), respectively, as shown in FIG. 30.

Referring now to FIGS. 28 and 29, support assembly 600 also includes a shoe member 608 that is mounted within aperture 116 of adapter plate 114 and rotatably supports a pair of axially arranged bearing elements 174 (note: plunger 220 and fluid-end section 250 are omitted in FIG. 29 to provide a better view of adapter plate 114, movable follower assembly 580, and support assembly 600). As is best shown in FIG. 29, shoe 608 is positioned within aperture 116 such the bearing elements 174 rotatably supported by shoe 608 engage with shaft 582 on a side opposite the support bracket 588. Referring briefly again to FIG. 30, without being limited to this or any other theory, during operations, the bearing elements 174 of shoe 608 resist lateral deformation of shaft 582 in a fourth direction −X that is opposite the first direction X.

Referring again to FIGS. 28 and 29, in at least some embodiments, shoe 608 is pivotably coupled to aperture 116 such that shoe 608 may pivot (i.e., rotate) slightly about a first axis 607 and a second axis 609 orthogonal about the first axis 607. The first axis 607 lies within a plane (not shown) passing perpendicularly or orthogonally through central axis 505, and the second axis 609 lies within a plane (not shown) that also includes the central axis 505. However, in this embodiment, the coupling between shoe 608 and aperture 116 substantially prevents pivoting or movement of shoe 608 about a radius of axis 505. Without being limited to this or any other theory, the pivoting of shoe about axes 607, 609 allows bearing elements 174 to maintain sufficient contact with radially outer surface 582c of shaft 582 despite machining tolerances and other variances.

Referring again to FIGS. 27-29, during operations, as movable follower assembly 580 is reciprocated along axis 505 via rotation of cam assembly 540 and engagement of surfaces 146, 148 on cams 140 with bearing elements 174 on follower assemblies 560, 580 as previously described above, the axial movement of movable follower assembly 580 is radially supported by bearing elements 174 in support assembly 600. Specifically, this axial movement of movable follower assembly 580 is supported through engagement of the bearing elements 174 on roller assemblies 602 with support bracket 588 and engagement of the bearing elements 174 on shoe member 608 with shaft 582.

Referring now to FIG. 21, following assembly of pump assembly 500 as discussed above, plunger 220 is coupled to shaft 582 of movable follower assembly 580 (via connector 194—see FIG. 17) and motor 515 is energized to rotate output shaft 514 and driver shaft 517 about axis 505 as previously described above. Rotation of shafts 514, 517 about axis 505 also drives rotation of torque transfer assembly 542 and cam assembly 540 about axis 505 via the engagement between rectangular end portion 519 and roller assemblies 550 in torque transfer assembly 542 as previously described. In addition, the rotation of cam assembly 540 also results in the reciprocation of central shaft 582 of follower assembly 580 along axis 505 due to the engagement of surfaces 146, 148 on cams 142 and bearing elements 174 of follower assemblies 560, 580 as previously described above. Because central shaft 582 of moving follower assembly 580 is secured to power end 220b of plunger 220 in the manner described above, reciprocation of central shaft 582 also causes a similar axial reciprocation of plunger 220 along axis 505, which results in an axial reciprocation of fluid end 220a of plunger 220 within body 252 (see FIGS. 4 and 5) of fluid-end section 250 to further cause the pressurization of fluid therein in the same manner as previously described above with respect to pump assembly 100.

During the pumping operations described above, the motor 515 may be operated such that the rotational speed of shafts 514, 517 and thus cam assembly 540 is slowed as bearing elements 174 on follower assemblies 560, 580 approach and traverse across transition sections 147, 149 along cams 142. This reduction in rotational speed, along with the curved shape of transition sections 147, 149 helps to ensure that bearing elements 174 do not loose contact with outer ends 142a of cams 142 (e.g., due to the change in helical direction between surfaces 146, 148).

Therefore, through use of a pumping system employing a plurality of modular pump assemblies in accordance with the embodiments disclosed herein (e.g., pumping system 10 and module pump assemblies 100, 500), the number and specific arrangement of the pumping system may be readily and easily changed to accommodate the conditions and requirements of the drilling operation being employed. Thus, through use of such a pumping system, the working fluid pumping operations are more efficient and adaptable, which thereby increases the efficiency of the drilling operations overall and reduces the costs required therefor.

Figure 31:
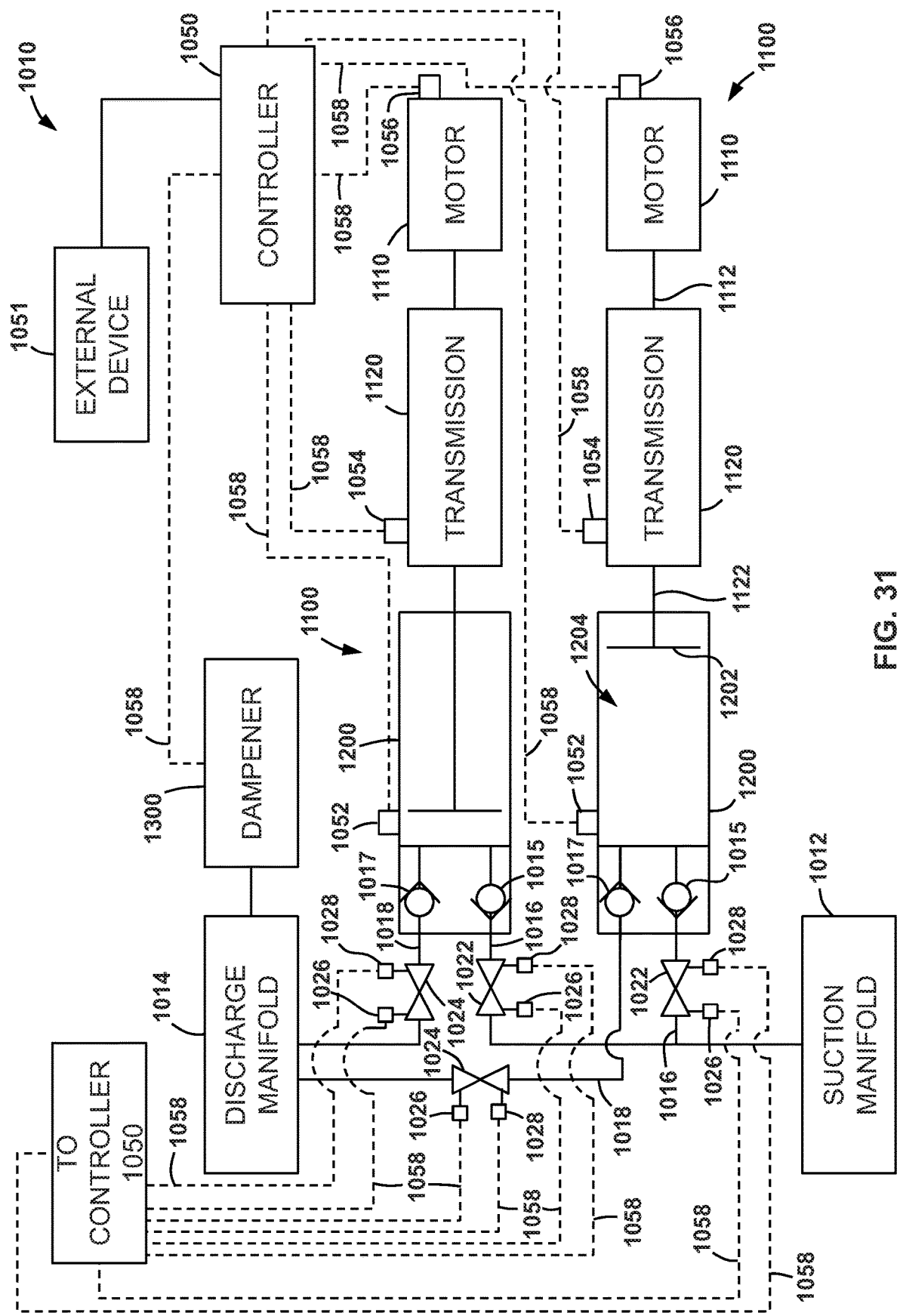
FIG. 31 is a schematic of a pumping system for pressurizing a working fluid in accordance with at least some further embodiments disclosed herein.

In still further embodiments in accordance with principles disclosed above and elsewhere herein, and referring to FIG. 31, a pumping system 1010 for pressurizing a working fluid (e.g., drilling mud) is shown. Pumping system 1010 generally includes a suction manifold 1012, a discharge manifold 1014, and a plurality of pumping assemblies 1100. Suction manifold 1012 is in fluid communication with a working fluid source (e.g., a mud pit), and discharge manifold 1014 is in fluid communication with a central throughbore of a drill string. Each pump assembly 1100 is coupled to suction manifold 1012 with a corresponding suction line 1016, and is coupled to discharge manifold 1014 with a corresponding discharge line 1018, such that each pump assembly 1100 is configured to receive fluids from suction manifold 1012 via the corresponding suction line 1016, and emit pressurized fluid to one of the discharge manifolds 1014 via the corresponding discharge line 1018.

Each pump assembly 1100 includes a motor 1110, a transmission 1120, and a fluid end 1200. Motor 1110 may be any suitable motor or driver that is configured to actuate (e.g., rotate) an output shaft 1112, such as, for example, an electric motor, hydraulic motor, internal combustion engine, turbine, etc. In this embodiment, motor 1110 comprises an electric motor.

Transmission 1120 comprises any suitable mechanism that is configured to translate the output from motor 1110 into an input drive for fluid end 1200. For example, in this embodiment, motor 1120 drives the rotation of output shaft 1112, and transmission 1120 is configured to convert the rotational motion of output shaft 1112 into a reciprocal motion for driving a piston 1202 within fluid end 1200 (note: in some embodiments, pistons 1202 may be replaced with a plunger or other reciprocating member). While some specific embodiments of transmission 1120 are discussed below, it should be appreciated that transmission 1120 may comprise any suitable arrangement of gears, cams, sliders, carriages, or other components to affect the desired motion conversion between motor 1110 and fluid end 1200, including transmissions described above and elsewhere herein.

Fluid end 1200 defines a chamber 1204 that receives a piston 1202 therein. Piston 1202 is coupled to an output shaft 1122 of transmission 1120 and is configured to reciprocate within chamber 1204 and sealingly engage with the inner walls of chamber 1204 to facilitate the pressurization and flow of a working fluid (e.g., drill mud) therein. Fluid end 1200 includes a suction valve 1015 and a discharge valve 1017. Suction valve 1015 is configured to allow fluid flow into chamber 1204 via suction line 1016 when piston 1202 withdrawn from chamber 1204 (e.g., toward transmission 1120) and the pressure within chamber 1204 falls below a first predetermined level, but to prevent fluid from flowing out of chamber 1204 into line 1016. Discharge valve 1017 is configured to allow fluid to flow out of chamber 1204 into discharge line 1018 when piston 1202 is advanced into chamber 1204 (e.g., away from transmission 1120) and the pressure within chamber 1204 rises above a second predetermined level, but to prevent fluid from flowing into chamber 1204 from discharge line 1018. While valves 1015, 1017 are merely shown schematically in FIG. 31, it should be appreciated that valves 1015, 1017 may be the same or similar to those disclosed in U.S. Pat. Nos. 8,220,496 and/or 8,714,193, the entire contents of each being incorporated herein by reference for all purposes.

Referring still to FIG. 31, pumping system 1010 includes a plurality of suction valves 1022 and discharge valves 1024. Each of the suction valves 1022 is disposed along one of the suction lines 1016 and each of the discharge valves 1024 is disposed along one of the discharge lines 1018. Each of the valves 1022, 1024 is coupled to a central controller 1050 through a corresponding connection 1058, which may be any suitable wired or wireless connection for communicating signals, such as, for example a cable, wire, fiber optic line, radio frequency (RF) connection, a WIFI connection, BLUETOOTH® connection, short wave communication signal, acoustic connection, etc. Controller 1050 may include a processor and a memory which each may comprise one or more electrical circuits, where the memory includes software for execution by the processor to provide all of the functionality of controller 1050 disclosed herein. Each of the valves 1022, 1024 also includes a pair of sensors 1026, 1028 that are configured to sense whether the corresponding valve (e.g., valve 1022, 1024) is opened or closed (i.e., whether the valves 1022, 1024 are in an open position or a closed position, respectively). Specifically, one sensor 1026 is configured to sense when the corresponding valve is in the open position (to thereby allow fluid to flow freely along the corresponding line 1016, 1018), and the other sensor 1028 is configured to sense when the corresponding valve is in the closed position (to thereby prevent or restrict fluid flow along the corresponding line 1016, 1018). The sensors 1026, 1028 are each configured to communicate with controller 1050 via connections 1058 so that controller 1050 may know whether each valve 1016, 1018 is in the open or closed position. In this embodiment, controller 1050 is coupled to an external device 1051, which may comprise, for example, a display (e.g., a computer monitor) that is further configured to display information (e.g., a graphic) that shows which of the valves 1022, 1024 is in the open position and which of the valves 1022, 1024 is in the closed position. In addition, in some embodiments, controller 1050 may be configured to actuate each of the valves 1022, 1024 between the open and closed positions.

Each pump assembly 1100 includes a plurality of sensors that communicate with controller 1050 to facilitate and optimize the control thereof during operations. For example, in this embodiment, each pump assembly 1100 includes a rotary sensor 1056 coupled to motor 1110 and configured to measure or determine the rotational speed and/or direction of the output shaft 1112. In addition, each pump assembly 1100 includes a linear displacement or position sensor 1054 coupled to transmission 1120 or fluid end 1200 (in this embodiment, sensor 1054 is coupled to transmission 1120) and configured to measure or determine the position or displacement of piston 1202 and/or shaft 1122 relative to some fixed point. Further, each pump assembly 1100 includes a pressure sensor 1052 coupled to fluid end 1200 and configured to measure a pressure of the chamber 1204 during operations. Each of the sensors 1052, 1054, 1056 are coupled to controller 1050 through a corresponding connection 1058, where connections 1058 between sensors 1052, 1054, 1056 and controller 1050 are configured the same as the connections 1058 between sensors 1026, 1028 and controller 1050.

During operations, controller 1050 drives motors 1110 so that the pistons 1202 of pump assemblies 1100 operate in phase with one another but with a continuously variable angle or timing between them (e.g., via controller 1050) to produce a relatively constant flow of pressurized working fluid to discharge manifold. Specifically, in this embodiment, because pumping system 1010 includes two pump assemblies, the pistons 1202 are operated approximately 180° out of phase with one another (i.e., so that as each piston 1202 reaches its maximum extension during a discharge stroke, the other piston reaches its minimum extension during a suction stroke). However, it should be appreciated that the phrase difference between pistons 1202 of pump assemblies 1100 will change as the number of pump assemblies 1100 is increased or decease (e.g., if three pump assemblies 1100 are used, each piston 1202 is operated approximately 120° out of phase with the other pistons 1202). In some embodiments, controller 1110 verifies and/or maintains the proper timing of the strokes of pistons 1202 (e.g., to maintain the desired phase separation of pistons 1202) by sensing the motor rotational speed and direction via rotary sensors 1056 and correlating the measured rotational speed to the position of piston 1202 via linear displacement or position sensors 1054.

For each pump assembly 1100, as motor 1110 drives rotation of output shaft 1112, transmission 1120 converts this rotational motion into a reciprocating motion of shaft 1122 and piston 1202 so that piston 1202 is repetitively driven between a suction stroke and a discharge stroke within chamber 1204. During a suction stroke of piston 1202, piston 1202 is withdrawn toward transmission 1120 such that the pressure within chamber 1204 is reduced to draw in working fluid from line 1016 via suction valve 1015. In addition, during a suction stroke, working fluid is prevented from flowing into chamber 1204 by discharge valve 1017. Conversely, during a discharge stroke, piston 1202 is driven or extended away from transmission 1120, such that the pressure within chamber 1204 is increased to force fluid out of chamber 1204 into discharge line 1018 via discharge valve 1017. In addition, during a discharge stroke, working fluid is prevented from flowing out of chamber 1204 into suction line 1016 by suction valve 1015.

As pistons 1202 are reciprocated within their respective chambers 1204 as described above, pressure pulsations in the working fluid may be created that propagate into discharge manifold and beyond. For example, in some embodiments, pressure pulsations are created by the engagement of pistons 1202 and the working fluid. In addition, pressure pulsations may be created by other sources, such as, for example, valve, ports (e.g., ports within pump assembly 1100 itself or elsewhere within the system 1010), discharge strainers, variations in the working fluid (e.g., temperature, viscosity, consistency, etc.). Such pressure pulsations can disturb downhole communication devices and instrumentation by degrading the accuracy of measurements taken thereby, and hampering communications between downhole devices and control systems at the surface. In addition, over time, these pressure pulsations may also cause fatigue damage to components within system 1010 or elsewhere (e.g., within the subterranean wellbore). Within pumping system 1010, such pressure pulsations are detected and subsequently attenuated and dampened by controller 1050 during pumping operations.

Specifically, referring still to FIG. 31, as piston 1202 is reciprocated within chamber 2204, pressure sensor 1052 monitors the pressure within chamber 1204 and reports the same to controller 1050. When a pressure pulsation (e.g., a sudden pressure spike above or below some threshold) is detected, the controller 1050 may then determine whether the period of the pressure pulsation is large or small. That is, the controller 1050 may monitor subsequent pressure measurements from sensor 1052 for a predetermined period of time and determine the likely period or duration of the pressure pulsation (e.g., based on an analysis of the slope of the pressure curve over the predetermined period of time). If the period or duration of the pressure pulsation is above a predetermined value, the controller 1050 may alter the speed and/or direction of motor 1110 to attenuate and thus reduce the measured pressure pulsation.

For example, if the pressure within chamber 1204 suddenly increases above some predetermined threshold, a pressure pulsation is detected by controller 1050. Thereafter, if the controller 1050 determines that the period of the detected pressure pulsation is above some predetermined value, the controller 1050 may then direct the motor 1110 to slow the rotation of output shaft 1112 and thereby slow the reciprocation of piston 1202. By slowing the piston 1202, the pressure within chamber 1204 may be reduced below the predetermined threshold, thereby attenuating the pressure pulsation. As another example, if the pressure within chamber 1204 suddenly decreases below some predetermined threshold, a pressure pulsation is detected by controller 1050. Thereafter, if the controller 1050 determines that the period of the detected pressure pulsation is above the predetermined value, the controller 1050 may then direct the motor 1110 to increase the rotational speed of output shaft 1112 and thereby increase the speed of reciprocation of piston 1202. By speeding up the piston 1202, the pressure within chamber 1204 may be increase above the predetermined threshold, thereby attenuating the pressure pulsation. During these operations, the controller 1050 may determine the specific position and direction of pistons 1202 by interrogating each of the linear displacement or position sensor 1054 and the rotary sensor 1056 on motor to further inform the controller 1050 as to the necessary adjustments to make to the motion and/or speed of piston 1202 to attenuate pressure pulsations having a period or duration above some predetermined value.

If, on the other hand, the controller 1050 determines that the period or duration of the pressure pulsation is larger than some predetermined value, then controller 1050 may direct a secondary pressure pulsation dampening assembly 1300 to take up or attenuate the pressure pulsation. While specific embodiments of the pressure pulsation dampening assembly 1300 are described in more detail below, it should be appreciated that pressure pulsation dampening assembly 1300 comprises a piston (not shown) and is configured to controllably actuate the piston to increase or decrease a pressure within a chamber that is fluidly coupled to discharge manifold 1014. The piston (not shown) within pressure pulsation dampening assembly 1300 may be actuated by any suitable method, such as, for example, one or more electric motors, one or more electromagnets, hydraulic pressure, a mechanical component (e.g., lever), etc. Thus, if a relatively short period pressure pulsation is detected by controller 1050 via the pressure measurements from sensors 1052, pressure pulsation dampening system 1300 may, under the direction of controller 1050, actuate the piston (not shown) therein to increase or decrease the pressure within discharge manifold 1014 as necessary to attenuate the pressure pulsation.

For example, if the pressure within chamber 1204 suddenly increases above some predetermined threshold, a pressure pulsation is detected by controller 1050. Thereafter, if the controller 1050 determines that the period of the detected pressure pulsation is below some predetermined value, the controller 1050 may then direct dampening assembly 1300 to actuate piston to decrease the pressure within discharge manifold 1014, and thereby take up or attenuate the pressure pulsation. As another example, if the pressure within chamber 1204 suddenly decreases below some predetermined threshold, a pressure pulsation is detected by controller 1050. Thereafter, if the controller 1050 determines that the period of the detected pressure pulsation is below the predetermined value, the controller 1050 may then direct dampening assembly 1300 to actuate piston to increase the pressure within discharge manifold 1014, and thereby take up or attenuate the pressure pulsation.

Figure 32:
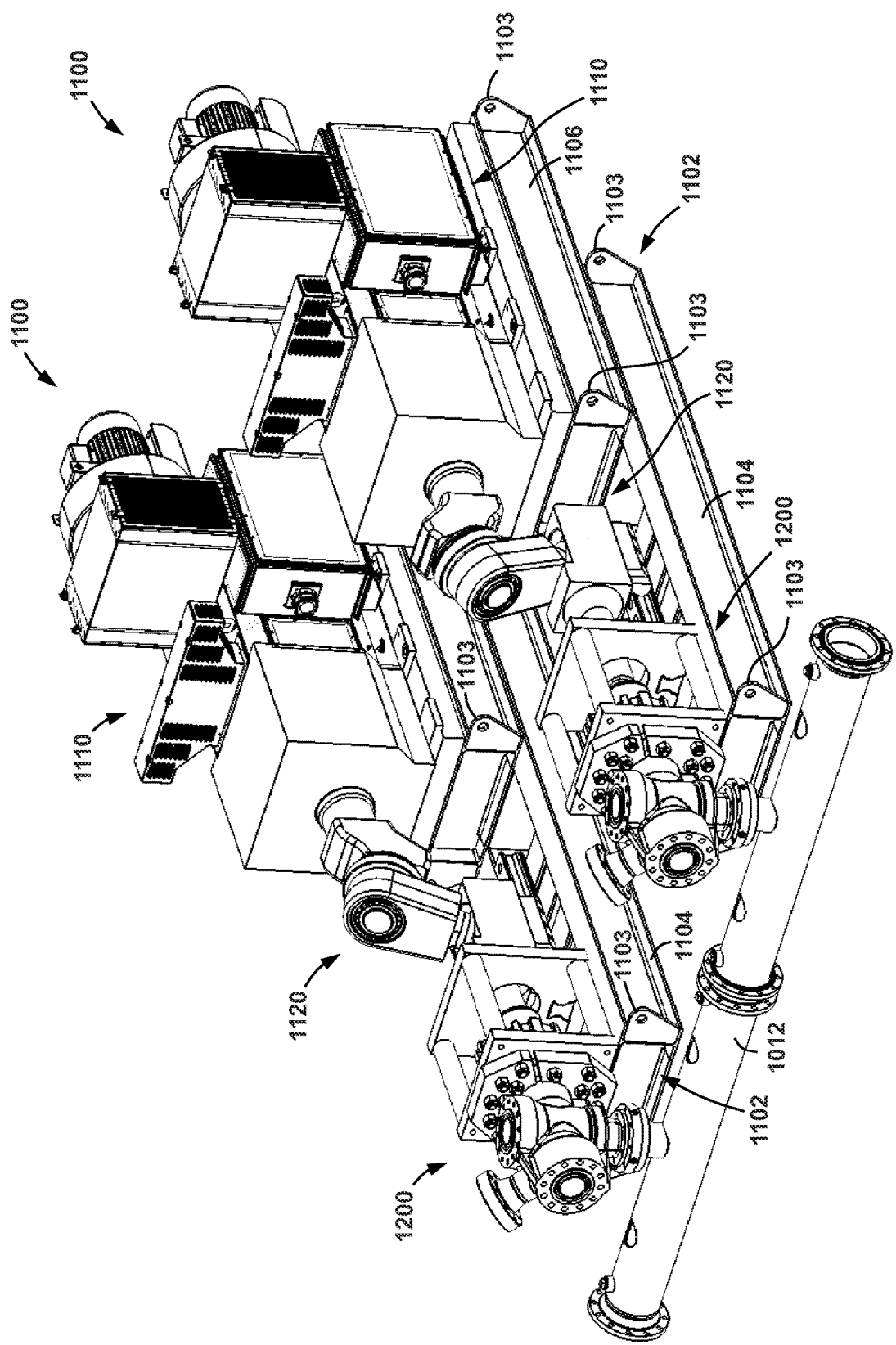
FIG. 32 is a perspective view of a pair of pump assemblies for use within the pumping system of FIG. 31.

Referring now to FIG. 32, two pump assemblies 1100 are shown coupled to suction manifold 1014. The other components of pumping system 1010 (e.g., discharge manifold 1014, dampening assembly 1300, controller 1050, etc.) are not shown in FIG. 32 so as not to unduly complicate the figure. As shown in FIG. 32, pump assemblies 1100 are arranged in parallel to one another, and each is supported by its own respective support frame or base 1102. In this embodiment, base 1102 of each pump assembly 1100 includes a plurality of pad eyes 1103 to facilitate lifting and positioning of each pump assembly 1100 (e.g., with a forklift, crane, etc.). Also, without being limited to this or any other theory, in at least some embodiments, frame 1102 and pad eyes 1103 facilitate transportation of each pump assembly 1100, such as, for example, on a flatbed trailer or other suitable device. In addition, in this embodiment, each frame 1102 is comprised of a first or lower frame unit or member 1104 and a second or upper frame unit or member 1106 partially stacked on top of the lower frame member 1104. Lower frame member 1104 supports each of the fluid end 1200 and transmission 1120, while upper frame member supports motor 1110. The difference in height between frame members 1104, 1106 allows the respective shafts (e.g., shafts 1112, 1122 in FIG. 31) to align with their intended connections within pump assembly 1100 as will be described in more detail below.

Figure 33:
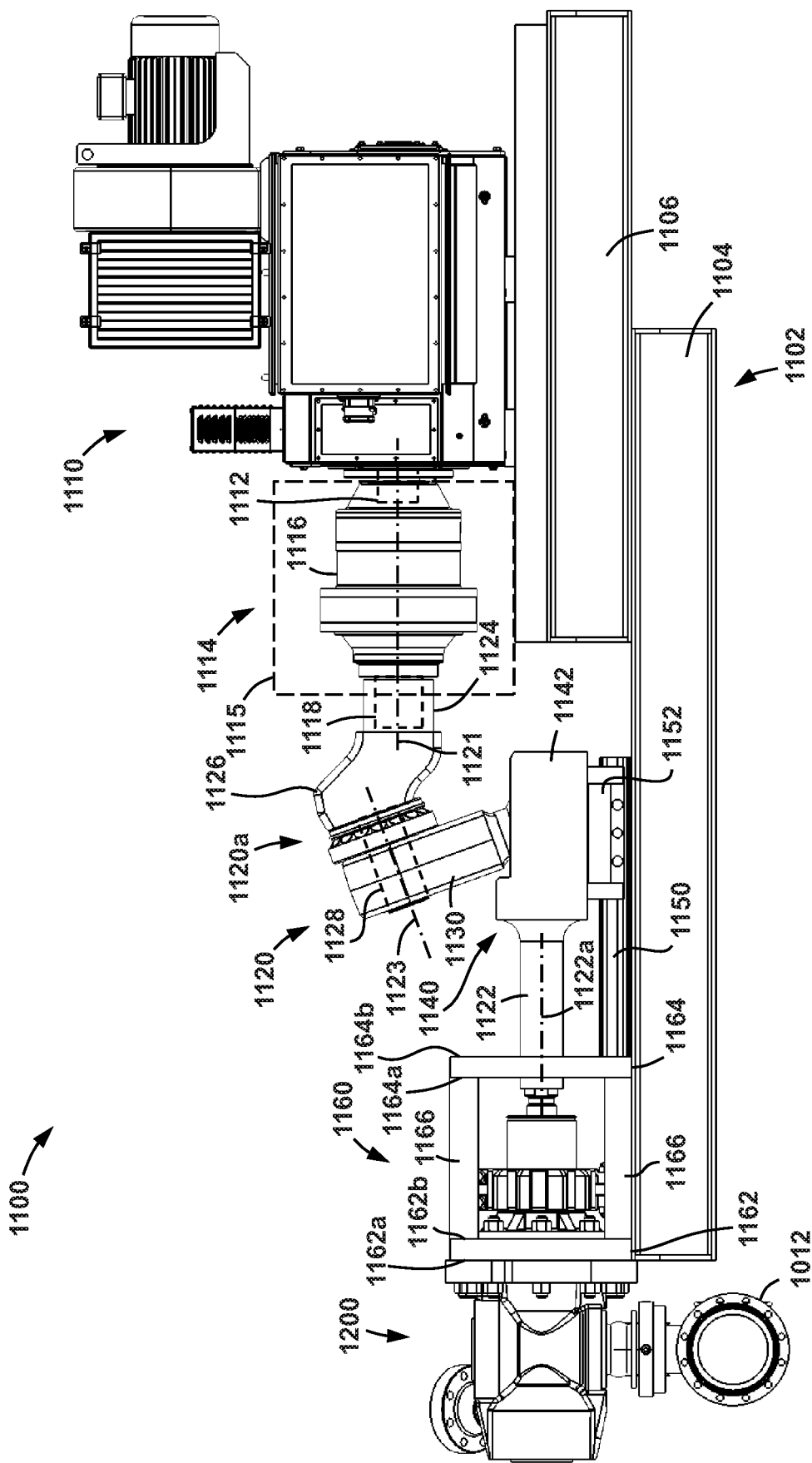
FIG. 33 is a side view of one of the pump assemblies of FIG. 32.

Referring now to FIG. 33, one pump assembly 1100 is shown; however, it should be appreciated that each pump assembly 1100 is configured the same such that the following description will apply. As shown in FIG. 33, a reducer 1114 is disposed between motor 1110 and transmission 1120. Reducer 1114 includes a reducer gear assembly 1116 and an output shaft 1118. During operations, reducer gear assembly 1116 receives output shaft 1112 from motor 1110 and output shaft 1118 is engaged with transmission 1120 (note: both shafts 1112, 1118 are shown with hidden lines in FIG. 33). In this embodiment, reducer gear assembly 1116 is configured to rotate output shaft 118 a fraction of the number of times that output shaft 1112 rotates. Specifically, in this embodiment, reducer gear assembly 1116 is configured to rotate output shaft 1118 one time for every sixteen rotations of output shaft 1112 of motor 1110. Thus, reducer gear assembly 1116 works to reduce the rotational rate (e.g., in rotations per minute (rpm)) of the output shaft 1112 of motor 1110 and to increase the torque supplied to transmission 1120 from that generated by motor 1110 alone. Reducer 1114 also includes an outer housing or shroud 1115 that surrounds reducer gear assembly 1116, and thereby protects reducer gear assembly 1116 from the outer environment (note: shroud 1115 is shown with a hidden line in FIG. 33 to reveal the other components of reducer 1114). It should be appreciated, that in some embodiments, no reducer 1114 is included and output shaft 1112 of motor 1110 couples directly to transmission 120. In other embodiments, reducer gear assembly 1116 is incorporated into motor 1110 itself such that reducer gear assembly 1116 would be disposed within an outer housing of motor 1110 and output shaft 1118 of reducer 1114 would effectively be the output shaft (e.g., output shaft 1112) of motor 1110 itself.

Referring now to FIGS. 33-36, transmission 1120 includes an offset shaft assembly 1120a, a carriage assembly 1140, and a linking member 1130. Offset shaft assembly 1120a is coupled to output shaft 1118 of reducer 1114, carriage assembly 1140 is coupled to fluid end 1200, and linking member 1130 extends between offset shaft assembly 1120a and carriage assembly 1140.

Figure 36:
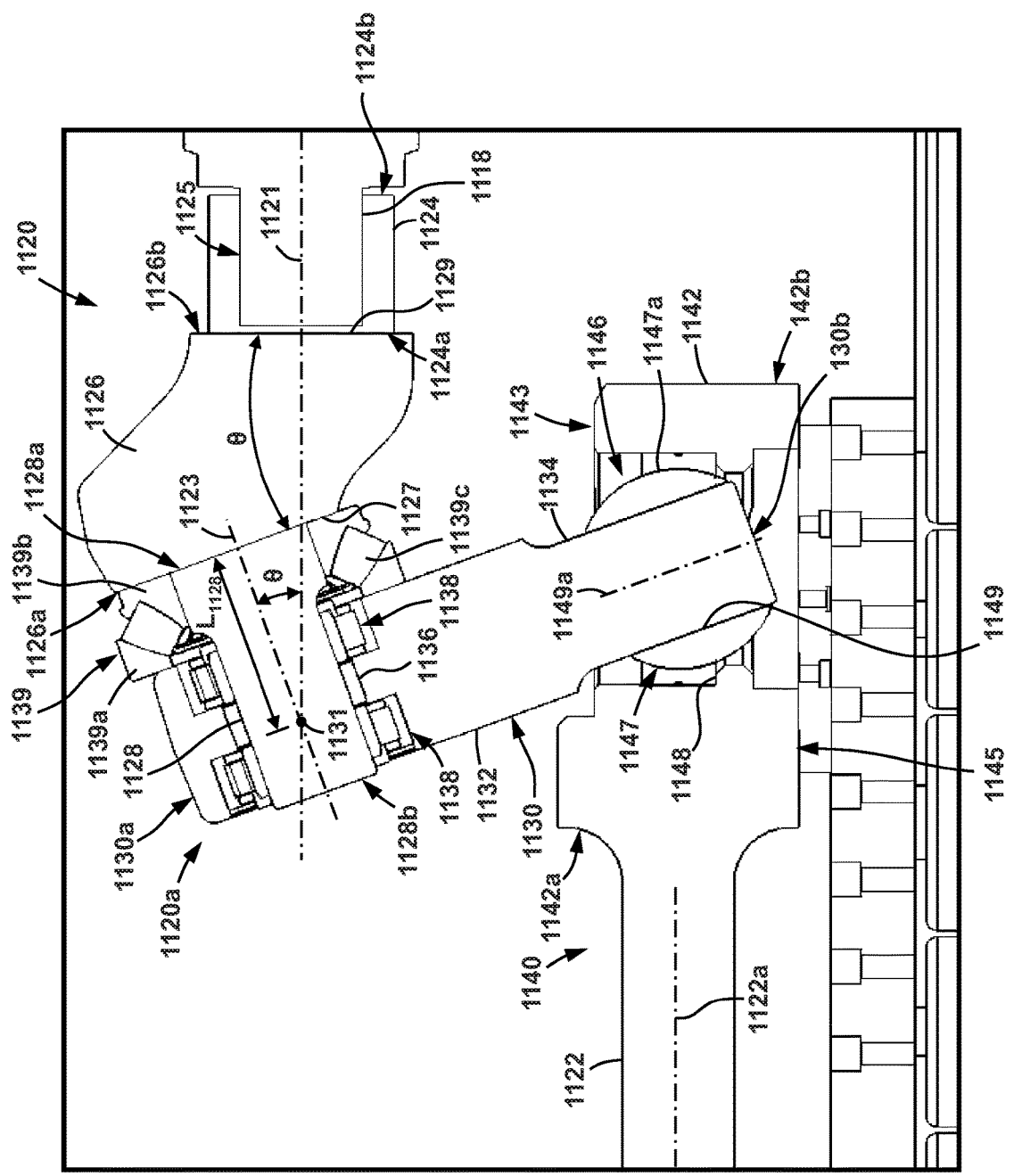
FIGS. 36 and 37 are sequential side-cross-sectional views of the transmission of the pump assembly of FIG. 33.

Offset shaft assembly 1120a includes an input shaft 1124, an offset shaft 1128, and a central linking body 1126 connecting shafts 1124, 1128. As best shown in FIG. 36, input shaft 1124 includes a central axis 1121, a first or proximal end 1124a, a second or distal end 1124b opposite proximal end 1124a, and a recess or receptacle 1125 extending axially from distal end 1124b. Offset shaft 1128 includes a central axis 1123, a first or proximal end 1128a, and a second or distal end 1128b opposite proximal end 1128a. Linking body 1126 includes a first end 1126a, a second end 1126b opposite first end 1126a, a first mounting face 1127 at first end 1126a, and a second mounting face 1129 at second end 1126b. Mounting faces 1127, 1129 are planar surfaces that are disposed at an angle θ with respect to one another (i.e., faces 1127, 1129 are each disposed within planes that are disposed at the angle θ with respect to one another). Each of the shafts 1124, 1128 extend normally from faces 1129, 1127, respectively, such that the projection of axis 1121 of input shaft 1128 also forms the angle θ with axis 1123 of offset shaft 1128. A point of intersection 1131 is defined between axis 1123 and a projection of axis 1121 within offset shaft 1128. Point 1131 is disposed at a distance $L_{1128}$ measured axially with respect to axis 1123 from proximal end 1128a of offset shaft 1128. During operations, output shaft 1118 of reducer 1114 is received within receptacle 1125 along axis 1121. As a result, input shaft 1124 is coaxially aligned with output shaft 1118 of reducer 1114 and in this embodiment, also with output shaft 1112 of motor 1110 (see FIG. 33). However, it should be noted that in other embodiments, shaft 1124 is not aligned with shafts 1118 and/or 1112 (e.g. such as when reducer includes one or more planetary gear trains). Thus, as shafts 1118, 1112, 1124 of reducer 1114, motor 1112, and offset shaft assembly 1120a, respectively, all rotate about axis 1121, offset shaft 1128 of offset shaft assembly 1120a also rotates about axis 1121 so that axis 1123 defines a conical sweep about axis 1121 with the tip of the cone disposed at point 1131.

Referring still to FIGS. 33-36, linking member 1130 is an elongate member including a first or upper end 1130a, a second or lower end 1130b, opposite upper end 1130a, an upper section 1132 extending from upper end 1130a, and a lower shaft 1134 extending from upper section 1132 to lower end 1130b. Upper section 1132 includes a throughbore or receptacle 1136 extending therethrough. As best shown in FIG. 36, receptacle 1136 receives offset shaft 1128 from offset shaft assembly 1120a such that receptacle 1136 extends along and is aligned with axis 1123. A pair of radial bearings 1138 are disposed within receptacle 1136 radially disposed between offset shaft 1128 and receptacle 1126 with respect to axis 1123. Radial bearings 1138 support and facilitate rotation of offset shaft 1128 within receptacle 1136 during operations. In addition, a spherical bearing 1139 is disposed about offset shaft 1128 and is axially positioned between mounting face 1127 of linking body 1126 and linking member 1130 along axis 1123. Spherical bearing 1139 includes a first race 1139a, a second race 1139b, and a plurality of bearing members 1139c axially disposed between races 1139a, 1139b. Spherical bearing 1139 provides the proper axial spacing and alignment between linking member 1130 and linking body 1126, while also supporting rotation of shaft 1128 and linking body 1126 relative to linking member 1130. Thus, first race 1139a engages with linking member 1130, second race 1139b engages with mounting face 1127, and bearing members 1139a support relative rotation of second race 1139b relative to first race 1139a.

Carriage assembly 1140 includes a main body 1142 and output shaft 1122 of transmission 1120 (see FIG. 31). Main body 1142 is a generally shaped as a rectangular parallel piped, and includes a first or front end 1142a, a second or rear end 1142b opposite front end 1142a, a top 1143 and a bottom 1145. In addition, as best shown in FIG. 36, main body 1142 includes a cavity or through passage 1146 extending between top 1143 and bottom 1145 that includes an annular shoulder or seat 1148 disposed therein. Output shaft 1122 extends from front end 1142a of main body 1142 along a central axis 1122a and in this embodiment is monolithically formed with main body 1142 (i.e., main body 1142 and output shaft 1122 are formed as one integrated piece). In other embodiments, output shaft 1122 may not be monolithically formed with main body 1142 (e.g., output shaft 1122 may be threaded or otherwise releasably attached to main body 1142).

Figure 34:
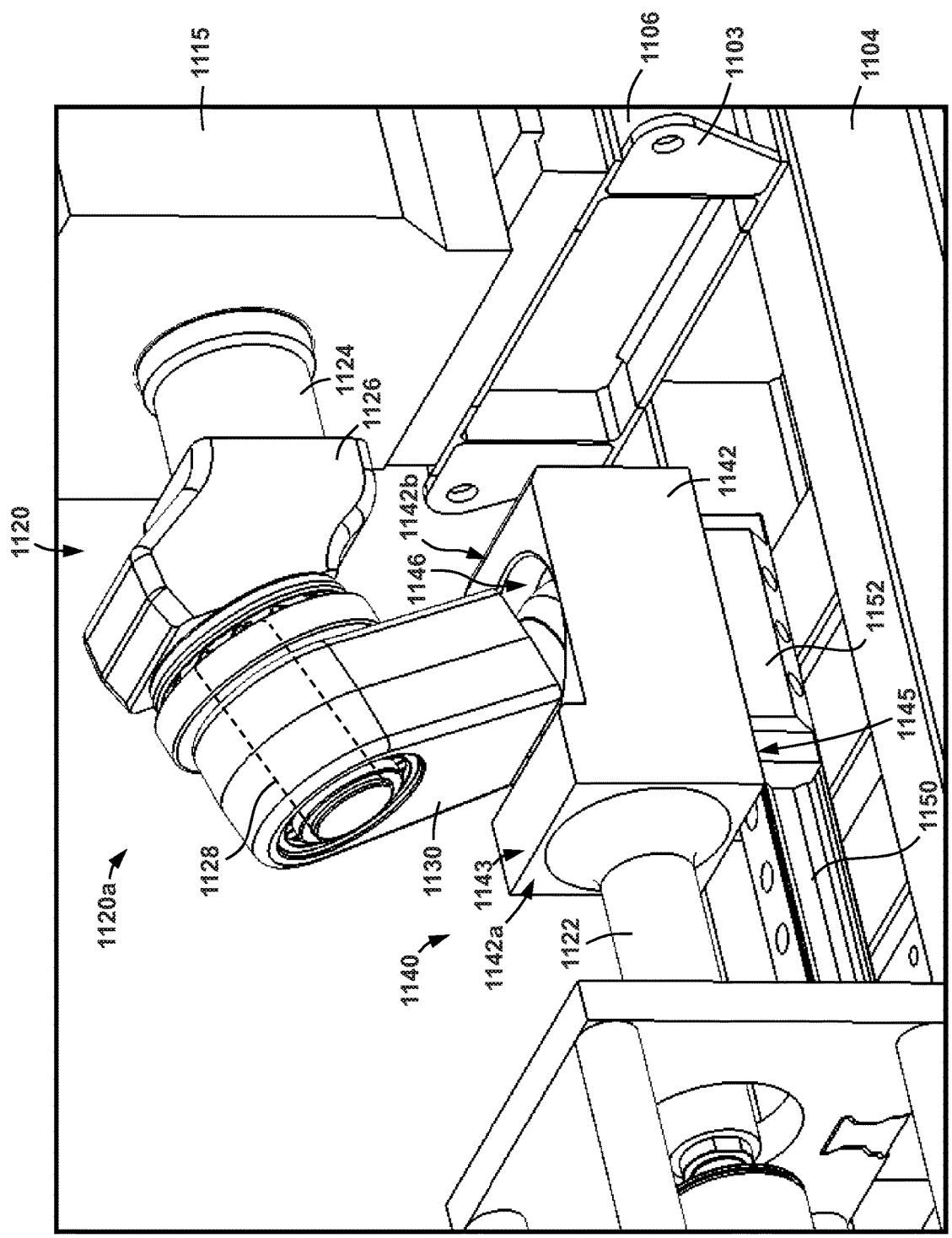
FIG. 34 is an enlarged perspective view of the transmission of the pump assembly of FIG. 33.
Figure 35:
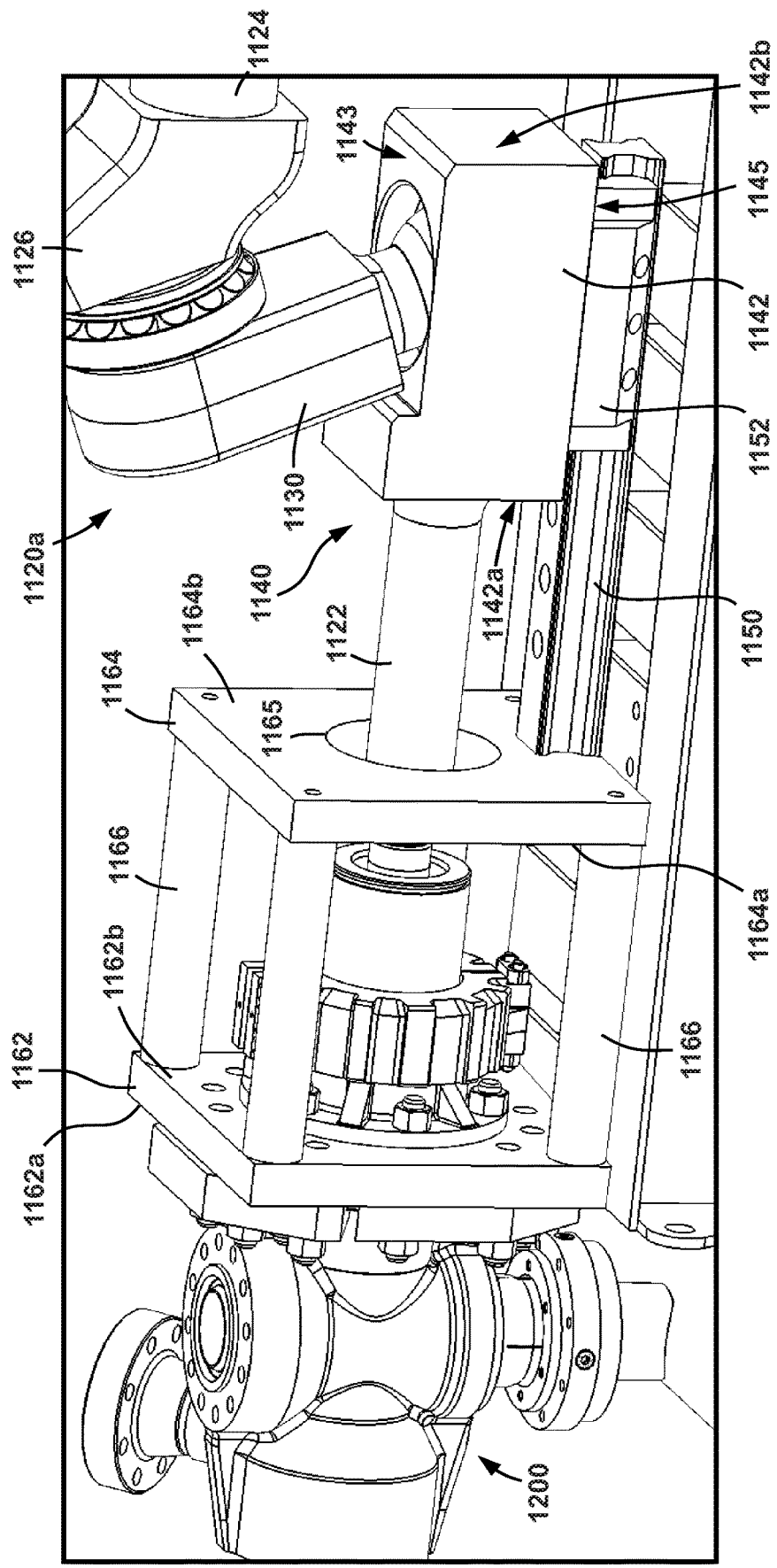
FIG. 35 is an enlarged perspective view of the transmission and fluid end of the pump assembly of FIG. 33.

Referring specifically to FIGS. 33-35, a guide rail 1150 is mounted to lower frame member 1104, and pair of sled members 1152 are mounted to bottom 1145 of main body 1142 (note: only one of the sled members 1152 is shown in FIGS. 33-35). Sled members 1152 are shaped to engage with and slide along guide rail 1150 during operations.

As best shown in FIG. 36, during assembly of transmission 1120, lower shaft 1134 is inserted within a throughbore 1149 of a ball or spherical bearing member 1147. The throughbore 1149 extends through ball 1147 along a central axis 1149a. Thereafter, lower shaft 1134 and ball 1147 are inserted within through passage 1146 until ball 1147 engages or abuts with annular seat 148. In this embodiment, ball 1147 and thus also lower shaft 1134 may pivot omni-directionally within through passage 1146; however, it should be appreciated that in other embodiments, ball 1147 and lower shaft 1134 may only pivot within a plane including the axis 1121 of input shaft 1124 of transmission (i.e., a plane including the central or longitudinal axis of main body 1142). The pivoting of ball 1147 and shaft 1134 within through passage 1146 (whether omni-directional pivoting or pivoting within a single plane or direction) is facilitated by sliding engagement between an outermost, spherical surface 1147a of ball 1147 and annular seat 1148. In addition, lower shaft 1134 may freely slide within throughbore 1149 of ball 1147 along axis 1149a.

Figure 37:
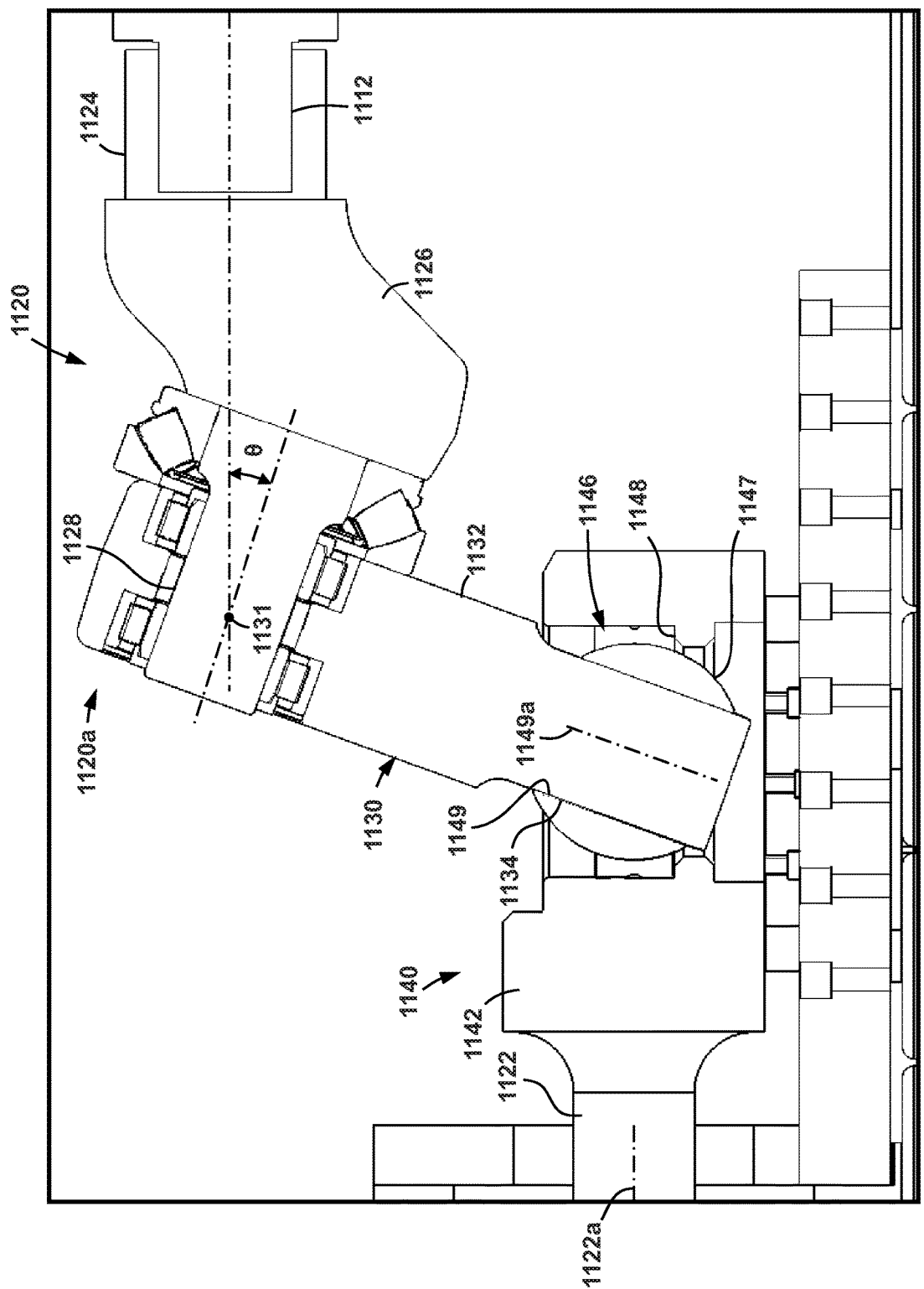

Referring now to FIGS. 36 and 37, during operations, motor 1110 rotates output shaft 1112 which in turn rotates each of the input shaft 1124, connecting body 1126, and offset shaft 1128 of transmission 120 about axis 1121. As previously described, rotation of offset shaft 1128 about axis 1121 of input shaft 1124 causes axis 1123 of offset shaft 1128 to trace a cone about a projection of axis 1121 so that offset shaft 1128 rotates about point 1131 (see the progression from FIG. 36 to FIG. 37). This rotation of offset shaft 1128 about point 1131 also causes a reciprocal pivoting of linking member 1130 about point 1131 in side view (see again the progression from FIG. 36 to FIG. 37). As linking member 1130 reciprocally pivots about point 1131 in side view, lower end 1130b is reciprocally translated to the left and right in the view shown in FIGS. 36 and 37 so that main body 1142 of carriage assembly 1140 is also reciprocally translated left and right in the view shown in FIGS. 36 and 37 due to the engagement between lower shaft 1134 and ball 1149, and between ball 1149 and annular shoulder 1148 within through passage 1146. Output shaft 1122 is thereby also reciprocally translated to the right and left as viewed in FIGS. 36 and 37 due to its connection (e.g., monolithic connection in this embodiment) to main body 1142. The reciprocal pivoting of linking member 1130 relative to through passage 1146 is accommodated by sliding engagement of outer most surface 1147a of ball 1147 and annular seat 1148, and the reciprocal translation of main body 1142 is accommodated by sliding engagement between sled members 1152 and guide rail 1150. As a result, transmission 1120 alters or converts the rotational motion of output shaft 1112 of motor 1110 into reciprocal motion of output shaft 1122.

In addition, during the rotation of shafts 1124, 1128 and body 1126 about axis 1121, linking member 1130 is also reciprocally translated up and down in the views shown in FIGS. 36 and 37 (e.g., due to the offset location of point 1131 relative to the centerline of linking member 1130) so that as linking member 1130 pivots about point 1131, lower shaft 1134 reciprocally slides into and out of throughbore 1149 of ball 1147. In at least some embodiments, the sizing and shape of the components within transmission 1120 (e.g., body 1126, shafts 1124, 1128, linking member 1130, etc.) is chosen to maximize the amount or sweep of reciprocation of lower shaft 1134 within throughbore 1149. Without being limited to this or any other theory, by maximizing the amount or sweep of reciprocation of lower shaft 1134 within throughbore 1149, the wear resulting from the sliding engagement is spread out along a wider length of lower shaft 1134, thereby increasing the number of cycles (i.e., the working life) of linking member 1130 and thus transmission 1120. In at least some embodiments, the parameters that are adjusted to optimize the sweep of lower shafts reciprocation within throughbore 1149 include, for example, the angle θ between axes 1121, 1123, and the length $L_{1128}$ along offset shaft 1128. In at least some embodiments, the angle θ is between 10° and 20°, more preferably between 15°, and 20°, and still more preferably is equal approximately 20°, where all ranges are inclusive of their endpoints. In addition, in some embodiments where the angle θ is approximately equal to 20°, the length $L_{1128}$ is between 12 in. and 14 in., inclusive of the endpoints. However, it should be appreciated that the length $L_{1128}$ will vary depending on the chosen angle θ, and thus in other embodiments, the values for the angle θ and length $L_{1128}$ may vary greatly.

Referring again to FIGS. 33 and 35, pump assembly 1100 includes a support frame 1160 for both supporting fluid end 1200 and for guiding the motion of piston 1202 (discussed below) during operations. In this embodiment, support frame 1160 includes a first support plate 1162, a second support plate 1164, and a plurality of separator or tie bars 166 mounted to and extending between plates 1162, 1164.

Figure 40:
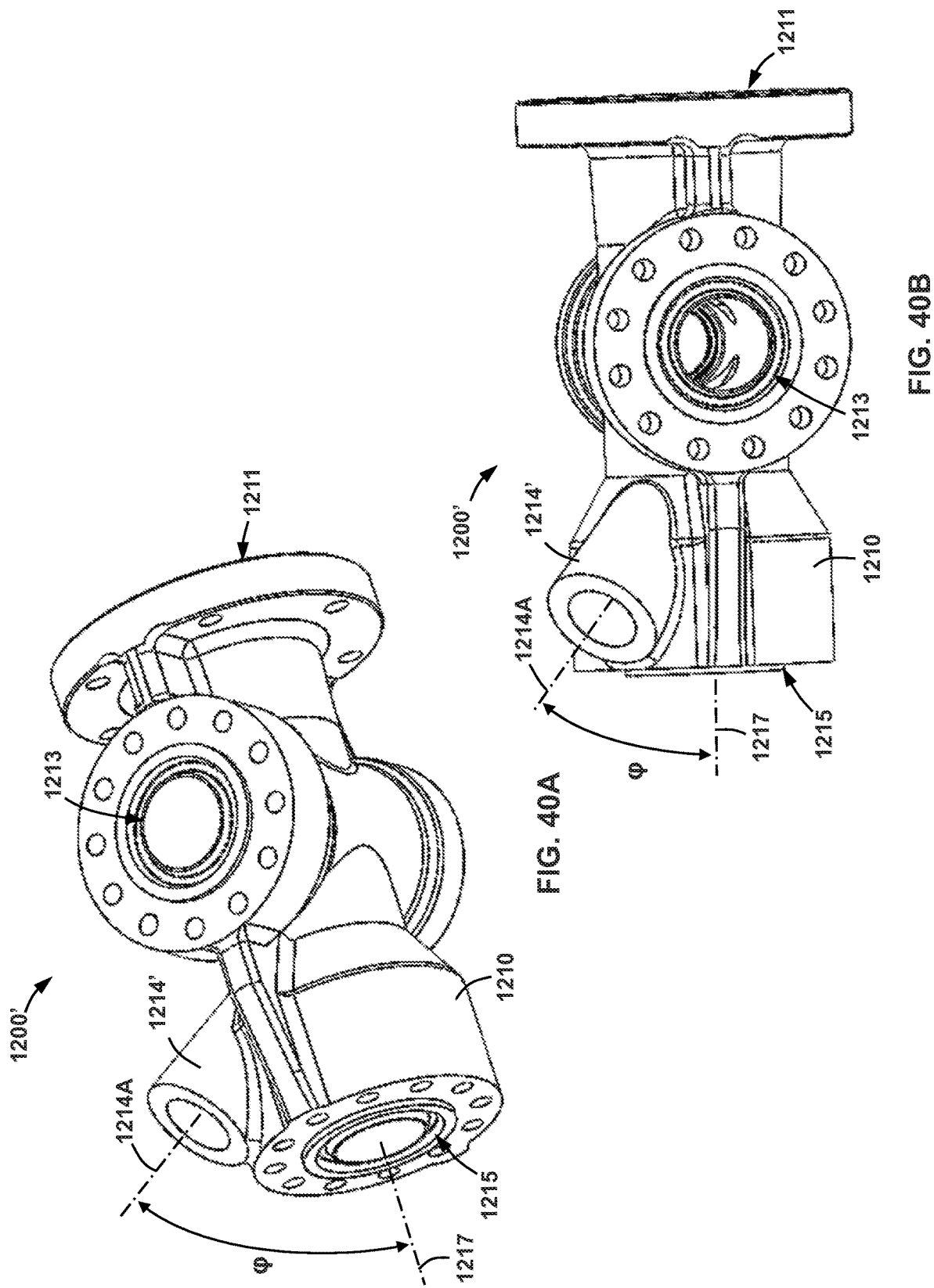
FIGS. 40A and 40B show perspective views of another fluid end for use within the pump assembly of FIG. 33.

Each of the support plates 1162, 1164 may be secured to lower frame member 104 in any suitable manner, such as, for example, with mounting brackets, welding, bolts, or combinations thereof. In addition, each of the support plates 1162, 1164, includes a first side 1162*a*, 1164*a*, respectively, and a second side 1162*b*, 1164*b*, respectively, opposite the first side 1162*a*, 1164*a*, respectively. The tie bars 1166 extend between the second side 1162*b* of first support plate 1162 and the first side 1164*a* of second support plate 1164. Further, as best shown in FIG. 35, second plate 1164 includes a central aperture 1165 extending between sides 1164*a*, 1164*b* that reciprocally receives shaft 1122 therethrough during operations. Similarly, referring briefly to FIG. 40, first support plate 1162 also includes a central aperture 1167 that receives a portion of fluid end 1200 therein in a manner described in more detail below.

Figure 38:
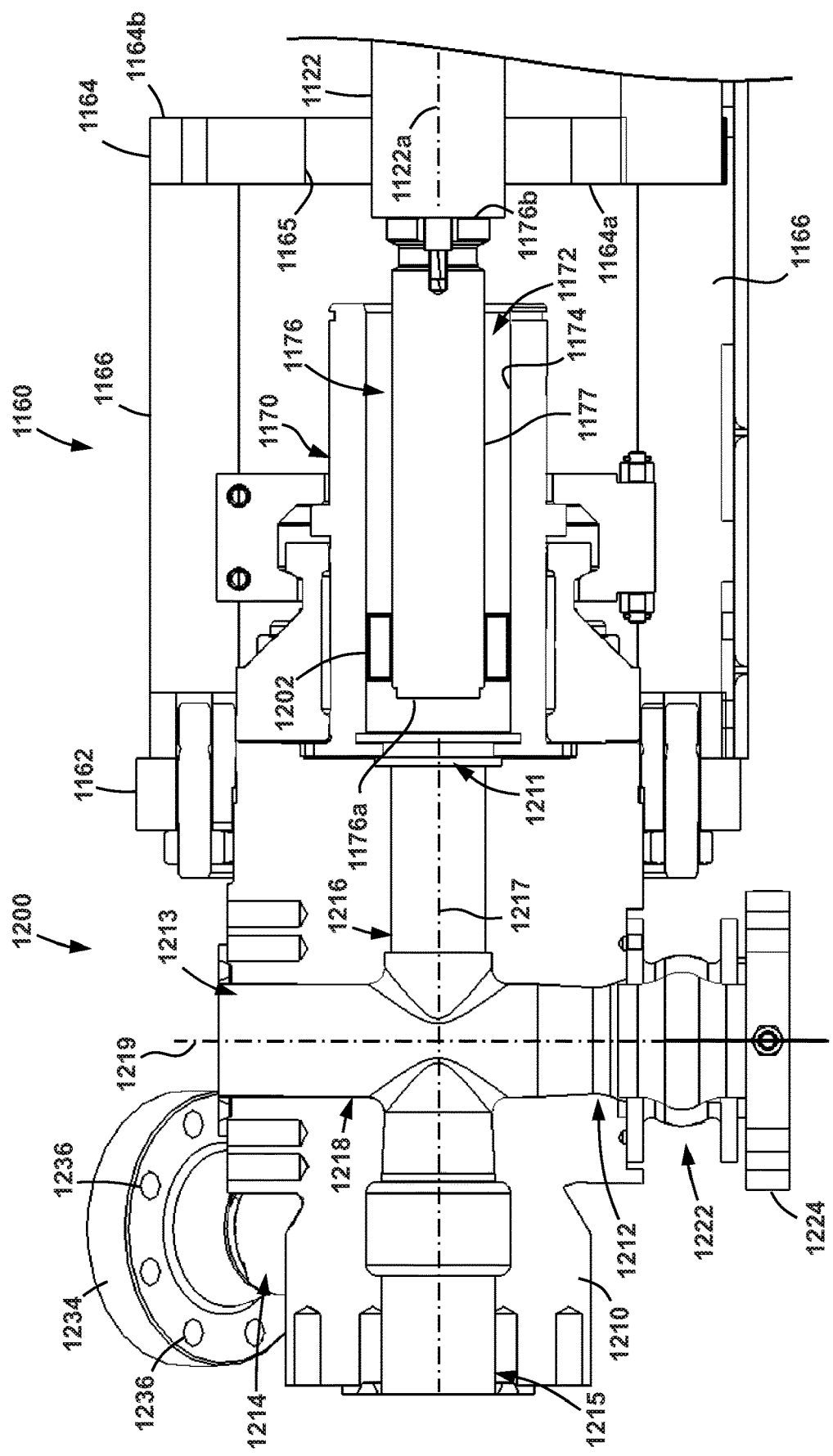
FIG. 38 is a side cross-sectional view of the fluid end and piston of the pump assembly of FIG. 33.

Referring now to FIGS. 35 and 38, a sleeve member 1170 is mounted to second side 1162*b* of first support plate 1162 that is configured to reciprocally receive a piston rod 1176 and coupled piston 1202 therein. As best shown in FIG. 38, sleeve member 1170 includes a central cavity 1172 that includes an inner cylindrical surface 1174 therein for sealingly engaging with piston 1202 during operations.

Referring to FIG. 38, piston rod 1176 includes a first or fluid end 1176*a* and a second or connecting end 1176*b* opposite fluid end 1176*a*. Connecting end 1176*b* of piston rod 1176 is mounted (e.g., welded, bolted, threaded, coupler, etc.) to an end of output shaft 1122 of transmission 1120 such that piston rod 1176 extends along a projection of central axis 1122*a* of output shaft 1122. Piston 1202 is mounted to piston rod 1176 at a point more proximate fluid end 1176*a* than connecting end 1176*b*. Piston 1202 may be mounted to rod 1176 in any suitable fashion including, for example, welding, bolting, threading, or combinations thereof. In addition, while not specifically shown, it should be appreciated that piston 1202 may include one or more annular sealing members that engage with inner cylindrical surface 1174 to prevent fluid flow between piston 1202 and cylindrical surface 1174 during operations.

Figure 39:
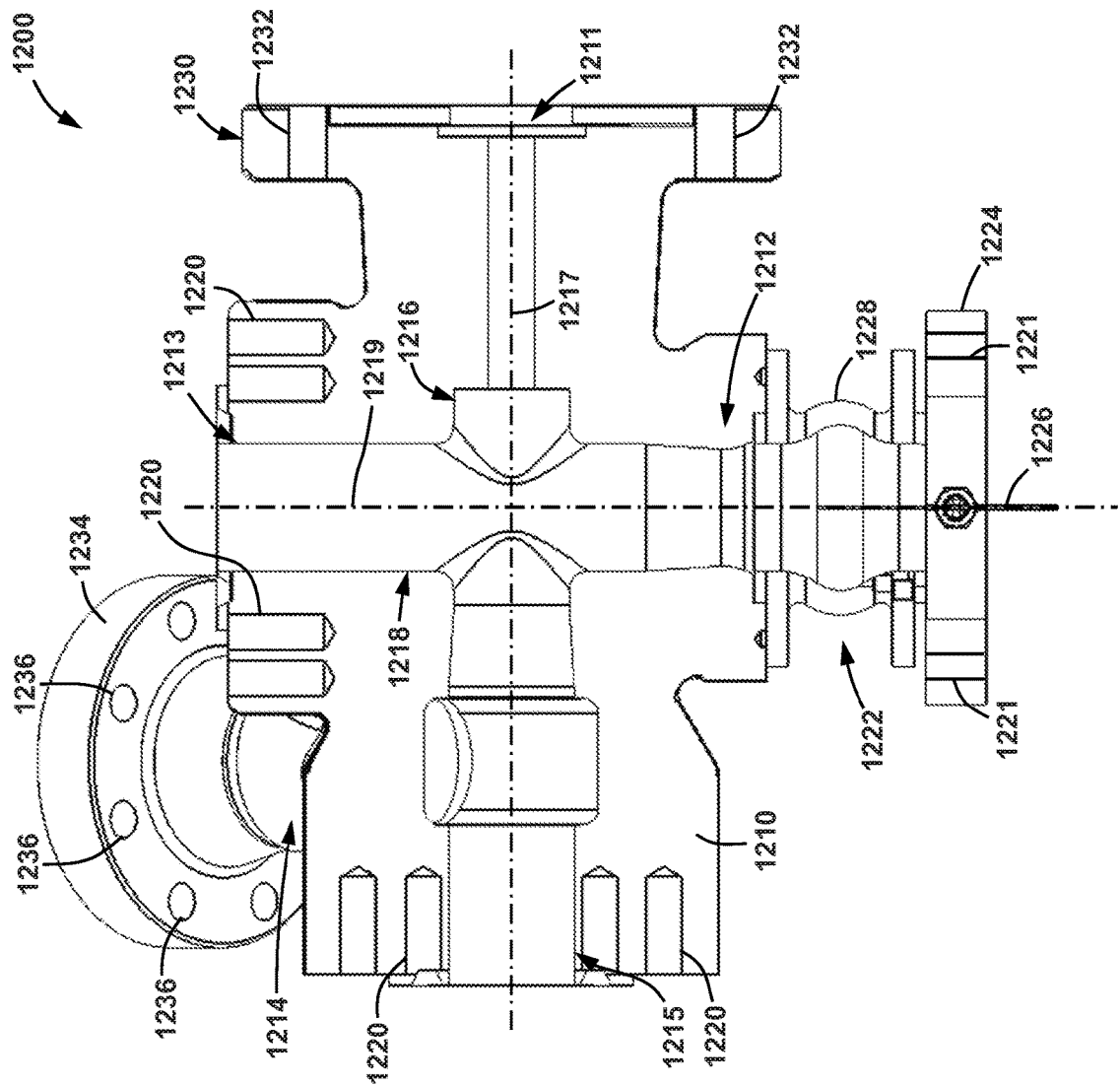
FIG. 39 is a side cross-sectional view of the fluid end of the pump assembly of FIG. 33.

Referring now to FIG. 39, fluid-end 1200 is in fluid communication with central cavity 1172 of sleeve member 1170 so that during pumping operations, reciprocation of piston rod 1176 and piston 1202 within central cavity 1172 causes the pressurization of a working fluid (e.g., drilling mud) within fluid-end 1200. Fluid-end 1200 includes a body 1210 that includes a working fluid inlet 1212, a working fluid outlet 1214, a pressure inlet 1211, a first access port 1213, and a second access port 1215. In addition, body 1210 defines a first internal passage 1216 that extends between pressure inlet 1211 and second access port 1215 along an axis 1217, and a second internal passage 1218 that extends between fluid inlet 1212 and first access port 1213 along an axis 1219 that is orthogonal to axis 1217 of first internal passage 1216. As a result, first and second internal passages 1216, 1218 intersect one another within body 1210 such that access ports 1213, 1215, fluid inlet 1212, fluid outlet 1214, and pressure inlet 1211 are all in fluid communication with one another.

In addition, in this embodiment fluid outlet 1214 extends substantially radially from first internal flow passage 1216 such that fluid outlet 1214 extends approximately 90° from first internal flow passage 1216. However, it should be appreciated that in other embodiments, fluid outlet 1214 may be oriented at angles more or less than 90°. For example, in some embodiments, fluid outlet 1214 may be angled so that fluid flowing along first internal flow passage may experience a reduced direction change when flowing into fluid outlet 1214. Specifically, referring briefly to FIGS. 40A and 40B, another embodiment of fluid end 1200' is shown. Fluid end 1200' is substantially the same as fluid end 1200, except that fluid outlet 1214 (shown as fluid outlet 1214' in FIGS. 40A and 40B) extends along an axis 1214A that is disposed at an angle φ relative to axis 1217. In some embodiments, the angle φ is less than 90°, in other embodiments, the angle φ is between 30° and 50°, inclusive, and in still other embodiments, the angle φ is equal to approximately 45°.

Referring again to FIG. 39, while not specifically shown, fluid inlet 1212 and fluid outlet 1214 each include valves that are configured to permit flow in only one direction (i.e., each of the fluid inlet 1212 and outlet 1214 includes valves that correspond with valves 1015, 1017 in FIG. 31). For example, fluid inlet 1212 may include a valve that is configured to allow fluid to flow into second internal passage 1218 via inlet 1212 when the pressure within internal passage 1218 is below a first predetermined value. Conversely, the valve within the fluid inlet 1212 is configured to prevent flow from second internal passage 1218 out of body via inlet 1212. As another example, fluid outlet 1214 may include a valve that is configured to allow fluid to flow from first internal passage 1216 out of body 1210 via outlet 1214 when the pressure within second internal passage 1216 is above a second predetermined value. Conversely, the valve within fluid outlet 1214 is configured to prevent flow into the first passage 1216 via outlet 1214. For example, fluid inlet 1212 and fluid outlet 1214 may be in communication with suction and discharge valves, respectively, that are similar to those disclosed in U.S. Pat. Nos. 8,220,496 and/or 8,714,193, the entire contents of each being previously incorporated herein by reference for all purposes. In addition, during normal operations, access ports 1213 and 1215 may be sealed off by blinds or covers (not shown) that are secured to body via coupling members (e.g., bolts, screws, rivets, nails, etc.) inserted within mating apertures 1220 extending into body 1210 adjacent access ports 1213, 1215.

Referring still to FIG. 39, in this embodiment a flow straightener 1222 is coupled to body 1210 about inlet 1212 to substantially straighten the flow of fluids flowing into body 1210 via inlet 1212 during operations. Flow straightener 1222 generally includes a conduit segment 1224 that supports a plurality of vanes 1226 (only one vane 1226 is shown in FIG. 39 for convenience and so as not to unduly complicate the figure). In addition, flow straightener 1222 includes a flexible connector 1228 that is coupled to and extends between each of the conduit segment 1224 and body 1210 about inlet 1212. Flow straightener 1222 may be the same as those disclosed in U.S. Pat. No. 8,220,496, the entire contents of which being previously incorporated herein by reference. Conduit segment 1224 includes a plurality of mounting apertures 1221 to facilitate coupling between segment 1224 and a fluid conduit (e.g., a pipe, hose, etc.) or manifold to receive working fluids from a working fluid source.

As is shown in FIG. 39, body 1210 includes a mounting flange 1230 disposed about pressure inlet 1211 for mounting body 1210 to pump assembly 1100. Flange 1230 includes a plurality of mounting apertures 1232 extending therethrough. Similarly, a coupling flange 1234 including a plurality of mounting apertures 1236 is coupled to body 1210 about fluid outlet 1214 and is configured to couple fluid outlet 1214 to a fluid flow conduit (e.g., pipe, hose, etc.) or a manifold for receiving discharged pressurized working fluid (e.g., drill mud).

Figure 41:
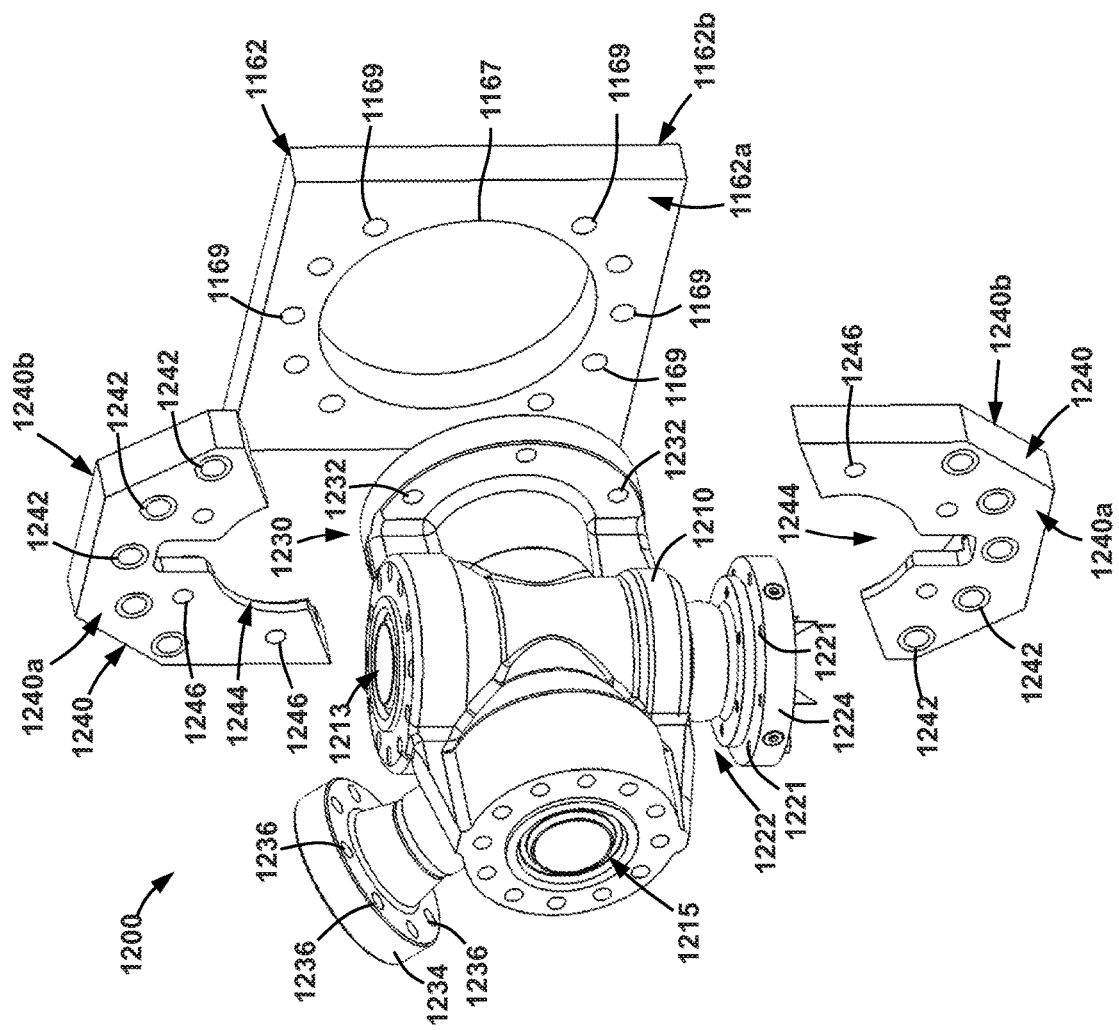
FIG. 41 is an exploded perspective view of the fluid end and support plate of the support frame of the pump assembly of FIG. 3.

Referring now to FIG. 41, body 1210 of fluid-end section 1200 is secured to first mounting plate 1162 with a pair of clamping members 1240. Each clamping member 1240 is a generally C-shaped member that includes a first side 1240a and a second side 1240b opposite first side 1240a. In addition, each clamping member 1240 includes central recess 1244 extending between sides 1240a, 1240b, a first plurality of mounting apertures 1242, and a second plurality of mounting apertures 1246.

To mount body 1210 to first plate 1162, mounting flange 1230 on body 1210 is received within central aperture 1167 in support plate 1162. Thus, central aperture 1167 has a diameter than is equal to or larger than the outer diameter of mounting flange 1230. Thereafter, clamping members 1240 are installed about body 1210 such that second sides 1240b abut or engage first side 1162a of adapter plate 1162 and body 1210 (particularly flange 1230) is received within recesses 1244. In addition, when clamping members 1240 are installed on body 1210 and plate 1162, mounting apertures 1242 on clamping members 1240 are aligned with mounting apertures 1169 on plate 1162, and mounting apertures 1246 on clamping members 1240 are aligned with mounting apertures 1232 on flange 1230. A first plurality of coupling members (not shown) may then be inserted through the aligned apertures 1296, 1232 to secure flange 1230 and body 1210 to clamping members 1240 and a second plurality of coupling members (not shown) may be inserted through the aligned apertures 1242, 1169 to secure clamping members 1240 to adapter plate 1162.

Referring now to FIGS. 33 and 38, with fluid end 1200 coupled to first support plate 1162 of frame 1160 in the manner described above, piston rod 1176 is mounted to output shaft 1122 of transmission 1120 in the manner described above and rod 1176 and piston 1202 are inserted into cavity 1172 of sleeve member 1170 so that fluid end 1176a and piston 1202 are proximate pressure inlet 1211 of fluid end 1200. Thereafter, reciprocation of output shaft 1122 along axis 1122a via motor 1110 and transmission 1120 further causes reciprocation of piston rod 1176 and piston 1202 within central cavity 1172 of sleeve member 1170. Specifically, during this process, as piston 1202 translates axially away from pressure inlet 1211 along a projection of axis 1122a, the pressure within internal passages 1216, 1218 decreases thereby causing the discharge valve (not shown) coupled to fluid outlet 1214 to close and causing the suction valve (not shown) coupled to fluid inlet 1212 to open and allow working fluid (e.g., drilling mud) to flow into body 1210 via fluid inlet 1212. Conversely, as piston 1202 translates axially toward pressure inlet 1211, the pressure within internal passages 1216, 1218 increases thereby causing the suction valve (not shown) coupled to inlet 1212 to close and causing discharge valve (not shown) coupled to fluid outlet 1214 to open and allow working fluid (e.g., drilling mud) to flow out of body 1210 via fluid outlet 1214. Thus, reciprocation of piston rod 1176 and piston 1202 via motor 1110 and transmission 1120 facilitates the pressurization and pumping of working fluid through body 1210 of fluid end 1200. As piston 1202 reciprocates within central cavity 1172 of sleeve member 1170, fluid (e.g., drilling mud) is prevented or at least restricted from flowing out between piston 1202 and cylindrical surface 1174 of cavity 1172 by the dynamic seal formed between piston 1202 and cylindrical surface 1174.

Figure 42:
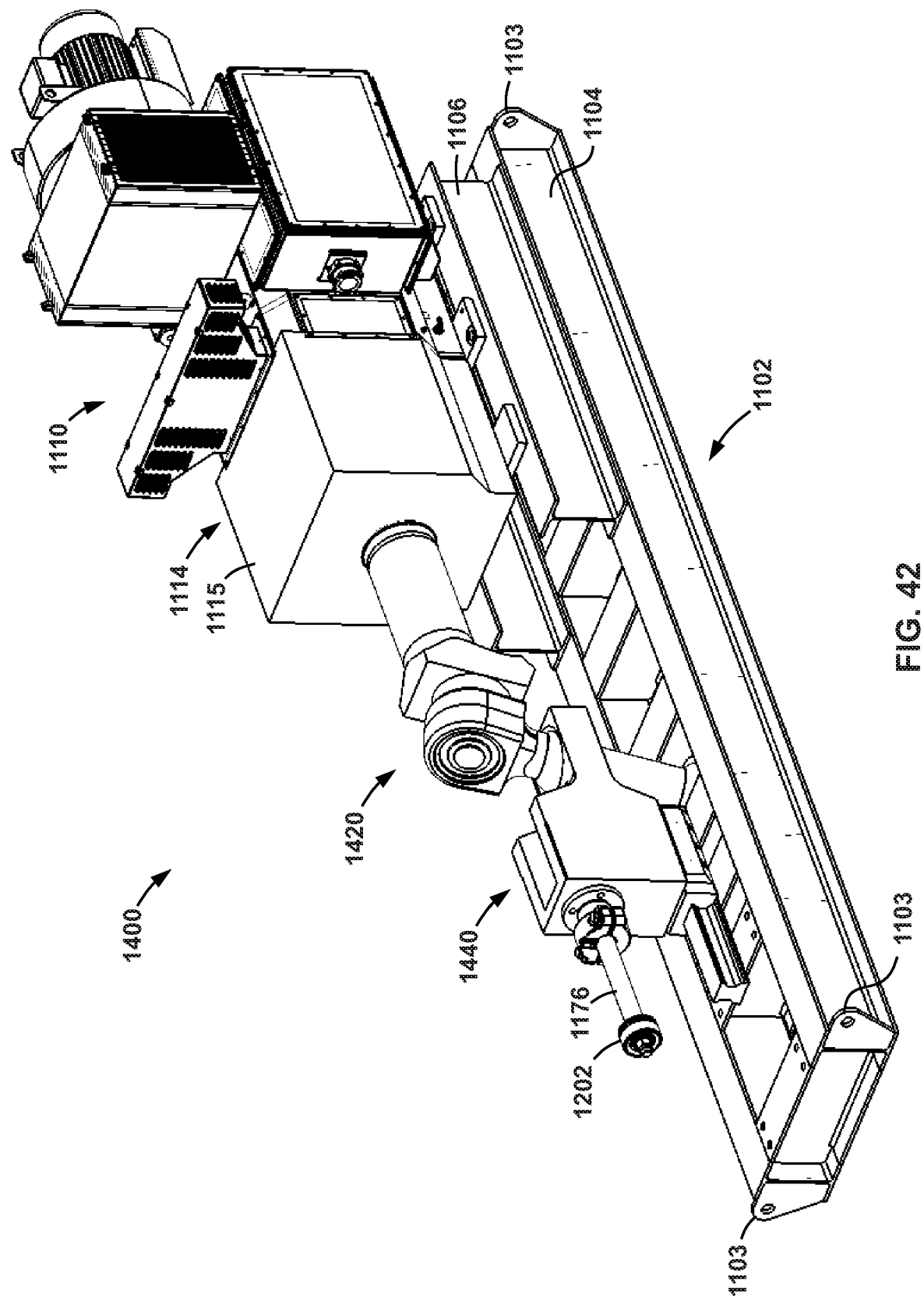
FIG. 42 is a perspective view of another pump assembly for use within pumping system of FIG. 31 in accordance with at least some embodiments disclosed herein.
Figure 43:
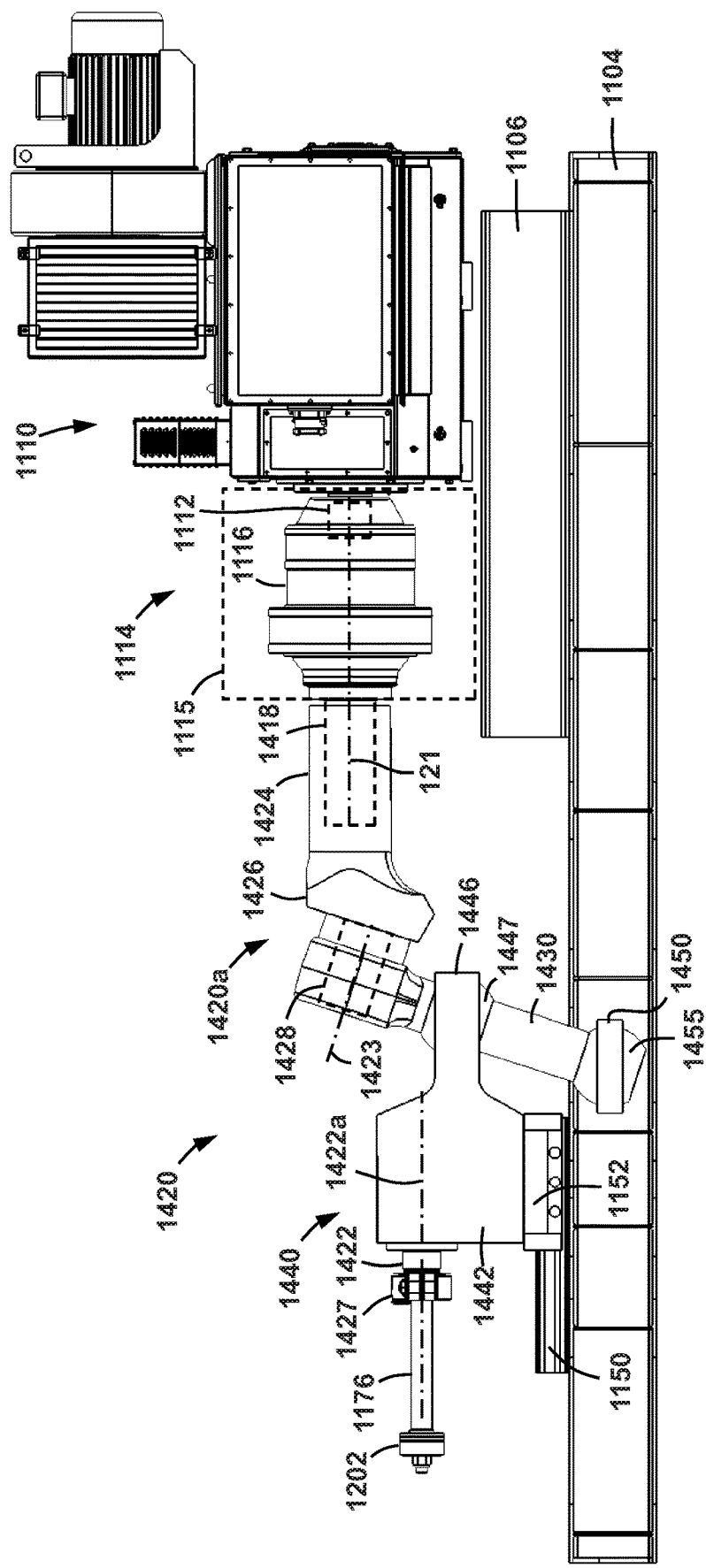
FIG. 43 is a side view of the pump assembly of FIG. 42.

Referring now to FIGS. 42 and 43, another embodiment of a pump assembly 1400 for use within pumping system 110 in place of pump assembly 1100 is shown. Pump assembly 1400 is generally similar to pump assembly 1100 previously described, and thus, like components between pump assemblies 1100, 1400 are shown with like reference numerals and the discussion below will focus on the components of pump assembly 1400 that are different from pump assembly 1100. Specifically, pump assembly 1400 includes a transmission 1420 in place of transmission 1120 of pump assembly 1100. In addition, while pump assembly 1400 includes reducer 1114, previously described, in this embodiment reducer 1114 includes an output shaft 1418 in place of output shaft 1118. Further, it should be appreciated that pump assembly 1400 includes fluid end 1200 and support frame 1160 as in pump assembly 1100, however, these components have been omitted so as to avoid over complicating the figures. Further, while only one pump assembly 1400 is shown in FIGS. 42 and 43, it should be appreciated that multiple pump assemblies 1400 may be utilized within pumping system 110 (e.g., such as a pair of parallel pump assemblies 1400 arranged in a manner similar to that shown for pump assemblies 1100 in FIG. 32).

Figure 44:
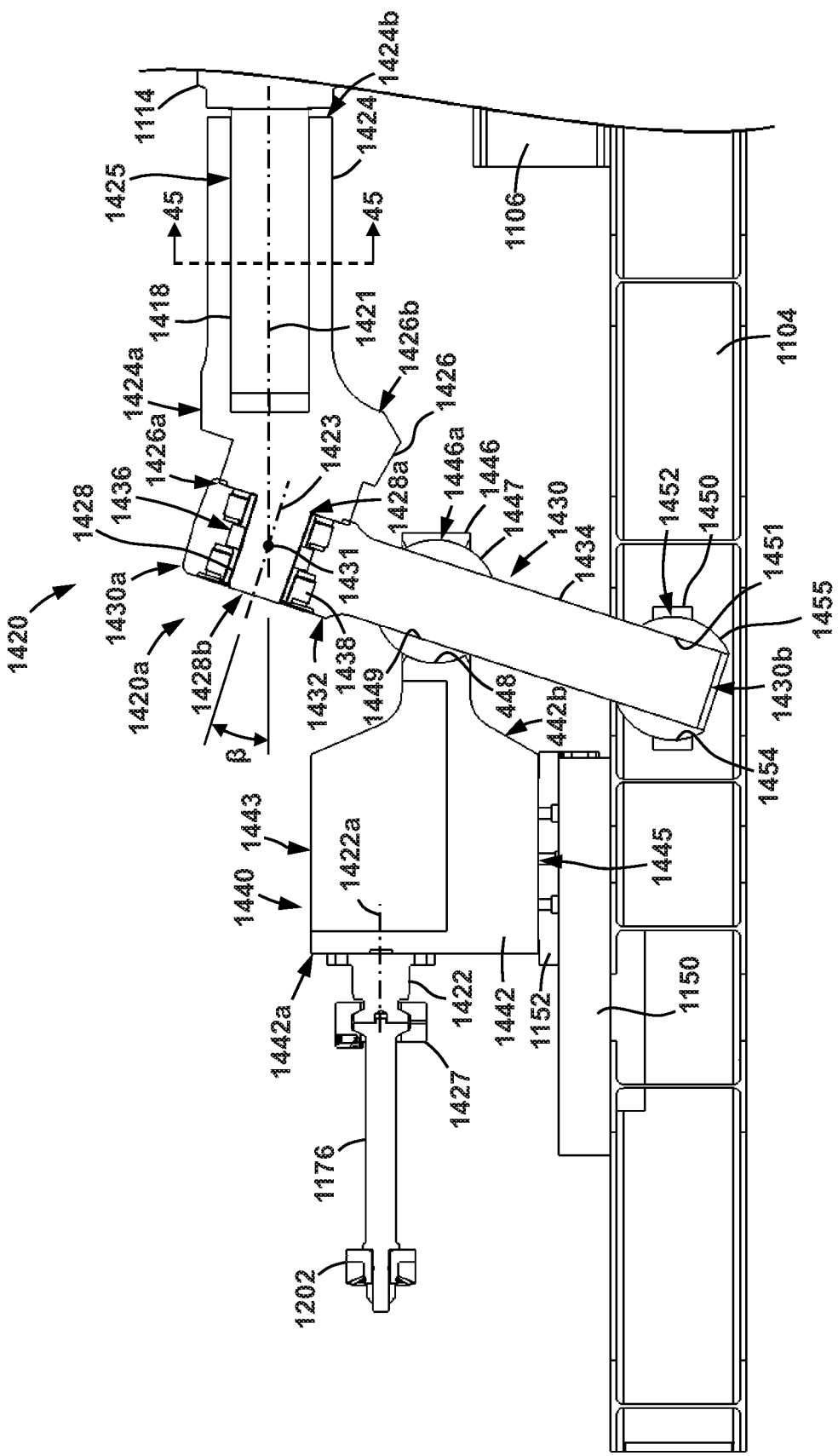
FIG. 44 is a side cross-sectional view of the transmission of the pump assembly of FIG. 42.

Referring now to FIGS. 43 and 44, transmission 1420 includes an offset shaft assembly 1420a, a carriage assembly 1440, and a linking member 1430. Offset shaft assembly 1420a is coupled to output shaft 1418 of reducer 1114, carriage assembly 1440 is coupled to fluid end 1200 (not shown), and linking member 1430 extends between offset shaft assembly 1420a and carriage assembly 1440.

Offset shaft assembly 1420a includes an input shaft 1424, an offset shaft 1428, and a central linking body 1426 connecting shafts 1424, 1428. As best shown in FIG. 44, input shaft 1424 includes a central axis 1421, a first or proximal end 1424a, a second or distal end 1424b opposite proximal end 1424a, and a recess or receptacle 1425 extending axially from distal end 1424b. Offset shaft 1428 includes a central axis 1423, a first or proximal end 1428a, and a second or distal end 1428b opposite proximal end 1428a. Linking body 1426 includes a first end 1426a, a second end 1426b opposite first end 1426a. Proximal end 1428a of offset shaft 1428 is coupled to first end 1426a, and proximal end 1424a of input shaft 1424 is coupled to second end 1426b. Each of the shafts 1424, 1428 extend from sides 1426b, 1426a, respectively, such that the projection of axis 1421 of input shaft 1428 forms an angle β with axis 1423 of offset shaft 1428. As with the angle θ in pump assembly 1100, in at least some embodiments, the angle β is between 10° and 20°, more preferably between 15°, and 20°, and still more preferably is equal approximately 20°, where all ranges are inclusive of their endpoints.

Figure 45:
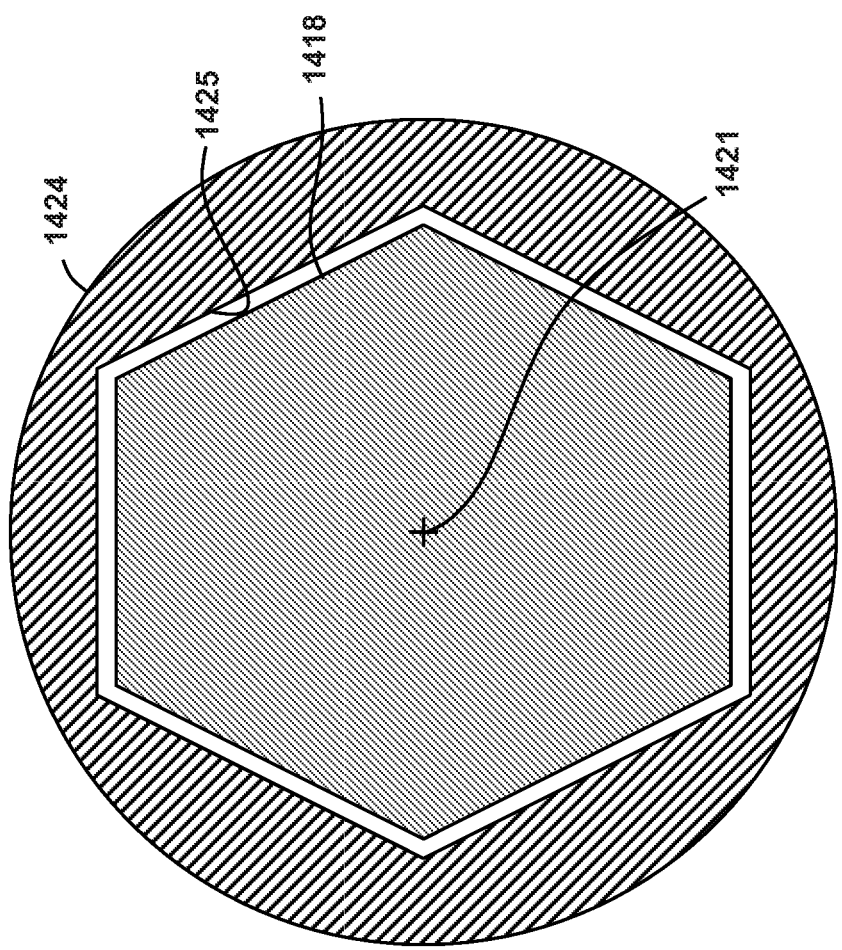
FIG. 45 is a cross-sectional view along section 45-45 in FIG. 44.

During operations, output shaft 1418 of reducer 1114 is received within receptacle 1425 along axis 1421. Referring briefly to FIG. 45, in this embodiment, output shaft 1418 of reducer 1114 and receptacle 1425 extending into input shaft 1424 of offset shaft assembly 1420a are both hexagonal in cross-section so that input shaft 1424 and offset shaft assembly 1420a may translate along axis 1421 relative to reducer 1114 and rotate with about axis 1421 along with shaft 1418 of reducer 1114. In other embodiments, other geometric features or designs may be used to accomplish this function. For example, in other embodiments, the cross-sections of receptacle 1435 and output shaft 1418 may be formed in other shapes (e.g., square, rectangle, triangle, octagonal, pentagonal, oval), or may include one or more axially extending keys and/or splines. As a result, when output shaft 1418 of reducer 1114 is received within receptacle 1425, input shaft 1424 is coaxially aligned with output shaft 1418 of reducer 1114 and in this embodiment, also with output shaft 1112 of motor 1110 (see FIG. 33). Thus, as shafts 1418, 1112, 1424 of reducer 1114, motor 1112, and offset shaft assembly 1420a, respectively, all rotate about axis 1421, offset shaft 1428 of offset shaft assembly 1420a also rotates about axis 1421 so that axis 1423 defines a conical sweep about axis 1421 with the tip of the cone disposed at a point of intersection 1431 between axis 1423 and the projection of axis 1421.

Referring still to FIGS. 43 and 44, linking member 1430 is an elongate member including a first or upper end 1430a, a second or lower end 1430b, opposite upper end 1430a, an upper section 1432 extending from upper end 1430a, and a lower shaft 1434 extending from upper section 1432 to lower end 1430b. Upper section 1432 includes a throughbore or receptacle 1436 extending therethrough. As best shown in FIG. 44, receptacle 1436 receives offset shaft 1428 from offset shaft assembly 1420a such that receptacle 1436 extends along and is aligned with axis 1423. A pair of radial bearings 1438 are disposed within receptacle 1436 radially disposed between offset shaft 1428 and receptacle 1426 with respect to axis 1423. Radial bearings 1438 support and facilitate rotation of offset shaft 1428 within receptacle 1436 during operations.

Carriage assembly 1440 includes a main body 1442 and an output shaft 1422 of transmission 1420 which is used in place of output shaft 1122 of pump assembly 1100 (see FIG. 33). Main body 1442 is a generally shaped as a rectangular parallel piped, and includes a first or front end 1442a, a second or rear end 1442b opposite front end 1442a, a top 1443 and a bottom 1445. In addition, as best shown in FIG. 44, main body 1442 includes a projection extending 1446 from rear end 1442b that includes an aperture 1446a defining a seat 1448 therein. Output shaft 1422 is mounted to (e.g., with a bolted connection) and extends from front end 1442a of main body 1442 along a central axis 1422a.

Referring still to FIGS. 43 and 44, guide rail 1150 is mounted to lower frame member 1104 in the same manner as for pump assembly 1100, and carriage assembly 1440 includes sled members 1152 mounted to bottom 1445 of main body 1442 in the same manner as described above for carriage assembly 1140 in pump assembly 1100 (note: only one sled member 1152 is shown in FIG. 44). In addition, a lower mounting sleeve 1450 is mounted to lower frame member 1104 proximate to guide rail 1150. Lower mounting sleeve 1450 includes an aperture 1452 extending therethrough that defines a seat 1454.

As best shown in FIG. 44, during assembly of transmission 1420, lower shaft 1434 is inserted through a throughbore 1449 of a ball or spherical bearing member 1447 that is slidably disposed on seat 1448 within aperture 1446a of projection 1446 of carriage assembly 1440. In addition, lower shaft 1434 is also inserted within a throughbore 1451 of a ball or spherical bearing member 1455 that is slidably disposed on seat 1454 within aperture 1452 of mounting sleeve 1450. As a result, in this embodiment, balls 1447, 1455 and thus also lower shaft 1434 may pivot omnidirectionally within apertures 1446, 1452, respectively; however, it should be appreciated that in other embodiments, balls 1447, 1455 and lower shaft 1434 may only pivot within a plane including the axis 1421 of input shaft 1424 of transmission (i.e., a plane also including the central or longitudinal axis 1422a of output shaft 1422). In addition, lower shaft 1434 may freely slide within throughbores 1449, 1451 of balls 1447, 1455, respectively along a longitudinal axis of shaft 1434.

Referring still to FIGS. 43 and 44, during operations, motor 1110 rotates output shaft 1112 which in turn rotates output shaft 1418 of reducer 1114 and each of the input shaft 1424, connecting body 1426, and offset shaft 1428 of transmission 1420 about axis 1421. As previously described, rotation of offset shaft 1428 about axis 1421 of input shaft 1424 causes axis 1423 of offset shaft 1428 to trace a cone about a projection of axis 1421. In addition, because linking member 1430 extends through ball 1455 in lower mounting sleeve 1450, and because lower mounting sleeve 1450 is mounted to lower frame member 1104 as described above, the rotation of output shaft 1424 about axis 1421 also causes pivoting of linking member 1430 about the center of curvature of ball 1451 in lower mounting sleeve 1450. This pivoting of linking member 1430 also causes a reciprocal translation of main body 1442 of carriage assembly 1440 and output shaft 1422 along axis 1422a via sliding engagement between guide rail 1150 and sled members 1452. The reciprocal translation of carriage assembly 1440 is further facilitated by the sliding engagement and pivoting of ball 1447 and seat 1448 within projection 1446. As shown in FIG. 44, output shaft 1422 of transmission 1422 is secured to piston rod 1176 (which carries piston 1202 as previously described) via a coupler 1427, so that translation of output shaft 1422 along axis 1422a also causes translation of piston rod 1176 and piston 1202 along axis 1422a. As a result, transmission 1420 alters or converts the rotational motion of output shaft 1112 of motor 1110 into reciprocal motion of output shaft 1422 and piston rod 1176. While not shown, it should be appreciated that piston 1202 and rod 1176 may be reciprocally received within central cavity 1172 of sleeve member 1170 to facilitate pressurization and flow of a working fluid (e.g., drilling mud) through fluid end 1200

(not shown). Moreover, during the rotation of shafts 1424, 1428 and body 1426 about axis 1421, linking member 1430 may also reciprocally translate up and down in the view shown in FIG. 44. Therefore, during operations, lower shaft 1434 may reciprocally slide within throughbores 1449, 1451 of balls 1447, 1455, respectively.

Figure 46:
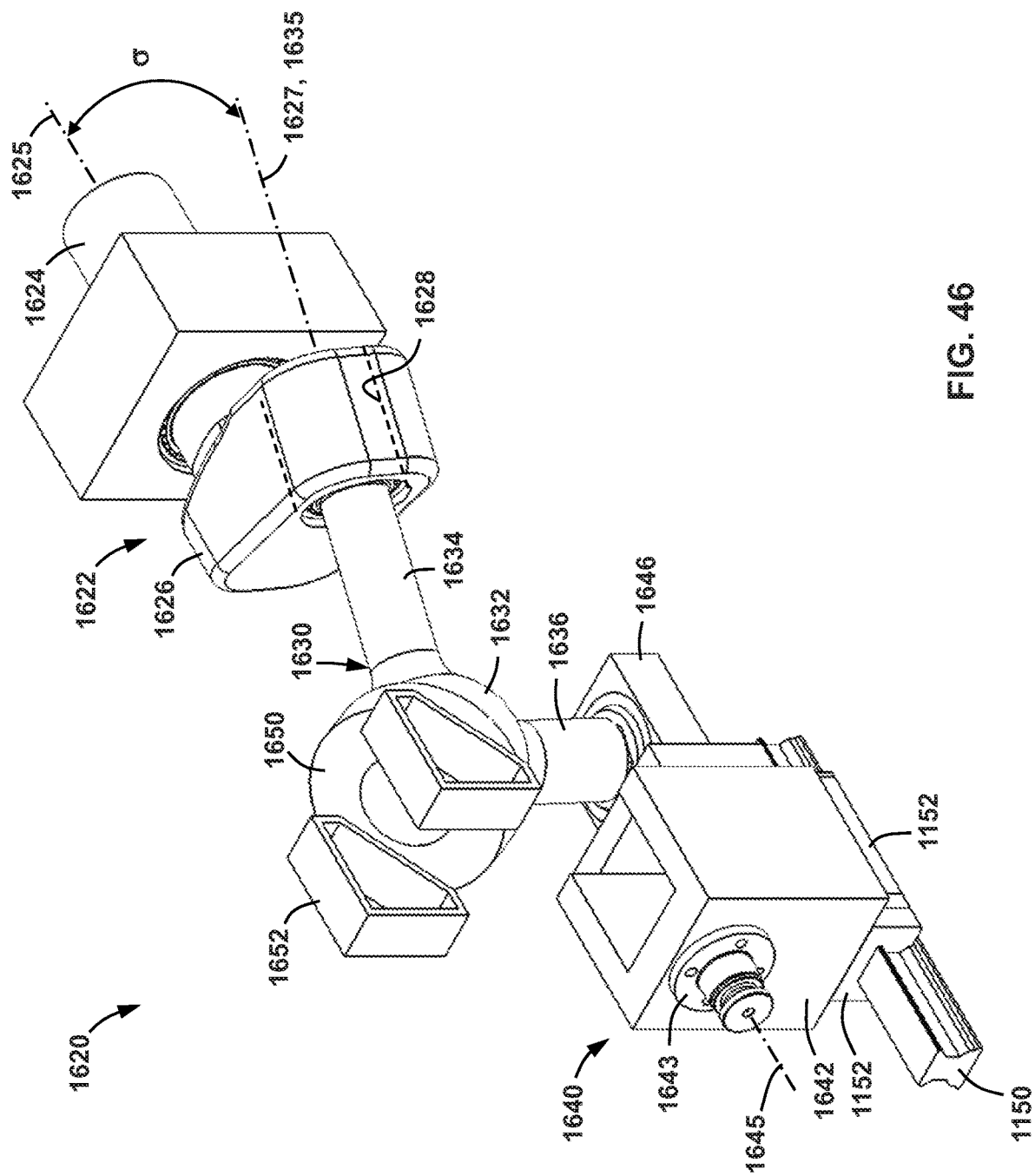
FIG. 46 is a perspective view of another embodiment of a transmission for use within the pump assemblies disclosed herein.
Figure 47:
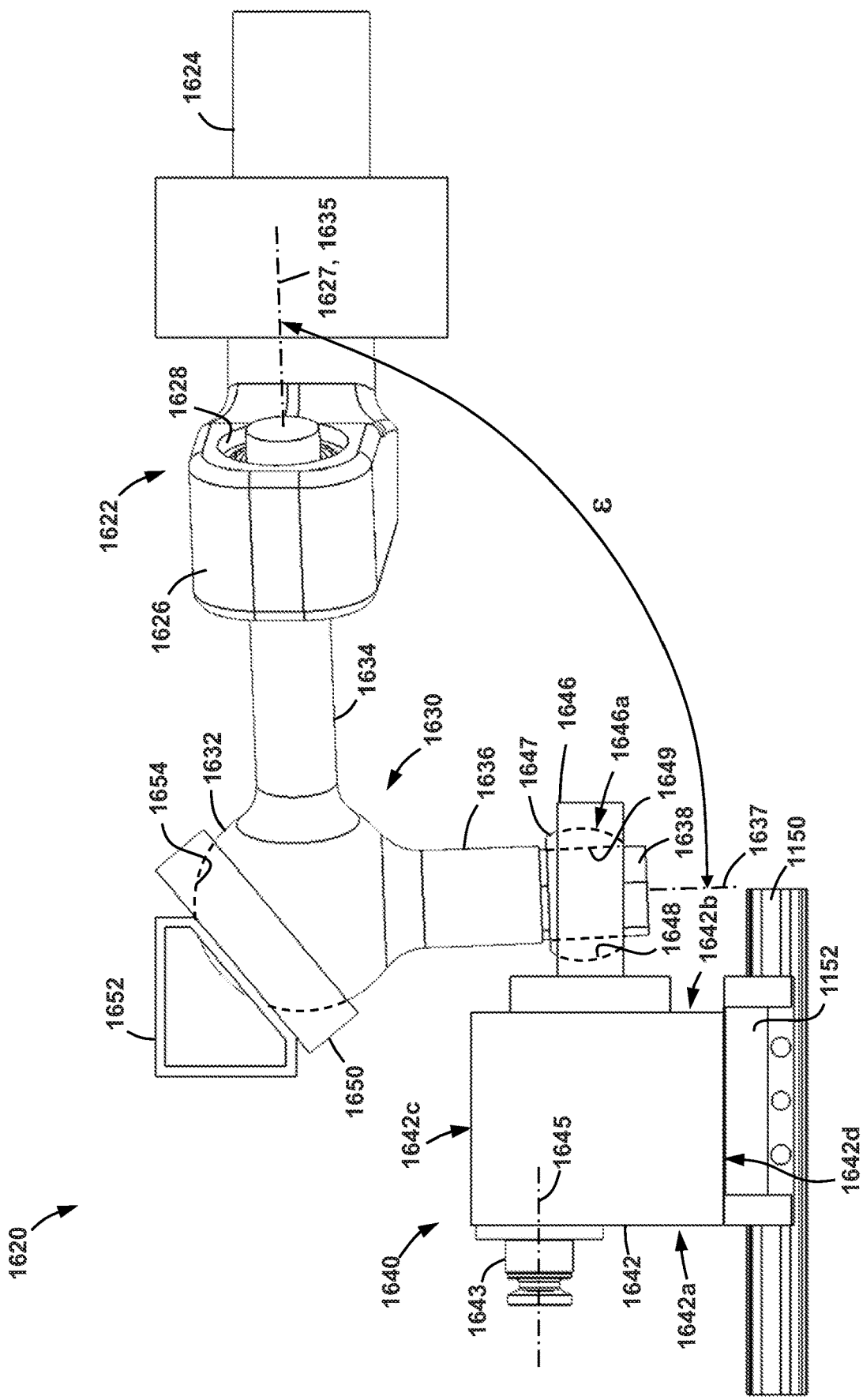
FIG. 47 is a side view of the transmission of FIG. 46.

Referring now to FIGS. 46 and 47, another embodiment of a transmission 1620 for use within pump assemblies 1100, 1400 in place of transmissions 1120, 1420, respectively is shown. Transmission 1620 includes an offset shaft assembly 1622, a carriage assembly 1640, and a linking member 1630. Offset shaft assembly 1622 is coupled to output shaft (e.g., shafts 1118, 1418) of reducer (e.g., reducer 1114), carriage assembly 1640 is coupled to fluid end 1200 (not shown), and linking member 1630 extends between offset shaft assembly 1622 and carriage assembly 1640.

Offset shaft assembly 1622 includes an input shaft 1624 and an offset collar member 1626. As best shown in FIG. 46, input shaft 1624 includes a central axis 1625 that may be generally aligned with a shaft of an output shaft of reducer 1114. Offset collar member 1626 includes a throughbore 1628 that extends along an offset axis 1627 that is disposed at an angle σ relative to central axis 1625 of input shaft 1624 (see FIG. 46). As with the angle θ in pump assembly 1100, in at least some embodiments, the angle σ is between 10° and 20°, more preferably between 15°, and 20°, and still more preferably is equal approximately 20°, where all ranges are inclusive of their endpoints.

During operations, output shaft (e.g., shafts 1118, 1418) of reducer (e.g., reducer 1114) is coupled to input shaft 1624, so that input shaft 1624 is driven to rotate about axis 1625 via motor 1112 and reducer 1114 (see e.g., FIG. 43). As shaft 1624 of offset shaft assembly 1622 rotates about axis 1625, offset collar 1426 and throughbore 1628 also rotate about axis 1625 so that axis 1627 defines a conical sweep about axis 1625 with the tip of the cone disposed at a point of intersection (not shown) between axes 1625, 1627.

Referring still to FIGS. 46 and 47, linking member 1630 includes a central spherical member or portion 1632, a first shaft 1634 extending from spherical member 1632 along a first axis 1635, and a second shaft 1636 extending from spherical member 1632 along a second axis 1637. As best shown in FIG. 47, axes 1635, 1637 are disposed at an angle ε relative to one another. In some embodiments, the angle ε may range between 0° and 180°, and in some of these embodiments may equal approximately 90°. A portion of first shaft 1634 is received within throughbore 1628 so that axis 1635 is aligned with axis 1627 during operations. In addition, second shaft 636 includes an engagement portion or section 1638 that is polygonal in cross-section. Specifically, in this embodiment, engagement section 1638 is hexagonal in cross-section; however, it should be appreciated that engagement section 1638 may be formed into other geometric features or designs. For example, in other embodiments, the cross-section of engagement section 1638 may be a, square, rectangle, triangle, octagonal, pentagonal, oval, etc. As another example, in other embodiments, engagement section 1638 may include one or more axially extending keys and/or splines.

Carriage assembly 1640 includes a main body 1642 and an output shaft coupling 1643 which is configured to be coupled to piston rod 1176 (see FIG. 38). Main body 1642 is a generally rectangular member (i.e., is generally formed as a rectangular parallel piped) that includes a first or front end 1642a, a second or rear end 1642b opposite front end 1642a, a top 1642c and a bottom 1642d. In addition, as best shown in FIG. 47, main body 1642 includes a projection 1646 extending from rear end 1642b that includes an aperture 1646a defining a seat spherical 1648 therein. Output shaft coupling 1643 is mounted to (e.g., with a bolted connection) and extends from front end 1642a of main body 1642 along a central axis 1645.

Referring still to FIGS. 46 and 47, guide rail 1150 is mounted to the supporting frame (not shown in FIG. 47, but see frame 1602 in FIGS. 48 and 49) in the same manner as for pump assembly 1100. In addition, carriage assembly 1640 includes sled members 1152 mounted to bottom 1642d of main body 1642 that slidingly engage with guide rail 1150 in the same manner as described above for carriage assembly 1140 in pump assembly 1100.

During assembly of transmission 1620, engagement section 1438 of second shaft 1636 is inserted through a throughbore 1649 of a ball or spherical bearing member 1647 that is slidably disposed on seat 1648 within aperture 1646a of projection 1646 of carriage assembly 1640. Throughbore 1649 of spherical bearing member 1647 is shaped so as to correspond with the cross-section of engagement section 1638. Therefore, in this embodiment throughbore 1649 is hexagonal in cross-section to correspond with the hexagonal cross-section of engagement section 1638. As a result, when shaft 1636 rotates about axis 1637, the engagement between the hexagonal cross-sections of engagement section 1638 and throughbore 1649 cause spherical bearing member 1647 to also rotate about axis 1637 along with shaft 1636. This rotation of spherical bearing member 1647 is facilitated by sliding engagement of bearing member 1647 and spherical seat 1648. In addition, due to the corresponding hexagonal cross-sections of engagement section 1638 and throughbore 1649, during operations engagement section 1438 of second shaft 1636 may freely slide within throughbore 1649 of ball 1647 along axis 1637.

Further, during assembly of transmission 1620, spherical member 1632 of linking member 1630 is slidably received by a spherical seat 1654 within a mounting collar 1650 mounted to the support frame of the associated pumping assembly (e.g., base 1602 shown in FIGS. 48 and 49) via a mounting bracket 1652. As a result, in this embodiment, linking member 1630 may pivot omni-directionally about the center of curvature (not specifically shown) of spherical member 1632 due to the sliding engagement of spherical member 1632 and seat 1654.

Figure 48:
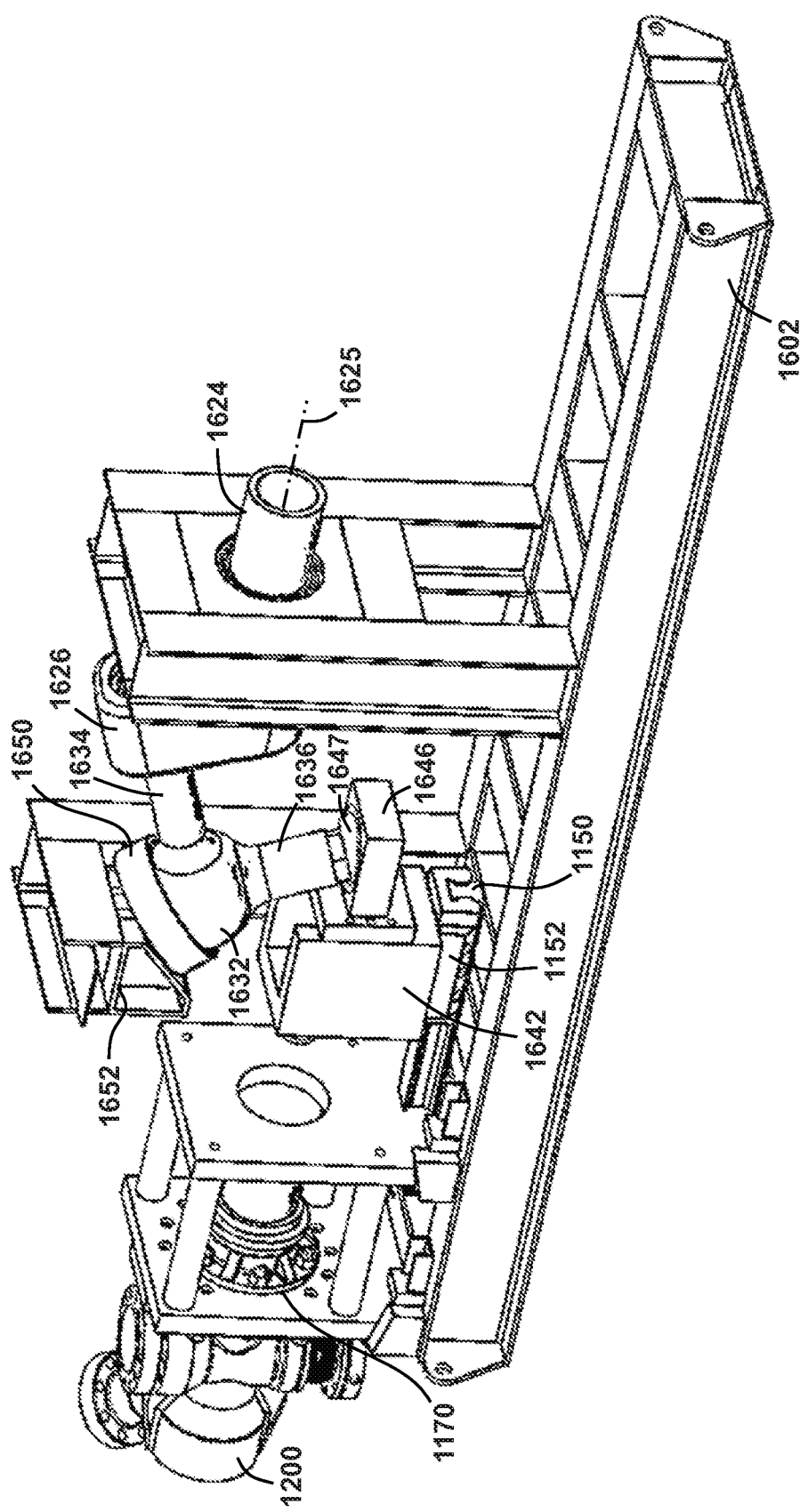
FIGS. 48 and 49 are perspective views of the transmission of FIG. 46 during operations.
Figure 49:
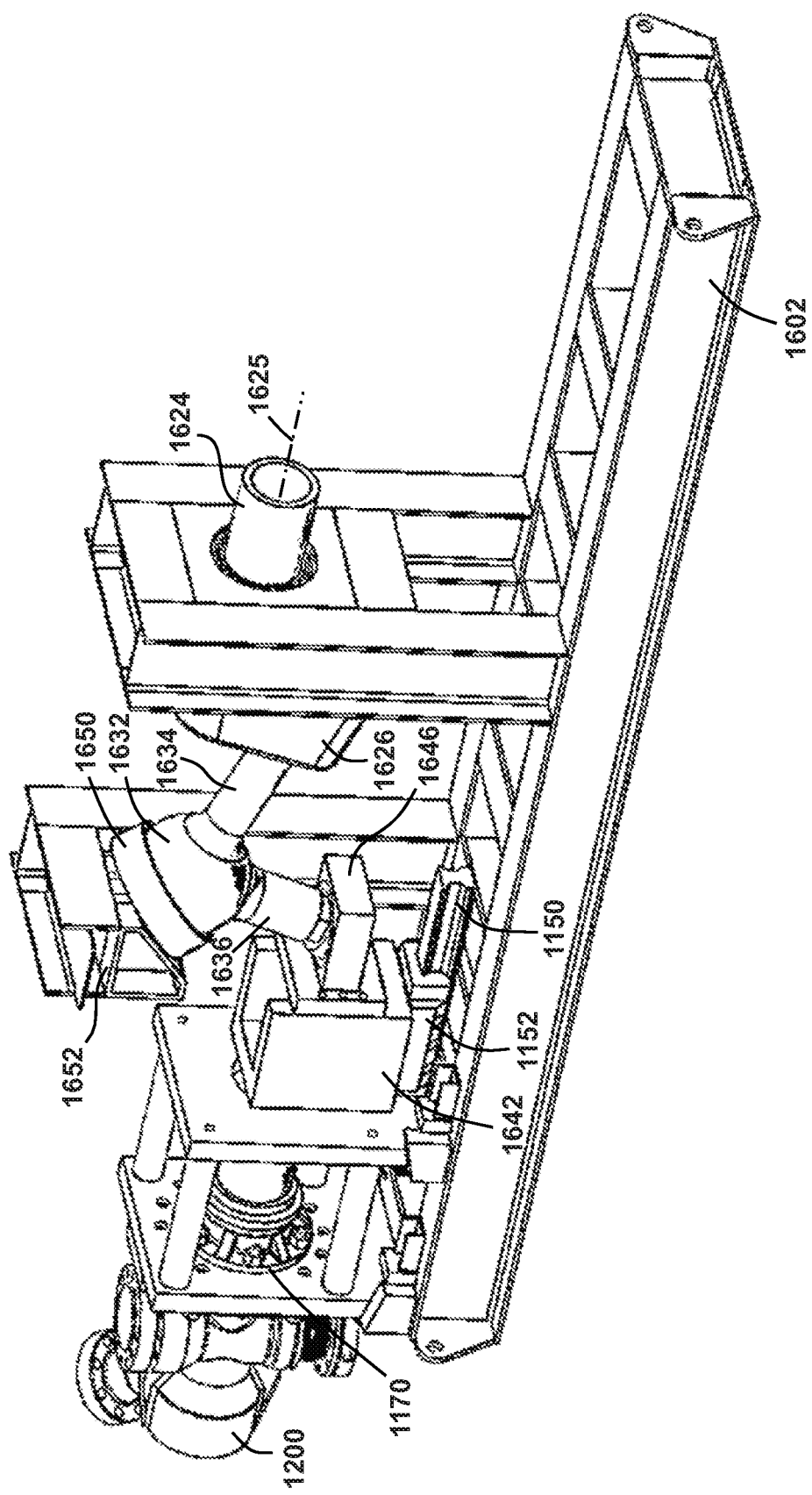

Referring now to FIGS. 46-49 and particularly the progression between FIG. 48 and FIG. 49, during operations, motor (e.g., motor 1110, not shown) drive rotation of output shaft of reducer (e.g., shaft 1118 of reducer 1114, not shown) as previously described. The rotation of the shafts of the motor and reducer cause input shaft 1624 and offset collar 1626 to rotate about axis 1625 so that axes 1627, 1635 of throughbore 1628 and first shaft 1634 trace a cone about axis 1625 as previously described. In addition, the rotation of offset collar member 1626 about axis 1625 also causes a corresponding orbital motion of first shaft 1634 about axis 1625 of shaft 1624 which thereby drives pivoting of spherical member 1632 of linking member 1630 relative to seat 1654 in mounting collar 1650. As spherical member 1632 pivots within seat 1654, ball 1647 and shaft 1636 of linking member 1630 pivot or rotate about axis 1637 relative to seat 1648 and engagement section 1638 reciprocates within throughbore 1649 of ball 1647 along axis 1637. This pivoting of linking member 1630 also causes a reciprocal translation of main body 1642 of carriage assembly 1640 and output shaft coupling 1643 along axis 1645 relative to a base 1602 via sliding engagement between guide rail 1150 and sled members 1152 (see progression from FIG. 48 to FIG. 49).

As previously described above for pump assemblies 1100, 1400, output shaft coupling 1643 of transmission 1620 is secured to piston rod 1176 (not shown) (which carries piston 1202 as previously described), so that translation of output shaft coupling 1643 along axis 1645 also causes translation of piston rod 1176 (not shown) and piston 1202 (not shown) along axis 1645. As a result, transmission 1620 alters or converts the rotational motion of motor 1110 (not shown) into reciprocal motion of piston rod 1176 (not shown). It should be appreciated that piston 1202 and rod 1176 (not shown) may be reciprocally received within central cavity 1172 of sleeve member 1170 (see FIG. 38) to facilitate pressurization and flow of a working fluid (e.g., drilling mud) through fluid end 1200.

Figure 50:
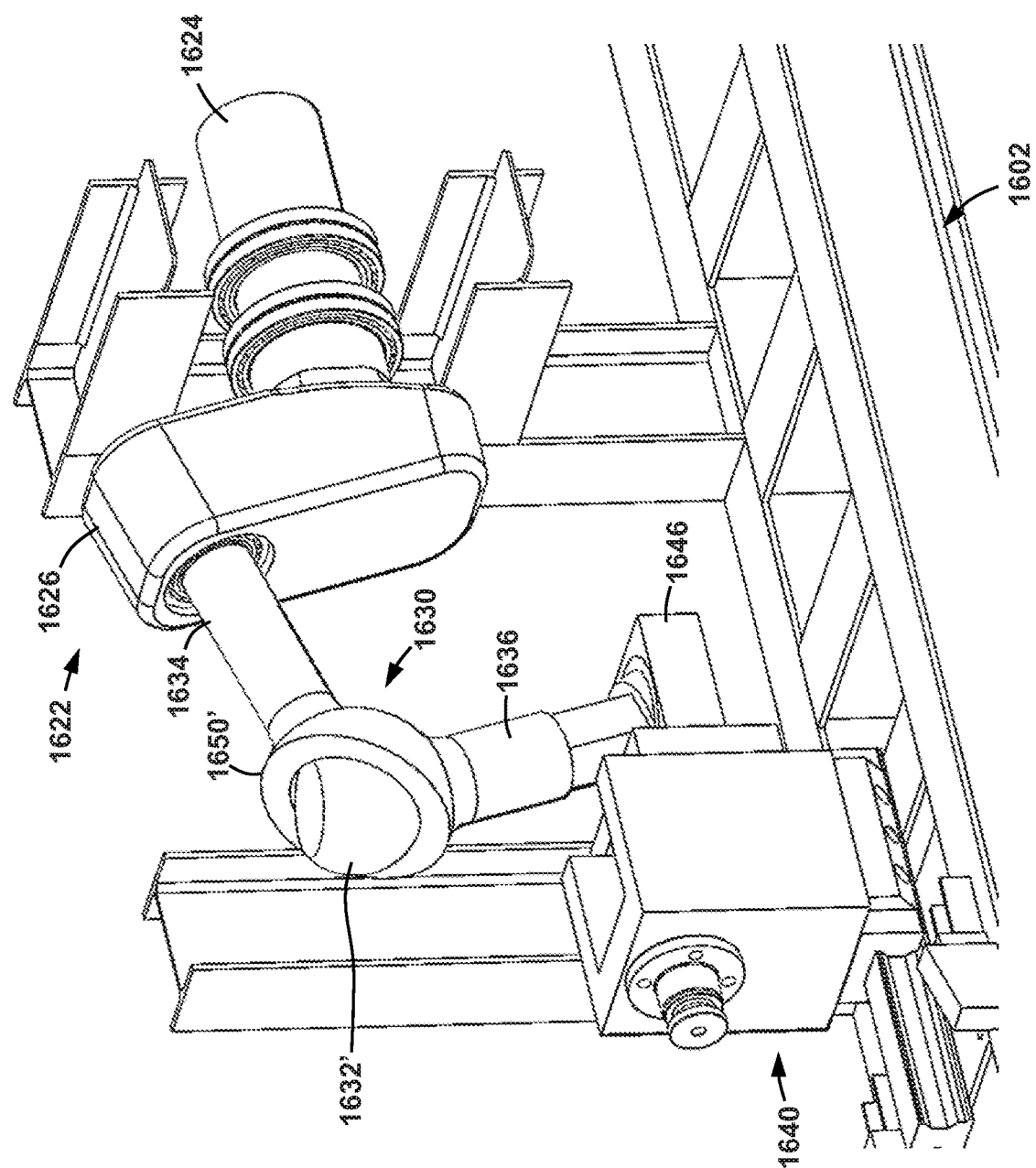
FIG. 50 is a perspective view of another embodiment of a transmission for use within the pump assemblies disclosed herein.

Referring still to FIGS. 47 and 50, in still other embodiments, transmission 1620 may be further altered such that spherical member 1632 on linking member 1630 and mounting collar 1650 are switched. Specifically, in other embodiments, spherical member 1632 on linking member 1630 is replaced with a collar 1650' (e.g., spherical, cylindrical, etc.) that includes a spherical seat defined therein (e.g., such as mounting collar 1650). Rather than having collar 1650 mounted to frame 1602 via mounting bracket 1652 (see FIG. 47), a spherical member 1632' may be secured to frame 1602 via a mounting bracket (not shown). Shafts 1634, 1636 extend from the collar 1650' and engage with offset collar member 1626 and projection 1646 in the same manner as described above. In addition, during operations, rather than pivoting a spherical member 1632 within collar 1650 (see FIG. 47), the collar 1650' of the linking member 1630 pivots about the spherical surface of the spherical member 1632' mounted to frame 1602. All other motions and operations of transmission would be the same as previously described above for transmission 1620 so that a detailed description is omitted herein for purposes of brevity.

Referring back to FIG. 31, as previously described, during operations of pumping system 110 pressure pulsation dampening assembly 1300 controllably actuates a piston to increase or decrease a pressure within a chamber that is fluidly coupled to discharge manifold 1014 to increase or decrease the pressure within discharge manifold 1014 as necessary to attenuate a detected pressure pulsation (e.g., pulsations with a period below some predetermined value). As is also previously described above, the piston (not shown) within pressure pulsation dampening assembly 1300 may be actuated by any suitable method, such as, for example, one or more electric motors, one or more electromagnets, hydraulic pressure, a mechanical component (e.g., lever), etc. The discussion below will now provide embodiments of the pressure pulsation dampening assembly 1300 for use within pumping system 1110. It should be appreciated that either or a combination of the embodiments described below may be used within pumping system 110.

Figure 51:
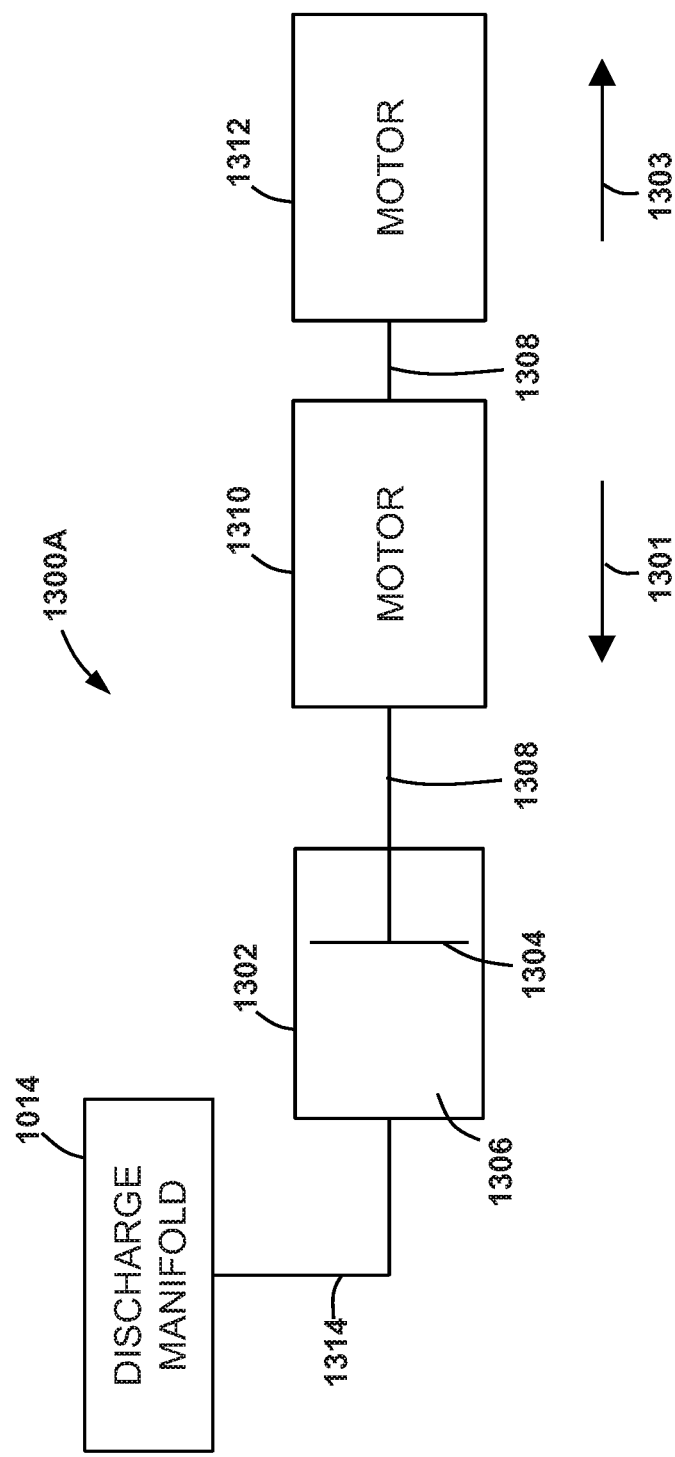
FIG. 51 is a schematic view of an embodiment of the pressure pulsation dampening assembly for use within the pumping system of FIG. 31 in accordance with at least some embodiments disclosed herein.

Referring now to FIG. 51, an embodiment of pulsation dampening assembly 1300 is shown (referred to as pulsation dampening assembly 1300A). Pulsation dampening assembly 1300A includes a pair of electric motors 1310, 1312 coupled to one another along a common shaft 1308. Each of the motors 1310, 1312 is configured to drive or actuate shaft 1308 in an axial or longitudinal direction (with respect to a longitudinal direction of shaft 1308). As a result, each of the motors 1310, 1312 may comprise any suitable motor or driver for driving axial or reciprocal motion of an output shaft. In this embodiment, motor 1310 is configured to actuate shaft 1308 in a first longitudinal direction 1301, and motor 1312 is configured to actuate shaft 1308 in a second longitudinal direction 1303 that is opposite first longitudinal direction 1301. In some embodiments, the motor and shaft assembly 1308/1310/1312 may include various mechanisms converting rotary motion into reciprocating or opposite motions. For example, a scroll or reciprocating bearing can be coupled into the shaft 1308. In other embodiments, the motor/shaft assembly can include various combinations of a REXROTH hollow shaft motor, an electromechanical cylinder model Rexroth EMC-105-HD motor, an electrohydraulic cylinder motor made by SKF, model SRSA 7520, a planetary or ball bearing screw assembly, a roller screw, and a recirculating roller screw. In other embodiments, only a single motor is included within pulsation dampening assembly 1300A that is configured to actuate shaft 1308 in both directions 1301 and 1303.

In addition, pulsation dampening assembly 1300A includes a cylinder 1302 that receives an end of shaft 1308 therein. A piston 1304 is mounted to a distal end (or proximate to the distal end) of shaft 1308 and is received within cylinder 1302 so that piston 1304 sealingly engages with an inner wall 1307 of cylinder 1302 to define a variable volume chamber 1306 within cylinder 1302. As a result, actuating shaft 1308 in directions 1301, 1303 via motors 1310, 1312, respectively, changes or adjusts the size or volume of the variable volume chamber 1306 within cylinder 1302.

Referring still to FIG. 51, discharge manifold 1014 (which receives discharged fluid from pump assemblies 1100 and/or pump assemblies 1400) is fluidly coupled to the variable volume chamber 1306 within cylinder 1302 via a line 1314. Line 1314 may comprise any suitable fluid and/or pressure communicating conductor such as, for example, a tube, pipe, hose, conduit, etc. Thus, if the pressure within discharge manifold 1014 increases or decreases (e.g., due to a pressure spike or drop from one or both pump assemblies 1100) the increased or decreased pressure is communicated to variable volume chamber 1306 via line 1314.

During operations, if a pressure spike (e.g., a pressure increase above some predetermined value or threshold) is sensed in or upstream of discharge manifold 1014 (e.g., via pressure sensors 152 shown in FIG. 31 and/or a pressure sensor disposed within discharge manifold 1014 itself), motor 1312 may be actuated (e.g., by controller 150 in FIG. 31) to translate shaft 1308 and piston 1304 in the second longitudinal direction 1303 and therefore increase the volume of variable volume chamber 1306. This increase in volume with the variable volume chamber 1306 also works to reduce the pressure in chamber 1306 and thus also discharge manifold 1014 to thereby "take up" and/or attenuate the pressure spike (or pulsation). If, on the other hand, a pressure drop or decrease (e.g., a pressure decrease below some predetermined value or threshold) is sensed in or upstream of discharge manifold 1014 (e.g., via pressure sensors 152 shown in FIG. 31 and/or a pressure sensor disposed within discharge manifold 1014 itself), motor 1310 may be actuated (e.g., by controller 150 in FIG. 31) to actuate shaft 1308 and piston 1304 in the first longitudinal direction 1301 and therefore decrease the volume of variable volume chamber 1306. This decrease in volume within the variable volume chamber 1306 also works to increase the pressure within chamber 1306 and, thus, also within discharge manifold 1014 to thereby "take up" and/or attenuate the pressure drop (or pulsation).

Figure 52:
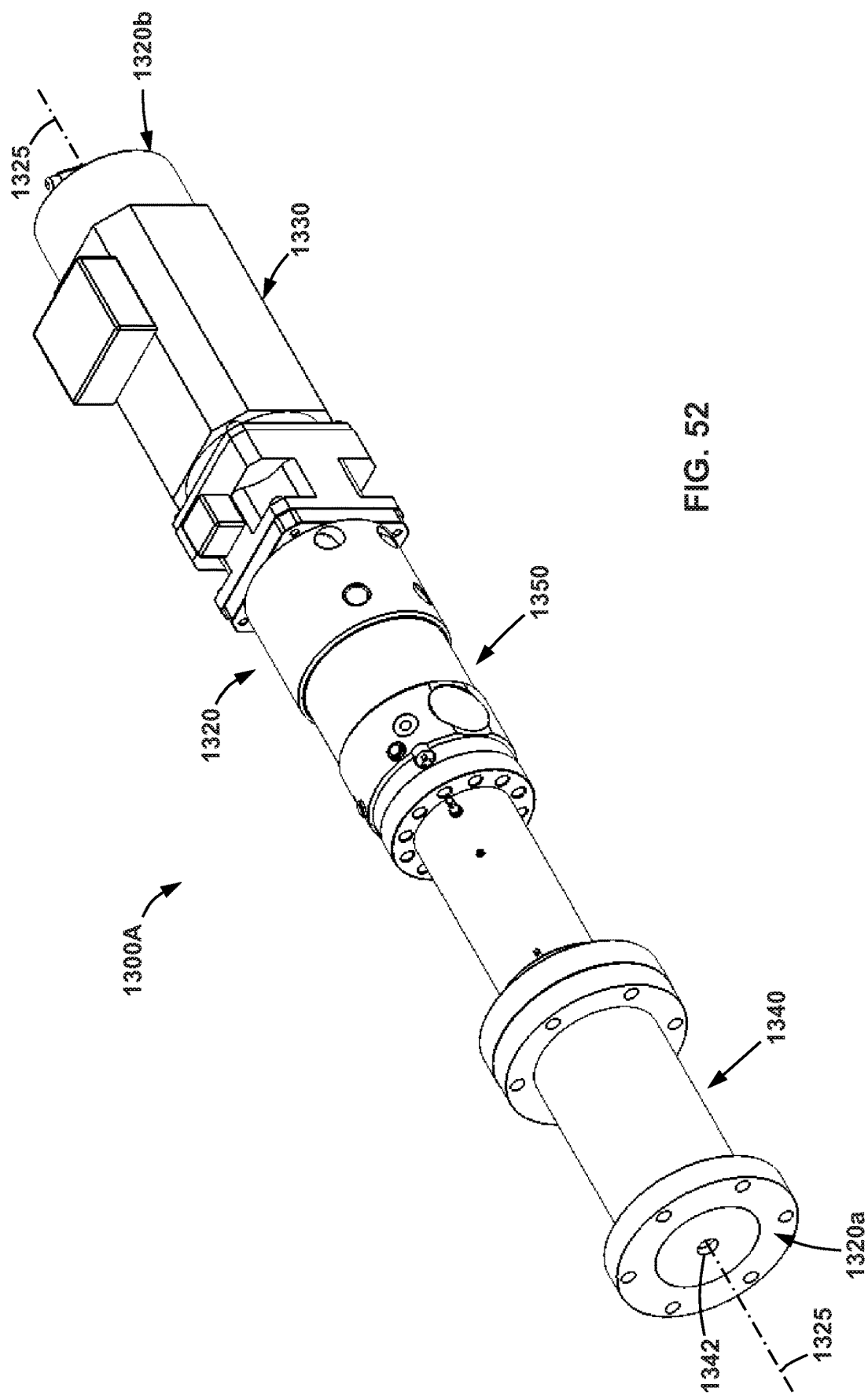
FIG. 52 is a perspective view of the pressure pulsation dampening assembly of FIG. 51.

Referring now to FIG. 52, in this embodiment, pressure pulsation dampening assembly 1300A is disposed within an elongate housing 1320. As shown in FIG. 52, housing 1320 includes a central or longitudinal axis 1325, a first end 1320a, and a second end 1320b opposite first end 1320a. In addition, housing 1320 includes a motor or driver section 1330 extending from second end 1320b, a cylinder section 1340 extending from first end 1320a, and a linking section 1350 extending axially between driver section 1330 and cylinder section 1340. While not specifically shown in FIG. 52, it should be appreciated that driver section 1330 houses or receives motors 1310, 1312, and cylinder section 1340 defines cylinder 1302. A port or aperture 1342 extends axially into first end 1320a to provide communication into variable volume chamber 1306 via line 1314 (see FIG. 51) during operations.

Figure 53:
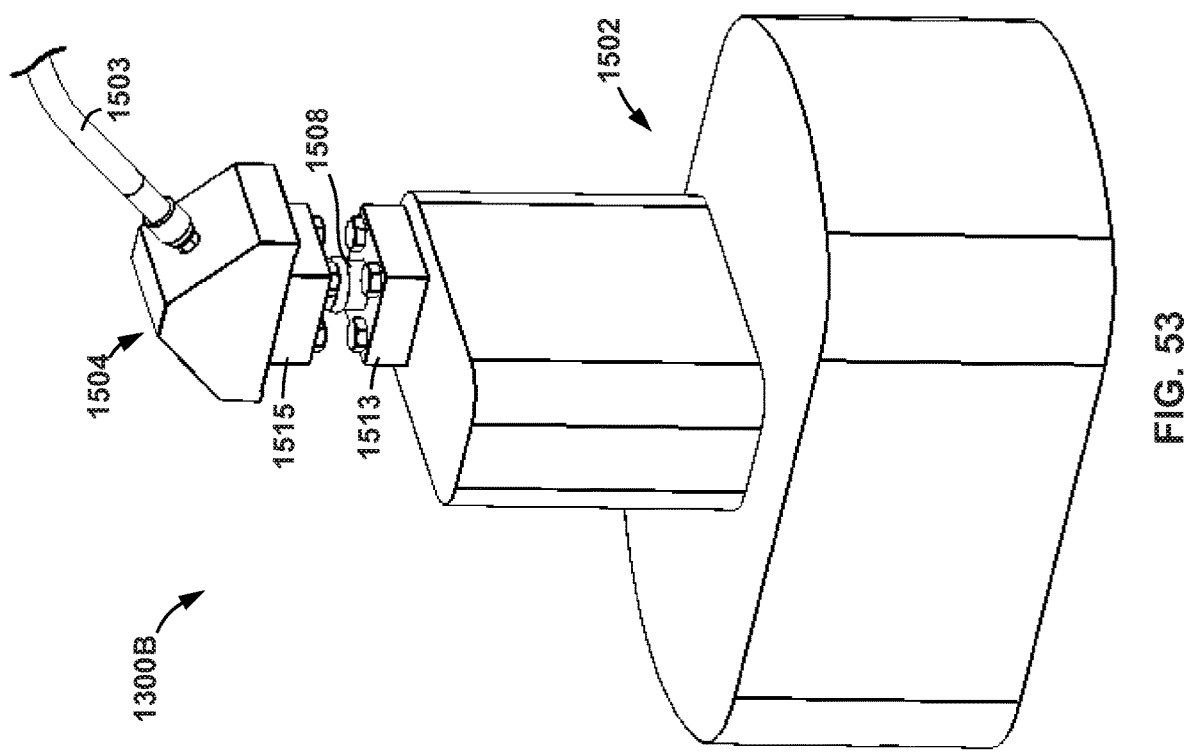
FIG. 53 is a perspective view of an embodiment of the pressure pulsation dampening assembly for use within the pumping system of FIG. 31 in accordance with at least some embodiments disclosed herein.
Figure 54:
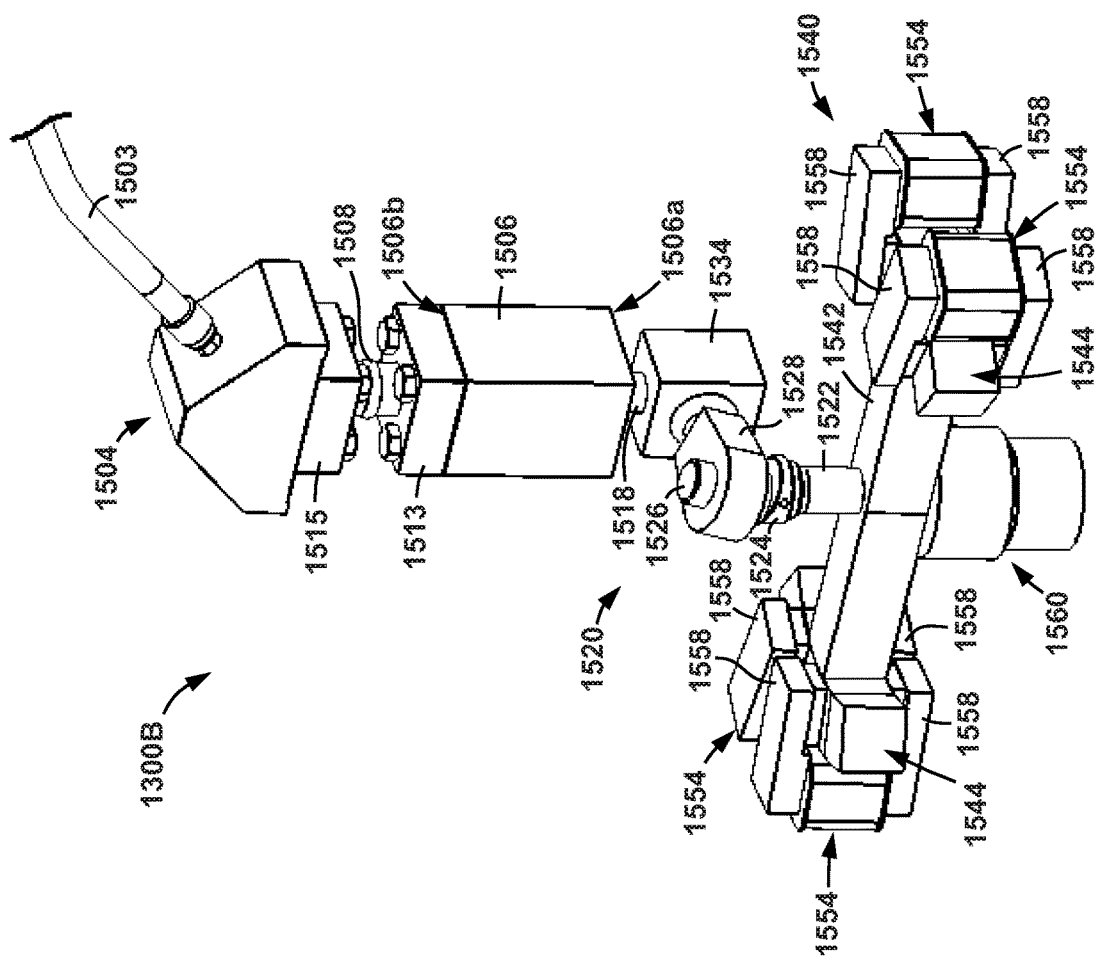
FIG. 54 is another perspective view of the pressure pulsation dampening assembly of FIG. 53 with the outer housing removed.

Referring now to FIGS. 53 and 54, an embodiment of pulsation dampening assembly 1300 is shown (referred to as pulsation dampening assembly 1300B). Pulsation dampening assembly 1300B includes connection hub 1504, a pressurization chamber 1506, a transmission 1520, and a drive assembly 1540. As shown in FIG. 53, pressurization chamber 1506, transmission 1520, and drive assembly 1540 may all be substantially covered or disposed within an outer housing 1502.

Figure 55:
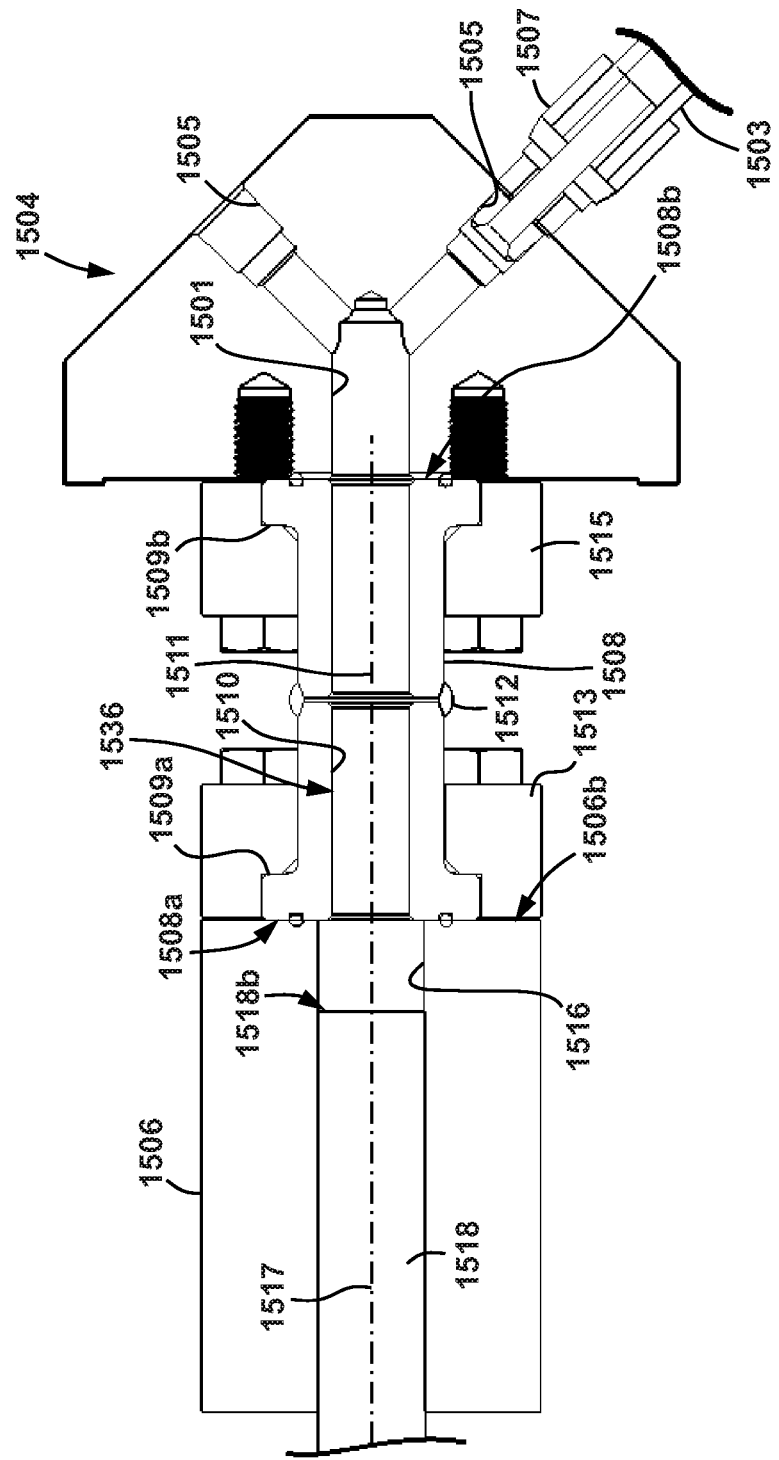
FIG. 55 is a side cross-sectional view of the hub and pressurization chamber of the pressure pulsation dampening assembly of FIG. 53.

Referring now to FIGS. 54 and 55, connection hub 1504 includes an internal passage 1501 and a pair of connection ports 1505 in fluid communication with passage 1501. In this embodiment, a connector 1507 is inserted within one of the ports 1505. Connector 1507 is disposed at the end of a conduit 1503 which is in fluid communication with discharge manifold 1014 (see FIG. 31). The other of the two ports 1505 is shown open in FIG. 55; however, it should be appreciated that this additional port may be coupled to a similar connector (e.g., connector 1507) or it may be plugged.

Pressurization chamber 1506 includes a first end 1506a, a second end 1506b opposite first end 1506a, and throughbore 1516 extending along a central axis 1517 between ends 1506a, 1506b. As shown in FIG. 55, second end 1506b is connected to hub 1504 through a connection spool 1508. Spool 1508 is an elongate tubular member that includes a central axis 1511, a first end 1508a, a second end 1508b opposite first end 1508a, and a throughbore 1510 extending axially between ends 1508a, 1508b. First end 1508a includes a first connection flange 1509a, and second end 1508b includes a second connection flange 1509b. First connection flange 1509a abuts or engages with second end 1506b of pressurization chamber 1506 so that throughbore 1510 is coaxially aligned with throughbore 1516 of pressurization chamber 1506 along axes 1517, 1511. A connection block 1513 is installed over and/or around first connection flange 1509a and is bolted to second end 1506b of pressurization cylinder 1506 to thereby secure connection spool 1508 to chamber 1506. Similarly, second connection flange 1509b abuts or engages with connection hub 1504 so that internal passage 1501 and throughbore 1510 are generally aligned. Another connection block 1513 (which in this embodiment is similar to connection block 1513) is installed over and/or around second connection flange 1509b and is bolted to connection hub 1504 to thereby secure connection spool 1508 to hub 1504.

In this embodiment, connection spool 1508 comprises a pair of flanged tubular members that are joined or secured to one another at an annular weld 1512. However, it should be appreciated that in other embodiments, connection spool 1508 may be formed as one single, monolithic piece with each of the connection flanges 1509a, 1509b integral therewith.

Figure 56:
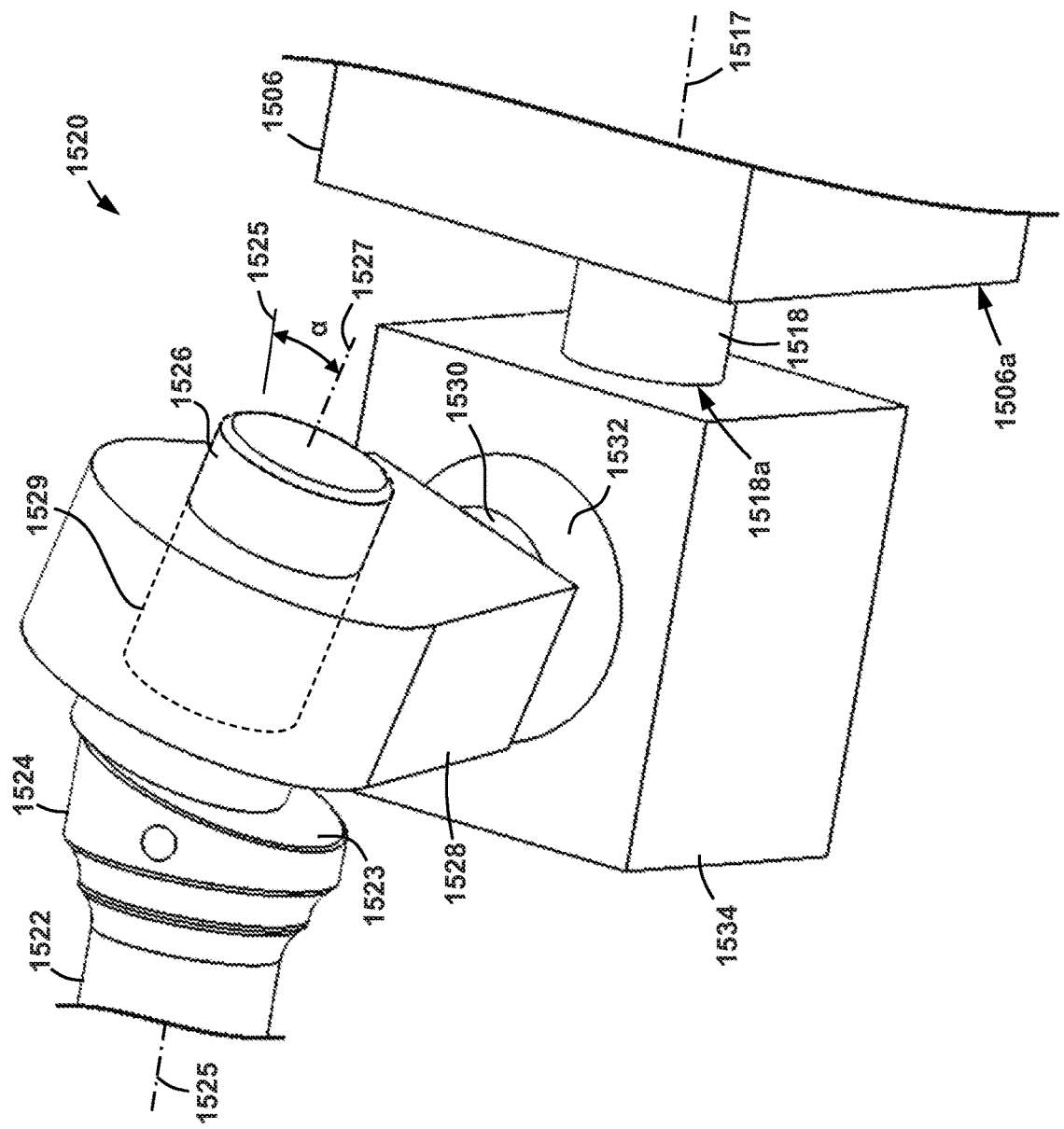
FIG. 56 is a perspective view of the transmission of the pressure pulsation dampening assembly of FIG. 53.

Referring now to FIGS. 54 and 56, transmission 1520 is disposed between drive assembly 1540 and pressurization chamber 1506 and is configured to convert the rotational motion of drive assembly 1540 (discussed in more detail below) into axial motion. In this embodiment, transmission 1520 operates in a manner similar to that described above for transmission 1120 of pump assembly 1100 (see FIGS. 36 and 37). Specifically, transmission 1520 includes an input shaft 1522 having a central axis 1525, an offset or angled shaft 1526 having a central axis 1527, and a central linking body 1524 connecting each of the shafts 1522, 1526 to one another. Central linking body 1524 includes a planar face 1523 that is disposed within a plane (not specifically shown) that is oriented at an angle α with respect to axis 1525 (i.e., planar face 1523 does not extend radially with respect to axis 1525. Offset shaft 1526 extends normally from planar face 1523 so that axis 1527 of offset shaft 1526 is also disposed at the angle α to a projection of axis 1525. In some embodiments, the angle α ranges from 8° to 25°, inclusive. Thus, as shaft 1522 rotates about axis 1525, offset shaft 1526 also rotates about axis 1525 so that axis 1527 of offset shaft 1526 traces or sweeps a cone about a projection of axis 1525 with the tip of the cone being disposed at the intersection point (not specifically shown) of axis 1527 and the projection of axis 1525.

Transmission 1520 also includes a linking member 1528 that includes a throughbore 1529 proximate one end, and a shaft 1530 extending toward and opposite end. Throughbore 1529 receives offset shaft 1526 therethrough so that offset shaft 1526 may freely rotate about axis 1527 within throughbore 1529 during operations. A travelling block 1534 receives shaft 1530 therein via a ball connection 1532 so that ball 1532 may freely pivot within travelling block 1534 (e.g., omni-directionally or within a plane including the axis 1525 of shaft 1522), and shaft 1530 may reciprocate within ball 1532.

Referring now to FIGS. 55 and 56, an output plunger 1518 is mounted to travelling block 1534 that includes a first end 1518a and a second end 1518b opposite first end 1518a. As shown in FIG. 56, first end 1518a is mounted or engaged with traveling block 1534 and as shown in FIG. 55, second end 1518b is disposed within throughbore 1516 of pressurization chamber 1506. In at least some embodiments, plunger 1518 sealingly engages with either the inner wall of throughbore 1516 or with a wiper or seal assembly disposed about plunger 1518 within or proximate throughbore 1516. Thus, with second end 1518b of plunger 1518 disposed within throughbore 1516, a variable volume chamber 1536 is defined that includes the portion of throughbore not occupied by plunger 1518, throughbore 1510 of connection spool 1508, inner passage 1501, and ports 1505. Reciprocation of plunger 1518 within throughbore 1517 changes or adjust the volume of the variable volume chamber 1536.

Referring now to FIG. 56, during operations, drive assembly 1540 drives or causes rotation of shaft 1522 so that offset shaft 1526 rotates about a projection of axis 1525 of shaft 1522 as previously described. Because of the relative angle between shafts 1522, 1526 (e.g., the angle α), rotation of shaft 1526 about a projection of axis 1525 causes pivoting of linking member 1528 about the intersection point (not shown) of axis 1527 and the projection of axis 1525. The pivoting of linking member 1528 drives or causes axial movement of travelling block 1534 and thus also plunger 1518 along axis 1517 of throughbore 1516 (see FIG. 55). While not specifically shown, travelling block 1534 may be supported by one or more rails or guides that facilitate the axial movement of travelling block 1534 along axis 1517 during operations.

Figure 57:
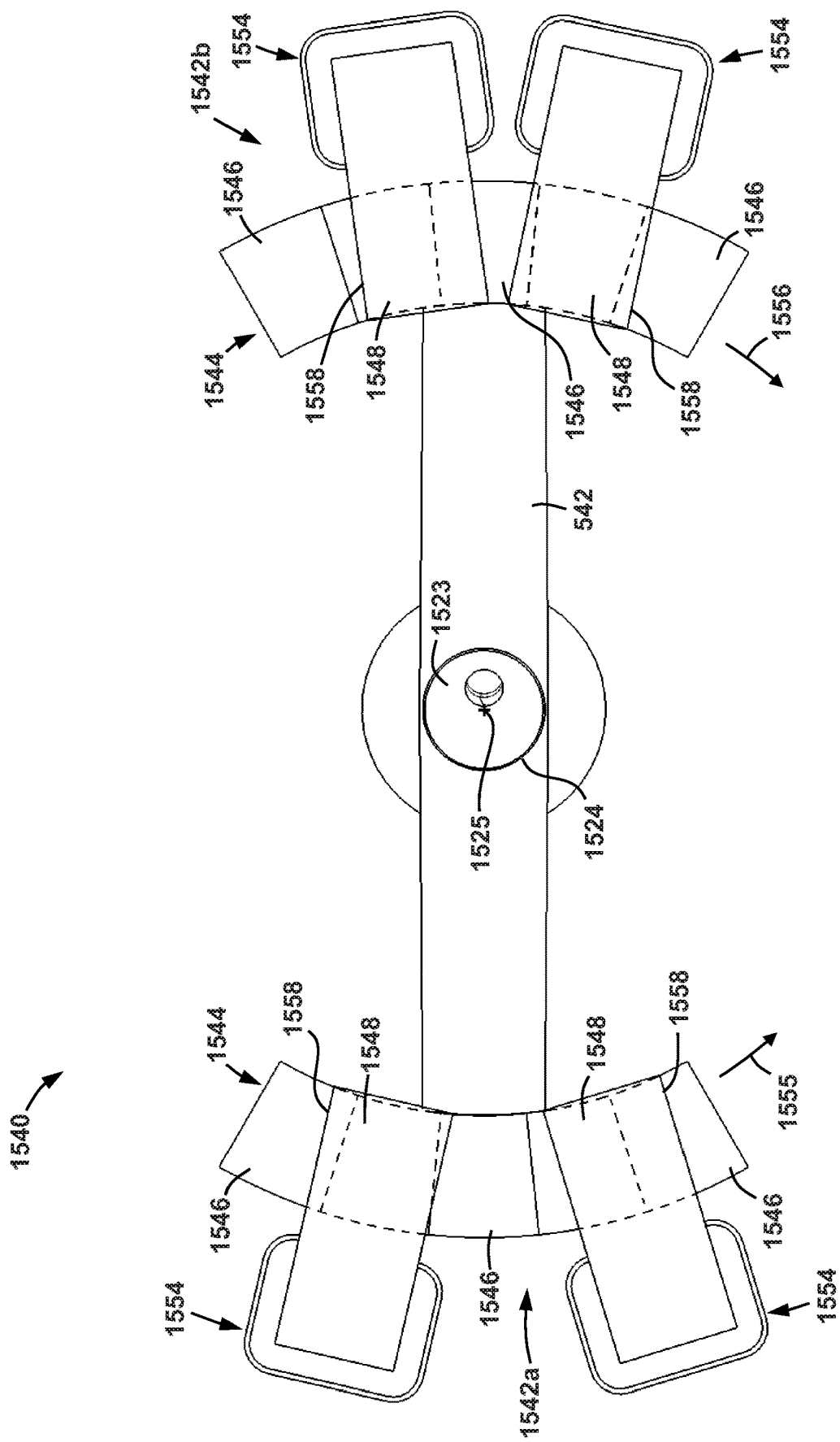
FIG. 57 is a top view of the driving assembly of the pressure pulsation dampening assembly of FIG. 53.

Referring now to FIGS. 54 and 57, drive assembly 1540 includes a linking arm 1542 that is coupled to input shaft 1522 of transmission 1520 so that arm 1542 generally extends orthogonally with respect to a projection of axis 1525 of shaft 1522. In addition, linking arm includes a first end 1542a and a second end 1542b opposite first end 1542a.

A pair of magnet assemblies 1544 is mounted at ends 1542a, 1542b of linking arm 1542, with each of the magnet assemblies 1544 mounted to a corresponding one of the ends 1542a, 1542b. As best shown in FIG. 57, each of the magnet assemblies 1544 is generally arcuately shaped and includes a plurality of magnets 1546, 1548. Specifically, each of the magnet assemblies 1544 includes a plurality of magnets of alternating polarities—so that each assembly 1544 has a plurality of magnets 1546 having a first polarity and a plurality of magnets 1548 having a second polarity that is opposite the first polarity. Within each assembly 1544, each of the magnets 1546 is arranged adjacent to one or more of the magnets 1548, so that none of the magnets 1546 are immediately adjacent another of the magnets 1546 and none of the magnets 1548 are immediately adjacent another of the magnets 1548.

Referring still to FIGS. 54 and 57, a plurality of electromagnet assemblies 1554 are disposed about magnet assemblies 1544. As best shown in FIG. 54, each electromagnet assembly 1554 includes a pair of terminals 1558 that are disposed on opposing sides of magnet assemblies 1544, and are configured to induce a magnetic field between terminals 1558 during operations. As best shown in FIG. 57, in this embodiment, there are total of four electromagnets 1554, with two electromagnets 1554 being disposed about each of the magnet assemblies 1544. The electromagnets 1554 disposed about magnet assembly 1544 at first end 1542a of linking arm 1542 are asymmetrically arranged about a projection of axis 1525 relative to the electromagnets 1554 disposed about magnet assembly 1544 at second end 1542b of linking arms 1542. As a result, terminals 1558 of each electromagnet 1548 are disposed at a different (at least slightly) circumferential alignment with magnets 1546, 1548 of magnet assemblies 1544, with respect to axis 1525. Thus, during operations, electromagnets 1554 may be controllably activated (e.g., by controller 150—see FIG. 31) to induce a desired magnetic field between terminals 1558. Depending on which of the electromagnet(s) 1554 are activated, and the circumferential alignment of the activated electromagnet(s) 1554 relative to magnets 1546, 1548 with respect to axis 1525, the selective activation of one or more of the electromagnets 1554 causes linking arm 1542 to pivot about axis 1525 to allow the magnets 1546, 1548 to align themselves with the magnetic field induced between the activated terminals 1558. Thus, through selective activation of electromagnets 1554 and the asymmetric arrangement or alignment of electromagnets 1554 relative to magnets 1546, 1548 about axis 1525, the linking arm 1542 may be controllably and selectively pivoted or rotated in two opposing circumferential directions 1555, 1556 during operations.

Referring back now to FIGS. 54-57, during operations, if a pressure spike or increase is sensed within or upstream of discharge manifold 1014 (e.g., via sensors 152 of other sensors within pumping system 110 in FIG. 31), one or more of the electromagnets 1554 may be actuated to pivot linking arm 1542 about axis 1525 in the manner described above, to rotate shaft 1522 and pivot linking member 1528 in transmission 1520 to thereby retract or withdrawn plunger 1518 within throughbore 1516 of pressurization chamber 1506. This withdrawal of plunger 1518 increases the volume of variable volume chamber 1536. This increase in volume with the variable volume chamber 1536 also works to reduce the pressure in chamber 1536 and thus also discharge manifold 1014 via conduit 1503 to thereby "take up" and/or attenuate the pressure spike (or pulsation). Conversely, if a pressure drop or decrease is sensed within or upstream of discharge manifold 1014, one or more of the electromagnets 1554 may be activated to pivot linking arm 1542 about axis 1525 and pivot linking member 1528 in transmission 1520 to thereby advance plunger 1518 within throughbore 1516 of pressurization chamber 1506. This advancement of plunger 1518 decreases the volume of variable volume chamber 1536. This decrease in volume with the variable volume chamber 1536 also works to increase the pressure in chamber 1536 and thus also discharge manifold 1014 via conduit 1503 to thereby "take up" and/or attenuate the pressure drop (or pulsation).

In at least some embodiments, the electromagnets 1554 may be selectively actuated (e.g., by controller 150 in FIG. 31) to produce a desired amount of volume change within variable volume chamber 1536 to effectively take up the sensed pressure pulsation (e.g., increase or decrease). Thus, if a relatively large or small pressure pulsation is sensed, the amount of desired axial translation (e.g., advancement or withdrawal) of plunger 1518 may be increased or decreased, respectively, to appropriately address the sensed pressure pulsation.

Figure 58:
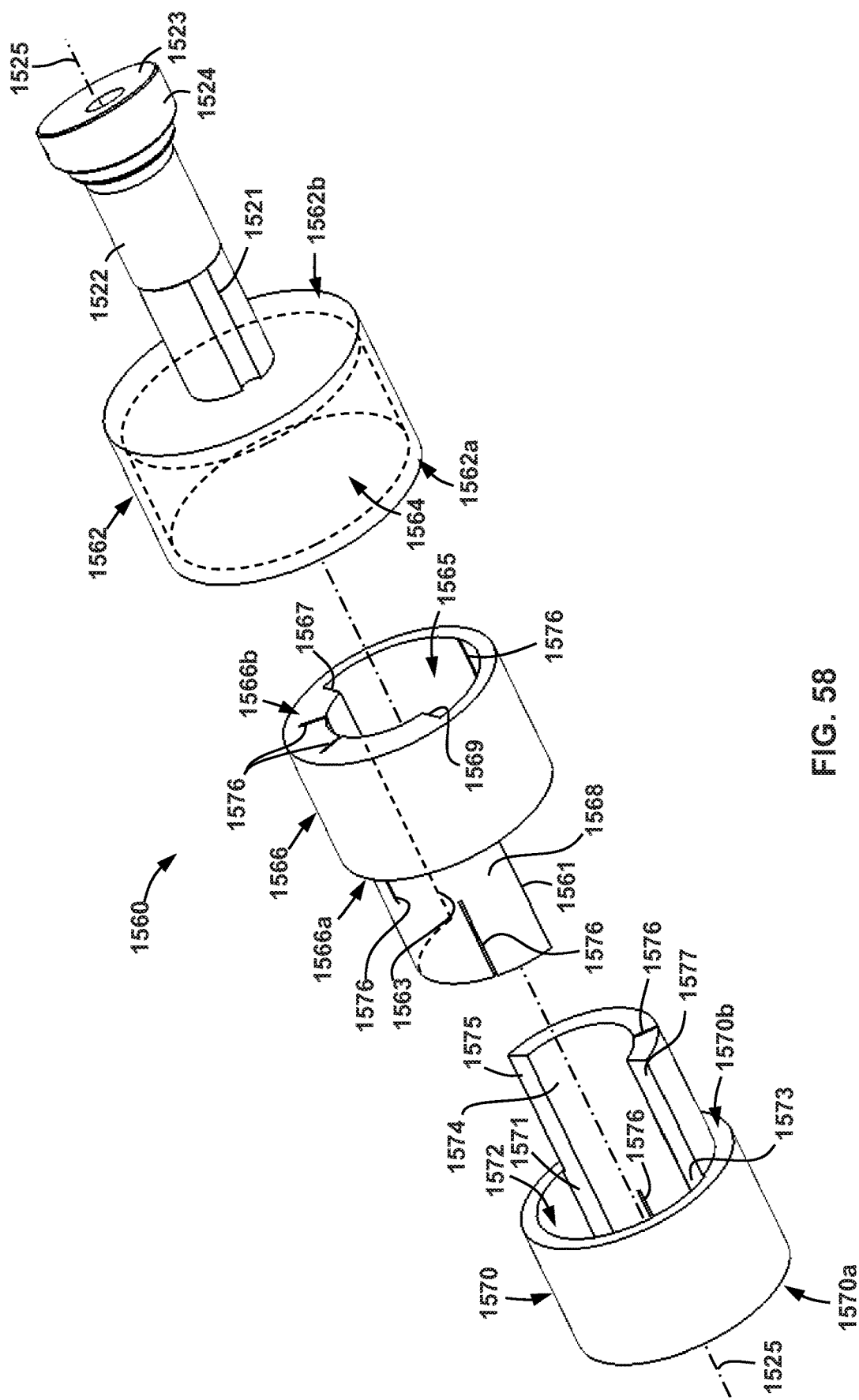
FIG. 58 is a perspective, exploded view of the torsional biasing assembly of the pressure pulsation dampening assembly of FIG. 53.
Figure 59:
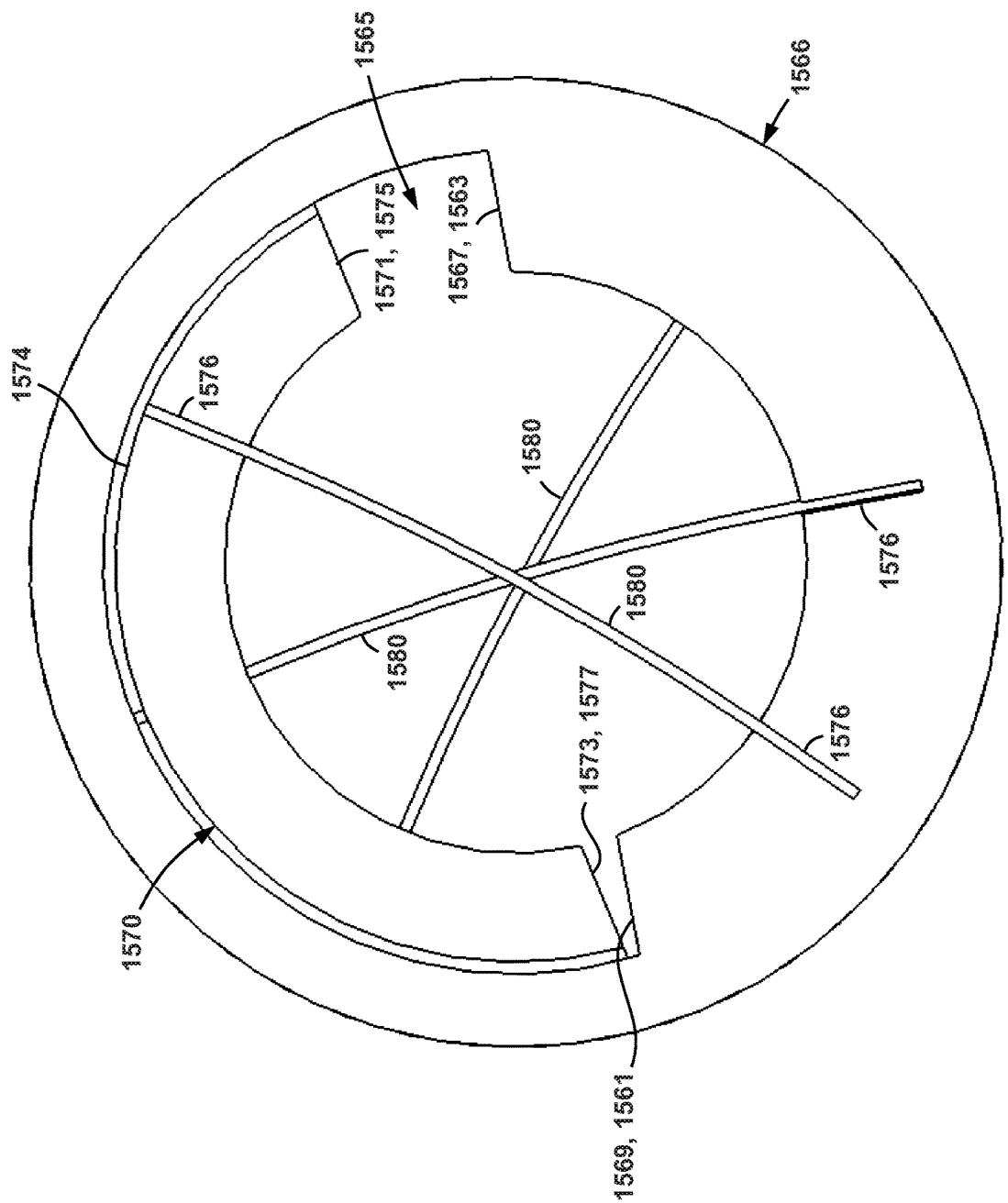
FIG. 59 is an end view of the torsional biasing assembly of FIG. 68.

Referring now to FIGS. 54, 58, and 59, a torsional biasing assembly 1560 is mounted to drive assembly 1540 to torsionally or angularly bias linking arm 1542 to a starting or neutral position or alignment about axis 1525. Without being limited to this or any other theory, biasing linking arm 1542 to a known starting position allows a controller (e.g., controller 150 in FIG. 31) to assume the initial position of plunger 1518 within throughbore 1517 and thus the initial volume of variable volume chamber 1536 (see FIG. 55). An accurate assumption as to the initial position of plunger 1518 and volume of variable volume chamber 1536 allows the controller to calculate the appropriate axial translation of plunger 1518 for appropriately taking up the sensed pressure pulsation (e.g., pressure increase or decrease).

As shown in FIG. 58, torsional biasing assembly 1560 generally includes a mounting member 1562, a first rotational member 1566, and a second rotational member 1570. Mounting member 1562 is secured to input shaft 1522 of transmission 1520 and is generally shaped as a right-circular cylinder that includes a first or open end 1562a, a second or closed end 1562b, and a cylindrical recess 1564 extending axially from open end 1562a with respect to taxis 1525 (note: recess 1564 is shown with a hidden line in FIG. 58). Input shaft 1522 extends axially from closed end 1562b. A portion of shaft 1522 proximate closed end 1562b of mounting member 1562 includes a groove or keyway 1521 to receive a corresponding key that may be mounted to linking arm 1542 of driving assembly 1540 to ensure that linking arm 1542 and shaft 1522 rotate with one another about axis 1525 in the manner described above.

First rotational member 1566 is a cylindrical member that includes a first end 1566a, and a second end 1566b opposite first end 1566a. A through passage 1565 extends axially between ends 1566a, 1566b that defines a pair of axially extending shoulders 1567, 1569 that, in this embodiment, are radially opposite one another across axis 1525 (i.e., shoulders 1567, 1569 are disposed approximately 180° from one another about axis 1525). However, it should be appreciated that other spacing intervals (e.g., above or below 180°) for shoulders 1567, 1569 are possible in other embodiments. An arcuate projection 1568 extends axially from first end 1566a that is generally shaped as an arcuate section or portion of a right-circular cylinder. Projection 1568 includes or defines a pair of axially extending shoulders 1561, 1563 that are flush or coincident with shoulders 1569, 1567, respectively. As a result, in this embodiment, shoulders 1561, 1563 are radially opposite one another about axis 1525.

Second rotational member 1570 is a cylindrical member that includes a first end 1570a, and a second end 1570b opposite first end 1570a. A through passage 1572 extends axially between ends 1570a, 1570b that defines a pair of axially extending shoulders 1573, 1571 that, in this embodiment, are circumferentially spaced less than 180° from one another about axis 1525. However, it should be appreciated that other spacing intervals (e.g., above, below, or equal to 180°) for shoulders 1573, 1571 are possible in other embodiments. An arcuate projection 1574 extends axially from second end 1570a that is generally shaped as an arcuate section or portion of a right-circular cylinder. Projection 1574 includes or defines a pair of axially extending shoulders 1577, 1575 that are flush or coincident with shoulders 1573, 1571, respectively. As a result, in this embodiment, shoulders 1577, 1575 are circumferentially spaced from one another less than 180° about axis 1525.

A plurality of mounting slits or slots 1576 extend radially into both through passages 1565, 1572 and projections 1568, 1574. As will be described in more detail below, slits 1576 received ends of biasing members (discussed below) to rotationally bias mounting member 1562 and first rotational member 1560 relative to second rotational member 1570 during operations.

Referring now to FIGS. 54, 58, and 59, when torsional biasing assembly 1560 is assembled as shown in FIG. 54, projection 1574 of second rotational member 1570 is received axially within through passage 1565 of first rotational member 1565 such that shoulders 1577, 1575 circumferentially oppose shoulders 1569, 1567, respectively. Similarly, projection 1568 of first rotational member 1566 is received axially within through passage 1572 of second rotational member 1570 such that shoulders 1561, 1563 circumferentially oppose shoulders 1573, 1571, respectively. Projections 1568, 1574 are received within through passages 1572, 1565, respectively, until second end 1570b abuts with first end 1566a. Because shoulders 1573, 1571 and 1577, 1575 are circumferentially spaced less than 180° from one another about axis 1525 while shoulders 1569, 1567 and 1561, 1563 are radially opposite one another about axis 1525, second rotational member 1570 may rotate slightly relative to first rotational member 1566 about axis 1525, before shoulders 1573, 1577 engage with shoulders 1561, 1569, respectively or before shoulder 1571, 1575 engages with shoulders 1563, 1567, respectively. In addition, a plurality of biasing members 1580, which in this embodiment comprise leaf springs, are inserted within generally radially opposing slits 1576 in first rotational member 1566 and second rotational member 1570 so that members 1566, 1570 are rotationally biased relative to one another by biasing members 1580. Thus, if first rotational member 1566 is rotated about axis 1525 relative to second rotational member 1570, each of the biasing members 1580 are bent and deformed and thereby provide an biasing or returning force to force members 1566, 1570 to rotate back to a neutral position (e.g., where biasing members 1580 extend more or less radially relative to axis 1525).

Referring again specifically to FIG. 58, first rotational member 1566 is received axially within recess 1564 of mounting member 1562 so that first rotational member 1566, mounting member 1562, and input shaft 1522 all rotate together about axis 1525 during operations. This coupling between first rotational member 1566 and recess 1564 may be accomplished in any suitable manner, such as, for example, an interference fit, a keyed fit, a splined fit, etc. Second rotational member 1570 is also mounted to some structural support (e.g., housing 1502) so that second rotational member 1570 is rotationally fixed relative to first rotational member 1566, mounting member 1562, and shaft 1522.

During operations, biasing member 1580 within torsional biasing assembly 1560 biasing linking arm 1542 and shaft 1522 to a known starting or neutral position. Thus, as driving assembly 1540 operates to pivot linking arm 1542 about axis 1525, the biasing members 1580 exert a biasing force to return linking arm 1542 to the starting or neutral Therefore, through use of a pumping system (e.g., pumping system 110) employing one or more modular pump assemblies (e.g., assemblies 1100, 1400) in accordance with the embodiments disclosed herein, the number and specific arrangement of the pumping system may be readily and easily changed to accommodate the conditions and requirements of the drilling operations being employed. Thus, through use of such a pumping system, the pumping operations are more efficient and adaptable, which thereby increases the efficiency of the drilling operations overall and reduces the costs required therefore. In addition, through use of a pumping system including a pressure pulsation dampening assembly in accordance with the embodiments disclosed herein (e.g., pressure pulsation dampening assemblies 1300A, 1300B), pressure pulsations generated within or transferred into the pump assemblies may be effectively attenuated. Therefore, the problems associated with such pressure pulsations may be avoided or at least reduced (e.g., interference with acoustic communication systems, fatigue wear, etc.).

Figure 60:
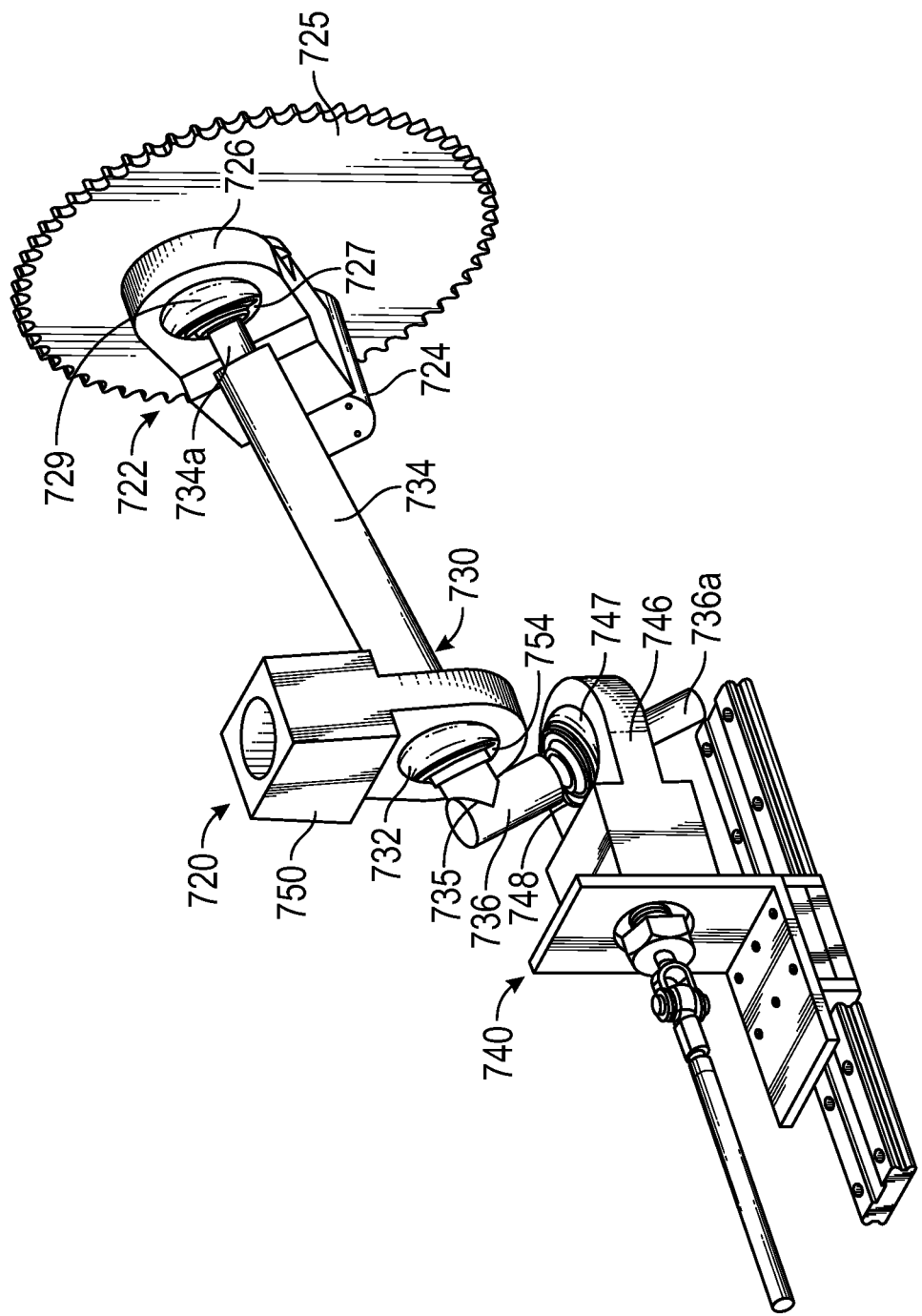
FIG. 60 a perspective view of another embodiment of a transmission for use within the pump assemblies disclosed herein.
Figure 61:
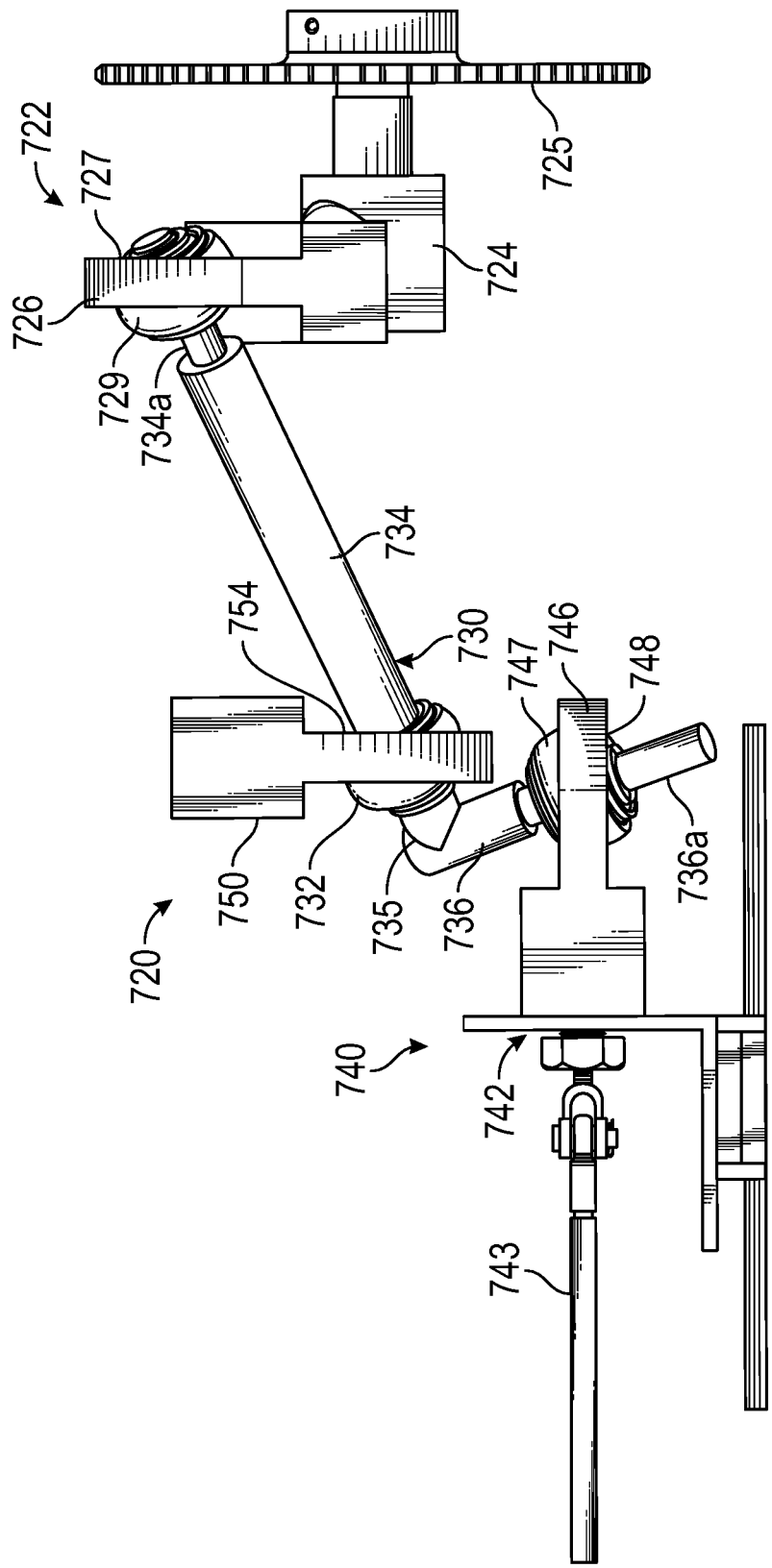
FIG. 61 is a side view of the transmission of FIG. 60.

Referring now to FIGS. 60 and 61, and with further reference back to FIGS. 46-50, another embodiment of a transmission 720 for use within pump assemblies 100, 400 and others described herein in place of transmissions 120, 420, and others described herein, is shown. Transmission 720 includes an offset shaft assembly 722, a carriage assembly 740, and a linking member 730. Offset shaft assembly 722 is coupled to an output shaft (e.g., shafts 118, 418) of a reducer (e.g., reducer 114), which can include a gear or rotary member 725. Carriage assembly 740 is coupled to fluid end 200 (not shown) and includes components and functionality similar to carriage assembly 640 of FIGS. 46-50. Linking member 730 extends between offset shaft assembly 722 and carriage assembly 740.

Offset shaft assembly 722 includes an input shaft 724 and an offset collar member 726. Linking member 730 includes a first spherical member or portion 729, a first shaft 734 including a second spherical member or portion 732, a second shaft 736 including a third spherical member or portion 747, and an angled junction or elbow 735 connecting the first and second shafts 734, 736. First spherical member 729 is retained or captured by a seat or spherical seat 727 in the offset collar member 726. Second spherical member 732 is retained or captured by a seat or spherical seat 754 in a mounting collar 750. Third spherical member 747 is retained or captured by a seat or spherical seat 748 in a projection 746 of the carriage assembly 740. Carriage assembly 740 may include a body 742 and an output shaft 743.

During operations, motor drive rotation as described herein causes input shaft 724 and offset collar 726 to rotate about the shaft axis so that spherical member 729 pivots or rolls in spherical seat 727, thereby driving an orbital motion of first shaft 734. In some embodiments, first shaft 734 can move relative to spherical member 729 along a longitudinal axis of first shaft 734 by allowing a reduced shaft portion 734a to move or reciprocate in spherical member 729. The orbital motion of first shaft 734 also drives pivoting or rolling of spherical member 732 in and relative to seat 754 in mounting collar 750, which in turn drives an orbital motion of elbow 735 and second shaft 736. As second shaft 736 orbits, pivots, or rotates it drives spherical member 747 to pivot or roll in and relative to seat 748. In some embodiments, second shaft 736 can move relative to spherical member 747 along a longitudinal axis of second shaft 736 by allowing a reduced shaft portion 736a to move or reciprocate in spherical member 747. The above-described overall pivoting or orbiting of linking member 730 also causes a reciprocal translation of body 742 of carriage assembly 740 and output shaft 743 in a similar manner as described hereinabove.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A pumping system for pressurizing a working fluid, the pumping system comprising:
  a suction manifold;
  a discharge manifold;
  a plurality of pump assemblies coupled between the suction manifold and discharge manifold, wherein the plurality of pump assemblies are configured to draw the working fluid from the suction manifold, pressurize the working fluid, and discharge the working fluid to the discharge manifold;
  wherein each of the pump assemblies includes a driver and a pressure sensor configured to measure a pressure within the corresponding one or more pump assemblies;
  a pulsation dampening assembly comprising a variable volume chamber fluidly coupled to the discharge manifold; and
  a controller coupled to the one or more pump assemblies and the pulsation dampening assembly;
  wherein the controller is configured to detect a pressure pulsation based on a measurement from at least one of the pressure sensors and is configured to determine whether a duration of the pressure pulsation is above or below a threshold value; and
  wherein when the duration is above the threshold value, the controller is configured to adjust the rotational speed of the driver of at least one of the pump assemblies; and
  wherein when the duration is below the threshold value, the controller is configured to adjust a volume of the variable volume chamber of the pulsation dampening assembly.

2. The pumping system of claim 1, wherein the pulsation dampening assembly comprises:
  a first electric motor;
  a second electric motor;
  a cylinder; and
  a piston movably disposed within the cylinder;
  wherein the variable volume chamber is at least partially defined by the piston within the cylinder; and
  wherein the first electric motor is configured to actuate the piston in a first direction, and wherein the second electric motor is configured to actuate the piston in a second direction that is opposite the first direction.

3. The pumping system of claim 1, wherein the pulsation dampening assembly comprises:
  a pressurization chamber;
  a transmission including an input shaft having an input shaft axis and a piston movably disposed within the pressurization chamber; and
  a drive assembly configured to pivot the input shaft about the input shaft axis;
  wherein the transmission is configured to convert a rotation of the input shaft about the input shaft axis into a longitudinal movement of the piston within the pressurization chamber.

4. The pumping system of claim 3, wherein the drive assembly of the pulsation dampening assembly comprises:
  a linking arm coupled to the input shaft, the linking arm including a first end and a second end opposite the first end;
  a first magnet assembly coupled to the first end of the linking arm;
  a second magnet assembly coupled to the second end of the linking arm;
  wherein each of the first magnet assembly and the second magnet assembly include a plurality of adjacent magnets having alternating polarities;
  a plurality of electromagnet assemblies disposed proximate to the first magnet assembly and the second magnet assembly;
  wherein the controller is configured to selectively activate one or more of the electromagnet assemblies to cause movement of the magnet assembly and pivoting of the input shaft about the input shaft axis.

5. The pumping system of claim 4, wherein the pulsation dampening assembly further comprises:
  a first rotational member coupled to the linking arm and the input shaft;
  a second rotational member; and
  one or more biasing members coupled to the first rotational member and the second rotational member;
  wherein one of the first rotational member and the second rotational member is at least partially received within the other of the first rotational member and the second rotational member; and
  wherein rotation of the first rotational member relative to the second rotational member about the input shaft axis is configured to cause deformation of the one or more biasing members.

6. The pumping system of claim 5,
wherein the first rotational member comprises:
  a first through passage defining a first pair of shoulders and a first projection, and
  a plurality of slots extending into each of the first projection and the first through passage;
wherein the second rotational member comprises:
  a second through passage defining a second pair of shoulders and a second projection; and
  a plurality of slots extending into each of the second projection and the second through passage
wherein the first projection is received within the second through passage so that rotation of the first rotational member relative to the second rotational member is limited by engagement of the first projection with the second pair of shoulders;
wherein the second projection is received within the first through passage so that rotation of the first rotational member relative to the second rotational member is limited by engagement of the second projection with the first pair of shoulders; and
wherein each of the one or more biasing members includes a first end received within one of the slots extending in the first rotational member and a second end received within one of the slots extending in the second rotational member.

7. The pumping system of claim 1, wherein each of the pump assemblies further comprises:
  a fluid-end section;
  a piston reciprocally disposed within the fluid-end section; and
  a transmission assembly coupled to each of the driver and the piston;
  wherein the transmission assembly comprises a first helical cam including a first helical surface extending helicoidally about a central axis in a first direction and a second helical surface extending helicoidally about the central axis in a second direction that is opposite the first direction; and
  wherein the driver is configured to reciprocate the piston within the fluid-end section via the transmission assembly along the central axis to draw the working fluid from the suction manifold and discharge the working fluid into the discharge manifold.

8. The pumping system of claim 7, wherein the first helical cam of each of the pump assemblies further includes:
  a first transition section extending between a first end of the first helical surface and a first end of the second helical surface; and
  a second transition section extending between a second end of the first helical surface and a second end of the second helical surface;
  wherein the first transition section is a concave curved surface and the second transition section is a convex curved surface.

9. The pumping system of claim 7, wherein the transmission assembly of each of the pump assemblies further comprises a first follower assembly coupled to the piston, the first follower assembly including a bearing element configured to engage and traverse along the first helical surface and the second helical surface of the first helical cam.

10. The pumping system of claim 9, wherein the transmission assembly of each of the pump assemblies further comprises:
  a second helical cam including a third helical surface extending helicoidally about the central axis in a third direction and a fourth helical surface extending helicoidally about the central axis in a fourth direction that is opposite third direction; and
  wherein each of the first helical cam and the second helical cam includes a first side, a second side opposite the first side;
  wherein the first side of the first helical cam includes the first helical surface and the second helical surface;
  wherein the first side of the second helical cam includes the third helical surface and the fourth helical surface; and
  a connecting member extending axially between the first helical cam and the second helical cam and coupled to each of the second side of the first cam and the second side of the second cam.

11. The pumping system of claim 1, wherein each of the pump assemblies further comprises:
  a base, wherein the driver is coupled to the base;
  a fluid-end section coupled to the base;
  a piston reciprocally disposed within the fluid-end section; and
  a transmission assembly coupled between the driver and the fluid-end section, wherein the transmission assembly comprises:
    an input shaft, having an input shaft axis;
    an offset shaft assembly coupled to the input shaft and including an offset shaft that extends at a non-zero angle with respect to the input shaft axis;
    a linking member including a throughbore configured to receive the offset shaft and a linking shaft; and
    a carriage assembly coupled to the piston and pivotably coupled to the linking shaft at a first connection;
    wherein rotation of the input shaft about the input shaft axis is configured to cause:
      the offset shaft to rotate about the input shaft axis;
      the linking shaft to pivot about the first connection; and
      the carriage assembly and piston to reciprocate relative to the base.

12. The pumping system of claim 11, wherein the transmission assembly of each of the pump assemblies further comprises a first spherical bearing member disposed within a projection of the carriage assembly and configured to slidingly engage with a seat disposed within the projection, wherein the first spherical bearing member includes a throughbore that receives the linking shaft therethrough to form the first connection.

13. The pumping system of claim 12, wherein the linking shaft of the transmission assembly of each of the pump assemblies is pivotably coupled to the base at a second connection, and wherein rotation of the input shaft about the input shaft axis is also configured to cause the linking shaft to pivot about the second connection.

14. The pumping system of claim 13, wherein the transmission assembly of each of the pump assemblies further comprises a second spherical bearing member slidingly engaging a seat mounted to the base, wherein the second spherical bearing member includes a throughbore that receives the linking shaft therein to form the second connection.

15. The pumping system of claim 1, wherein each of the pump assemblies further comprises:
  a base, wherein the driver is coupled to the base;
  a fluid-end section coupled to the base;
  a piston reciprocally disposed within the fluid-end section; and a transmission assembly coupled between the driver and the fluid-end section, wherein the transmission assembly comprises:
an input shaft, having an input shaft axis;
an offset collar coupled to the input shaft and including a throughbore;
a linking member including a first shaft extending along a first shaft axis and a second shaft extending along a second shaft axis, wherein the first shaft axis and the second shaft axis form an angle therebetween that is equal to approximately 90°, and wherein the first shaft is received with the throughbore of the offset collar; and
a carriage assembly coupled to the piston and pivotably coupled to the second shaft;
wherein rotation of the input shaft about the input shaft axis is configured to cause:
the first shaft of the linking member to rotate about the input shaft axis; and
the carriage assembly to reciprocate relative to the base.

16. The pumping system of claim 15, wherein for the transmission assembly of each of the pump assemblies:
the linking member further includes a spherical member coupled to each of the first shaft and the second shaft, wherein the spherical member is slidingly received within a seat coupled to the base; and
the throughbore of offset collar of the transmission assembly extends at a non- zero angle with respect to the input shaft axis.

17. The pumping system of claim 15, wherein the transmission assembly of each of the pump assemblies further comprises:
a first spherical bearing member coupled between the offset collar and the first shaft;
a second spherical bearing member coupling the first shaft to the base; and
a third spherical bearing member pivotably coupling the second shaft to the carriage assembly.

18. The pumping system of claim 1, wherein each of the pump assemblies further comprises:
a piston reciprocally driven within a fluid-end section by the driver;
a rotary sensor configured to determine at least one of the rotational speed or direction of an output shaft of the driver;
a displacement sensor configured to determine a position of the piston within the fluid-end section; and
wherein the controller is configured to adjust the rotational speed of the driver of at least one of the pump assemblies, and to adjust a volume of the variable volume chamber of the pulsation dampening assembly based at least in part a measurement from at least one of the rotary sensors and a measurement from at least one of the displacement sensors.

19. A method of dampening a pressure pulsation in a pumping system, the method comprising:
pumping a working fluid from a suction manifold to a discharge manifold with a plurality of pump assemblies of the pumping system, wherein each of the pump assemblies comprises a driver;
sensing a pressure pulsation within the pumping system;
determining whether a duration of the pressure pulsation is above or below a threshold value;
adjusting a rotational speed of the driver of one of the pump assemblies if the duration of the pressure pulsation is above the threshold value; and
adjusting a size of a variable volume chamber within a pulsation dampening assembly coupled to the discharge manifold if the duration of the pressure pulsation is below the threshold value.

20. The method of claim 19, wherein adjusting the size of the variable volume chamber further comprises moving a piston with an electric motor.

21. The method of claim 19, wherein adjusting a size of a variable volume chamber further comprises:
activating at least one electromagnet assembly;
moving a magnet assembly in response to activating the at least one electromagnet assembly;
pivoting a shaft in response to moving the magnet assembly; and
one of advancing or withdrawing a plunger within a pressurization chamber in response to pivoting the shaft, wherein the variable volume chamber is at least partially defined by the plunger within the pressurization chamber.

* * * * *